United States Patent
Joshi et al.

(10) Patent No.: US 12,488,348 B1
(45) Date of Patent: Dec. 2, 2025

(54) DETERMINING USER TYPES FROM BEHAVIOR

(71) Applicant: Block, Inc., Oakland, CA (US)

(72) Inventors: Aditya Joshi, Brooklyn, NY (US); Alexa Davis, Great neck, NY (US)

(73) Assignee: Block, Inc., Oakland, CA (US)

( * ) Notice: Subject to any disclaimer, the term of this patent is extended or adjusted under 35 U.S.C. 154(b) by 0 days.

(21) Appl. No.: 18/972,104

(22) Filed: Dec. 6, 2024

(51) Int. Cl.
  *G06Q 20/40* (2012.01)
  *G06N 20/00* (2019.01)
  *G06Q 20/08* (2012.01)

(52) U.S. Cl.
  CPC ......... *G06Q 20/4014* (2013.01); *G06N 20/00* (2019.01); *G06Q 20/0855* (2013.01)

(58) Field of Classification Search
  CPC . G06Q 20/4014; G06Q 20/0855; G06N 20/00
  See application file for complete search history.

(56) References Cited

U.S. PATENT DOCUMENTS 10,929,772 B1 * 2/2021 Diuk Wasser ......... G06N 20/00
11,847,624 B2 * 12/2023 Olenoski ................ G06Q 20/12
2017/0032398 A1 * 2/2017 Li ........................ G06F 11/0721
2022/0383406 A1 * 12/2022 Anasta .................. G06Q 20/405
2023/0316280 A1 * 10/2023 Sardari .............. G06Q 20/4015
                                                                705/64
2024/0289718 A1 * 8/2024 Eayrs ................. G06Q 10/0633

FOREIGN PATENT DOCUMENTS

WO    WO-2022036097 A1 * 2/2022    ............ G06F 11/004

* cited by examiner

Primary Examiner — Paul S Schwarzenberg
(74) Attorney, Agent, or Firm — Lee & Hayes, P.C.

(57) ABSTRACT

Determining user types from behavior is described. An artificial intelligence (AI) model is trained to classify user accounts of a payment service into different user types using contextual data associated with processed payments between the user accounts. The AI model is used to analyze additional contextual data associated with additional payments between additional user accounts to classify the additional user accounts, and, if a particular user account of the additional user accounts is associated with a user type of the different user types that requires an action to be performed, an instruction is sent to a user device associated with the particular user account to cause a payment application to present a user interface element prompting a user to perform the action, and, based on whether the action was performed, account data indicating whether the particular user account is an authorized account is stored in a datastore.

20 Claims, 11 Drawing Sheets

DETERMINING USER TYPES FROM BEHAVIOR

TECHNICAL FIELD

Applications, which are downloadable and executable on user devices, enable users to interact with other users. Such applications are provided by service providers and utilize one or more network connections to transmit data among and between user devices to facilitate such interactions.

BRIEF DESCRIPTION OF THE DRAWINGS

Features of the present disclosure, its nature and various advantages, will be more apparent upon consideration of the following detailed description, taken in conjunction with the accompanying drawings.

In the figures, the left-most digit(s) of a reference number identifies the figure in which the reference number first appears. The use of the same reference numbers in different figures indicates similar or identical items or features. The drawings are not to scale.

DETAILED DESCRIPTION

Figure 1:
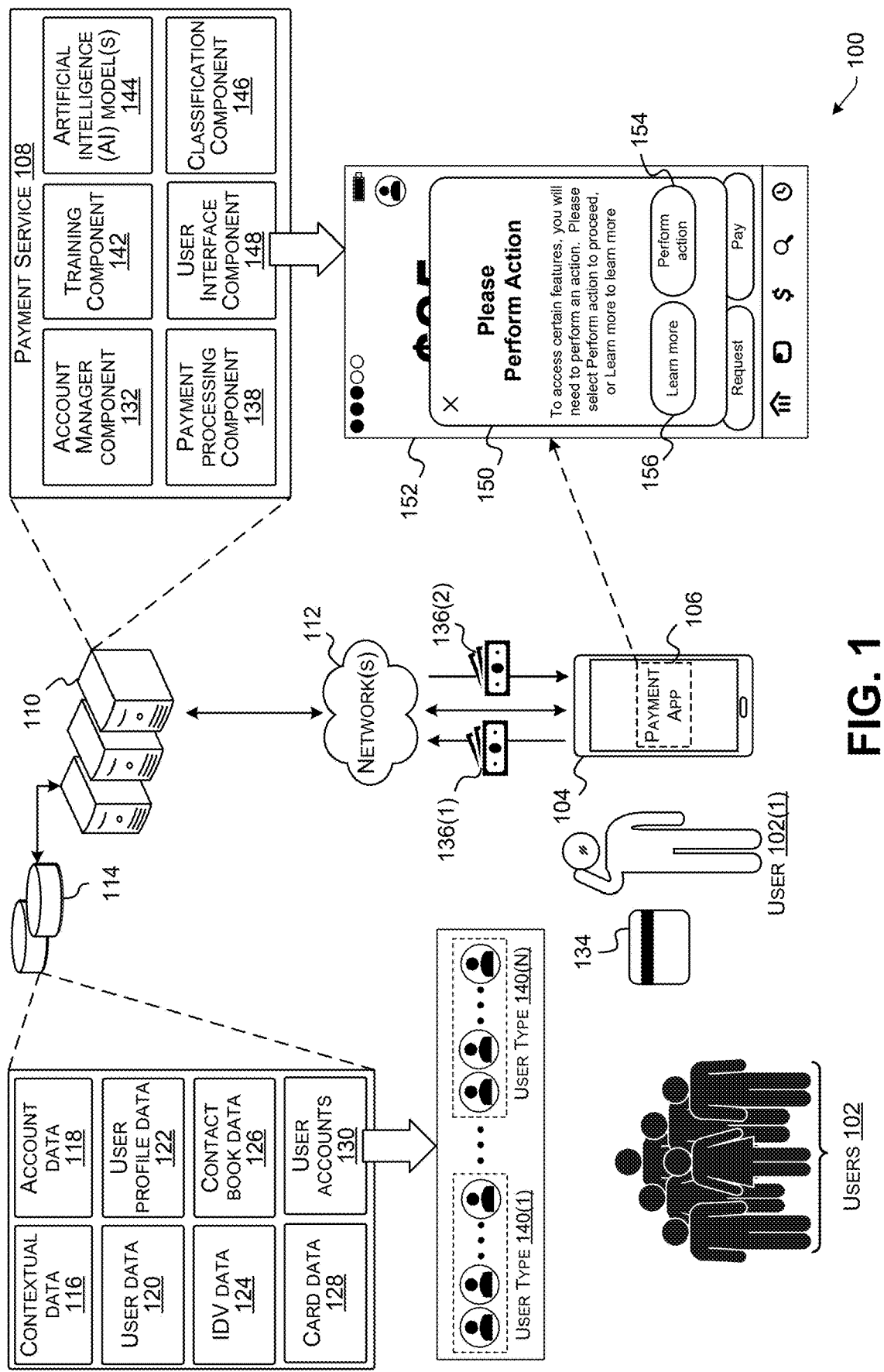
FIG. 1 is an example environment for determining user types from behavior, according to an implementation of the present subject matter.

Described herein are, among other things, techniques, devices, and systems for determining user types from behavior. In some examples, artificial intelligence (AI) is used to determine user types from data indicative of user behavior. In the context of a payment service, for example, a computing system associated with the payment service (hereinafter, a "payment service system (PSS)") may process payments between user accounts of the payment service. The PSS may use contextual data associated with the processed payments to train an AI model(s) to classify the user accounts into different user types. In some examples, this contextual data is indicative of user payment behavior, and training the AI model(s) on such contextual data is based on the notion that, if a user behaves (e.g., talks, transacts, interacts, etc.) like a particular user type, the user is most likely that particular user type. Once trained, the AI model(s) can be used to analyze additional contextual data associated with additional payments between additional user accounts of the payment service to classify the additional user accounts, the additional user accounts including accounts that have never been classified before and/or accounts associated with previous classifications that have become outdated. Once the additional user accounts are classified, the PSS can determine whether any of the additional user accounts are associated with a user type(s) that requires an action(s) to be performed, such as an action(s) to request sponsorship from a parent or a guardian, an action(s) to complete an IDV workflow successfully, an action(s) to add a personal identification number (PIN) and/or a biometric identifier to account data, and/or the like. If a particular user account is determined to be associated with a user type that requires such an action(s) to be performed, the PSS sends an instruction to a user device associated with the particular user account and executing a payment application associated with the payment service, the instruction causing the payment application to present a user interface element(s) prompting a user of the user device to perform the action(s). The PSS can then store, in a datastore, account data indicating whether the particular user account is an authorized account based at least in part on whether the action was performed. Determining user types from behavior, as described herein, can help to increase the number of user accounts that are authenticated and/or authorized accounts, which can allow the PSS to tailor functionality associated with the payment service more appropriately to user accounts of the payment service.

As new users are onboarded to the payment service, the PSS creates user accounts for the new users. A user account is a collection of data (e.g., metadata) that represents an identity of a user. In an example, a new user may download the payment application and may initiate an onboarding process where the user is asked to provide information to create a new user account with the payment service. Conventional payment service systems request minimal information from users during an onboarding process to expedite the process and minimize the amount of data collected so that users can, among other things, start sending/receiving payments to/from other users of a payment service. When minimal information is provided during the onboarding process, it can be challenging for conventional payment service systems to accurately identify the types of users who are using the payment service, to verify the identity of those users, and/or to authenticate and/or authorize the user accounts of those users to ensure that functionality of the payment service is appropriately tailored to the respective user accounts.

The techniques, devices, and systems described herein provide a technical solution to a computer-centric problem. To illustrate, conventional payment service systems face challenges in the tasks of accurately identifying users who create new user accounts and of accurately classifying user accounts into different user types, such as user types that are representative of different age ranges, especially because users are onboarded to a payment service remotely via a payment application executing on their user devices. Remote onboarding and/or electronic processes by nature enable bad actors to mask their identities and due to the remote and/or electronic nature of conventional payment systems, can make detecting such fraud difficult. For example, a user may provide, among other things, date of birth (DOB) information during an onboarding process, but the veracity of this DOB information is subject to the user completing an IDV workflow successfully. Furthermore, some users (e.g., younger users, immigrants, etc.) often lack certain identification documents, a substantial credit history, and so forth, which vendors typically rely on for IDV purposes. This "thin file" issue makes it challenging for conventional payment service systems to verify that users are who they say they are, let alone verify that the DOB information provided by users of the payment service is accurate DOB information, especially for users who are under an age threshold (e.g., users who are less than 22 years of age). Moreover, some users do not possess government-issued identification (e.g., drivers licenses, passports, etc.), and/or such users may not know their social security number (SSN) and may not have easy access to their social security cards during an onboarding process, which further complicates the task of authenticating user accounts and accurately classifying user accounts into different user types. The technical solutions to this computer-centric problem, as described herein, provide advantages over conventional systems by using AI in combination with a rich user dataset accessible to the PSS to accurately distinguish different types of users of the payment service, and to accurately classify their user accounts so that, among other things, functionality of the payment service is appropriately tailored to the respective user accounts. In an example where user accounts are classified into different age ranges, such classification can serve as an additional safety net to enhance and safeguard younger users on the PSS.

In some examples, the techniques, devices, and systems described herein allow for one or more devices to conserve resources with respect to processing resources, memory resources, networking resources, power resources, etc., in the various ways described herein. For example, as noted above, an AI model(s) can be trained and utilized to classify user accounts of a payment service into different user types, which can provide the various technical benefits described herein. Nevertheless, running an AI model(s) consumes valuable resources, such as those mentioned above. Accordingly, the techniques, devices, and systems described herein may run the AI model(s) selectively, and/or on an as-needed basis. For example, it is a waste of computing resources to iteratively use the AI model(s) to reclassify a given user account at a very high frequency (e.g., daily) because it is unlikely for the classification to change very quickly. Accordingly, in some examples, as a way of conserving resources, such as those mentioned above, the PSS may wait a sufficient period of time (e.g., 30 days, 60 days, etc.) before reclassifying any given user account that has been previously classified as a particular user type. Additionally, or alternatively, the techniques, devices, and systems described herein allow for one or more devices to conserve resources by intelligently selecting which user accounts are to be classified and to avoid wasting resources on classifying user accounts that would be futile to classify. For example, the user accounts of the payment service can be filtered to exclude certain user accounts (e.g., inactive user accounts) from being classified using the AI model(s), as it would be a waste of resources to do use the AI model(s) to classify such user accounts.

In some examples, the techniques, devices, and systems described herein train an AI model(s) using a training dataset that includes high quality data that is highly relevant to the task of classifying users into different user types, thereby improving AI model performance. For example, the AI model(s) can be trained on, among other things, contextual data associated with payments, such as notes associated with the payments, network interactions associated with the payments, and/or utilization patterns associated with the payments. With respect to notes associated with payments, the payment application may, for example, allow users to add notes to a payment to indicate what the payment is for and/or to write a short message to the recipient(s) of the payment. By using these notes, the AI model(s) can learn how different users "talk" to each other in association with making payments on the PSS. A "network interaction," as used herein, means the type of user account(s) with which a given user account has interacted in association with a payment involving the given user account. A "utilization pattern," as used herein, relates to any suitable metric indicative of a payment pattern and associated with payments involving a given user account, such as a metric indicative of the directionality of payments, such as a frequency at which the given user account sends payments, a frequency at which the given user account receives payments, or another type of payment metric, such as an average payment amount of the payments the given user account is involved in, and/or the like. By using network interactions and/or utilization patterns, the AI model(s) can learn how different users interact with each other on the PSS and/or how different users transact on the PSS. In some examples, the contextual data that is used to train the AI model(s) is associated with a filtered set of user accounts that has been filtered to ensure that the AI model(s) trains on a training dataset that is labeled with high-confidence labels. For example, a plurality of candidate user accounts may be filtered for use in training by excluding a subset of the plurality of candidate user accounts that are associated with user profile data indicating that DOB information has changed one or more times, and/or by excluding a subset of the plurality of candidate user accounts that are associated with IDV data indicating inconsistent IDV attempts. In other words, the AI model(s) can be trained using contextual data associated with user accounts that are likely to be legitimate user accounts associated with known, accurate user types.

In some examples, the techniques, devices, and systems described herein improve AI model(s) performance by utilizing an AI model(s) that is configured to run offline, to run at optimal times, and/or to implement a multi-label classification task curated for improving AI model performance. For example, the AI model(s), once trained, may be configured to run offline, at any suitable cadence, such as once a day (e.g., nightly). Running the AI model(s) offline and/or at times of low traffic on the PSS allows for using a more powerful AI model(s) to classify user accounts into different user types with improved accuracy, with minimal disruption to the PSS, and without constrains on latency. In examples where user accounts are classified into different age ranges, the AI model(s) may be configured to implement a multi-label classification task that classifies user accounts as one of at least three different user types (e.g., a first user type representative of a first age range, a second user type representative of a second age range, a third user type representative of a third age range, and so on). This tiered approach to classification not only reflects the continuous nature of behavioral development as users age, but it also improves AI model performance to ensure that the AI-generated output is highly aligned with the reality of user behavior across different age ranges.

In some examples, the techniques, devices, and systems described herein allow for dynamically presenting, on a display of a user device, a payment application user interface(s) that is customized to a particular user type, and for modifying payment service functionality for a user account associated with the particular user type. For example, at a time when a user associated with a user account of the payment service is determined to be interacting with the payment application executing on their user device, the PSS can dynamically send an instruction to the user device that causes one or more user interfaces (e.g., a series of user interfaces) to be presented on a display of the user device, the user interface(s) including a user interface element(s) that prompts the user to perform an action(s) for converting their user account to an authenticated and/or authorized user account, whereby a particular functionality associated with the payment service is enabled or disabled with respect to their user account based on whether the action(s) is performed. This dynamic and time-sensitive presentation of a user-specific user interface element(s) and the concomitant modification of payment service functionality effects an improvement on computing devices by tailoring the payment application user interface(s) and the associated payment service functionality to a personalized operation workflow.

Also described herein are techniques, devices, and systems for performing automated actions for fraud reduction. For example, once user accounts have been classified into different user types, as described herein, the techniques, devices, and systems described herein may reduce fraud on the PSS by detecting attempted payments between user accounts associated with different user types, and, in response, determining whether a set of conditions is satisfied for authorizing those payments. If the set of conditions is not satisfied for a given payment attempt, the PSS may cause the payment to automatically fail, and may send an instruction to a user device executing the payment application, the instruction causing the payment application to present a user interface element(s) notifying a user of the user device (e.g., the user who attempted the payment, a parent or a guardian of the intended recipient of the payment, etc.) that the payment failed. In conventional systems, fraudulent (e.g., illegal) transactions may avoid detection, or may be detected after it is too late to take any meaningful remedial action with respect to the fraudsters behind the illegitimate transactions. This may be due, at least in part, to the above-noted challenges faced by conventional payment service systems in accurately identifying and classifying users who are using the payment service, as well as the challenges in authenticating and/or authorizing the user accounts of those users. The techniques, devices, and systems described herein can evaluate a set of conditions with respect to certain payment attempts to determine whether the set of conditions is satisfied before authorizing an attempted payment between a first user account associated with a first user type and a second user account associated with a second user type. In some examples, the set of conditions includes: (i) a first condition that a first location associated with the first user account is within a threshold distance from a second location associated with the second user account, and (ii) a second condition that a number of mutual connections of the first user account and the second user account satisfies a threshold number. In other words, if the payor and the payee involved in a payment attempt are associated with (i) geographically proximate locations, and (ii) a sufficient number of mutual connections, it is more likely that the payment attempt is legitimate, as compared to a payment attempt where the set of conditions is not satisfied. Thus, with the techniques, devices, and systems described herein, fraud on the PSS can be mitigated, providing additional technical benefits because the PSS is not burdened with processing as many transactions that are fraudulent, non-compliant, or otherwise illegitimate, thereby conserving resources for processing more legitimate transactions.

While several examples presented herein are directed to classifying user accounts into different user types that represent different age ranges, the technique described herein are applicable to classifying user accounts into different user types that represent other user characteristics, such as different levels of risk, different levels of authentication, and/or different levels of access to or use of the payment service. Additionally, while several examples presented herein are directed to classifying user accounts of a payment service (e.g., where users install and execute instances of a payment application on their electronic devices), the techniques described herein are also applicable to other types of services such as electronic commerce (ecommerce) services, social networking services, gaming services, a merchant service, a loyalty program service, a loan service (e.g., capital loan, buy now pay later loan, etc.), a music, podcast and/or video streaming service, or the like.

The preceding summary is provided for the purposes of summarizing some example embodiments to provide a basic understanding of aspects of the subject matter described herein. Accordingly, the above-described features are merely examples and should not be construed as limiting in any way. Other features, aspects, and advantages of the subject matter described herein will become apparent from the following description of Figures and Claims.

FIG. 1 is an example environment 100 for determining user types from behavior, according to an implementation of the present subject matter. As depicted, the example environment 100 may include users 102, such as the user 102(1). The users 102 may be associated with respective electronic devices (sometimes referred to herein as "user devices"), such as the user device 104 shown in FIG. 1. The user devices (e.g., the user device 104) are configured to execute respective applications, such as a payment application 106. The payment applications (e.g., the payment application 106), when executing on the respective user devices (e.g., the user device 104), may allow the respective users 102 to navigate to the various user interfaces described herein, and/or to interact with or access services, such as a payment service 108. In at least one example, the payment application 106 allows for the efficient transfer of funds (e.g., fiat currency, securities (e.g., stocks, bonds, mutual funds), cryptocurrencies, gift cards, etc.) between users 102 of the payment service 108. Such transfers can be "efficient" in that they can happen electronically, in real-time or near real-time, due to a complex integration of software and hardware components configured to facilitate such transfers. In some examples, the respective users 102 can interact with user interfaces of the payment application 106 to, among other things, facilitate transactions (e.g., electronic payments), view receipts, statements, and/or activity feeds regarding their transactions, and/or the like. In some examples, the payment application 106 allows two users who are "peers" to transfer funds in a "peer-to-peer (P2P)" transaction. In some examples, the payment application 106 allows a merchant and a customer of the merchant to transfer funds between each other, such as when the customer is purchasing an item(s) from the merchant. In some examples, the payment application 106 installed on respective user devices (e.g., the user device 104) can be different instances of a same payment application 106, which can be provided by a computing system that implements the payment service 108 (hereinafter, a "payment service system (PSS)" 110). For example, the users 102 may download and install a particular version of the payment application 106 from the PSS 110 on their user devices (e.g., the user device 104), either via a first time installation, a software update, or the like.

As depicted by FIG. 1, the user device 104 of the user 102(1) may be coupled to one or more servers of the PSS 110 via one or more network(s) 112, such as a wide area network (WAN) (e.g., the Internet, a cellular network, etc.). Other user devices of other users 102 may be coupled to the PSS 110 in a similar fashion. In some examples, the PSS 110 may include a cloud-based computing architecture suitable for hosting and servicing the respective payment applications (e.g., the payment application 106) executing on the respective user devices (e.g., the user device 104). In particular examples, the PSS 110 may include a Platform as a Service (PaaS) architecture, a Software as a Service (SaaS) architecture, an Infrastructure as a Service (IaaS) architecture, a Data as a Service (DaaS) architecture, a Compute as a Service (CaaS) architecture, or other similar cloud-based computing architecture (e.g., "X" as a Service (XaaS)). The PSS 110 may be used to implement the aforementioned payment service 108, as described herein.

A service provider may operate the PSS 110, which may include one or more processing devices, such as the aforementioned server(s), and one or more data stores 114. The processing devices (e.g., server(s)) of the PSS 110 may be configured to provide processing or computing support for the respective payment applications (e.g., the payment application 106) executing on the respective user devices (e.g., the user device 104). The data store(s) 114 may include, for example, one or more internal data stores that may be utilized to store various types of data including contextual data 116, account data 118, user data 120, user profile data 122, IDV data 124, contact book data 126, card data 128, and/or user accounts 130.

As new users 102 are onboarded to the payment service 108, an account manager component 132 of the payment service 108 creates user accounts 130 for the new users 102. A user account 130 is a collection of data (e.g., metadata) that represents an identity of a user 102. Accordingly, when the user 102(1) is logged into their user account 130, the user 102(1) can, among other things, send/receive payments to/from other users 102 of the payment service 108 using an alias, or another type of unique user identifier, assigned to the user 102(1). In some examples, the account manager component 132 can prompt the user 102(1), during the onboarding process or at any other suitable time, to specify whether the user account 130 is a personal account or a business account, and/or the account manager component 132 may allow the user 102(1) to add a business account in addition to a personal account, such that the user's personal finances can be kept separate from the user's business finances. In some examples, the account manager component 132 can prompt the user 102(1), during the onboarding process or at any other suitable time, to allow access to the user's contacts (e.g., stored in their user device 104), and, if the user 102(1) consents to allowing access to their contacts, a shared contact book of the user 102(1) is stored in the datastore 114 as the contact book data 126 or can otherwise be accessible to the account manager component 132. Contacts in the contact book data 126 may include any suitable contact information, such as a name(s), a phone number(s), an electronic mail (email) address(es), a social media handle(s), and/or the like. In some examples, the contact book data 126 can be encrypted, hashed, tokenized, or otherwise securely stored to protect personal or sensitive data associated with user contacts. In some examples, the account manager component 132 can prompt the user 102(1), during the onboarding process or at any other suitable time, to setup a user profile by providing, for example, a username, an email address, a profile photo/image (e.g., a photo of their face), a biography (bio), demographic information, DOB information, payment information (e.g., a payment instrument(s) (e.g., debit card, credit card, etc.), banking information, etc.), user preferences, location information (e.g., a verified location(s), such as a residential location(s) (e.g., home address) where the user resides, a work location(s) (e.g., work address) where the user works, a trusted location(s) (e.g., a trusted address), a business location(s) (e.g., business address) associated with a business(es) owned by the user, etc.). Any of the aforementioned information, or similar information, provided by the user 102(1) can be stored as the user profile data 122.

The IDV data 124 may be stored in the datastore 114 in response to the account manager component 132 executing one or more IDV workflows configured to authenticate users 102 who login to the payment service 108. As used herein, an "IDV workflow" means a customized set of user interfaces (e.g., graphical user interfaces) presented on a user device 104 of a user 102 to obtain information (e.g., IDV information) from which the payment service 108 can make decisions. In some examples, the account manager component 132 is configured to execute an IDV workflow(s) to request, and obtain, IDV information from users 102 and/or from third-party services (e.g., third-party services that verify age, confirm DOB, confirm enrollment in a school, etc.) during the onboarding process or at any other suitable time. The IDV information may include personal data or identifying information, such as, a legal name of the user 102(1), an address (e.g., a mailing address) associated with the user 102(1), a DOB of the user 102(1), a government ID number (e.g., a driver's license number, a passport number, a SSN, etc.) associated with the user 102(1), an image and/or video of the user's 102(1) face, information indicating a source of income (e.g., work information, such as salary, employer, etc.), or the like. In some examples, personal data (e.g., DOB data, legal name data, address data, etc.) or other identifying information is encrypted, hashed, tokenized, or otherwise securely stored to obscure the personal data in compliance with privacy laws. Accordingly, any personal data or identifying information received in association with an IDV workflow can be encrypted and/or hashed. In some examples, the IDV data 124 indicates data associated with IDV attempts, such as a number of IDV attempts associated with a given user account 130, whether the IDV attempts are consistent or inconsistent (e.g., whether different IDV information was provided on each IDV attempt), whether a user completed an IDV workflow successfully, whether the user did not complete an IDV workflow successfully, and/or the like.

In some examples, a service provider of the payment service 108 issues a payment instrument(s) 134 (e.g., a debit card, a credit card, etc.) to the users 102 who qualify for the payment instrument(s) 134, and the payment instrument(s) 134 can be used in association with the payment service 108. In the example of FIG. 1, the user 102(1) has been issued the payment instrument(s) 134, and funds available in the user's 102(1) financial account (e.g., spending account, savings account, investing account, cryptocurrency account, etc.) can be used to facilitate transactions that are conducted using that payment instrument(s) 134 (sometimes referred to herein as "card transactions"). As card transactions occur, the PSS 110 receives and stores the corresponding card data 128, which may indicate a time and/or a location (e.g., a merchant location) at which a card transaction occurred, a payment amount associated with the card transaction, card usage frequency, and/or the like. The card data 128 can also indicate other aspects of the payment instrument(s) 134, such as a design chosen by the user 102(1), which can be printed on the physical payment instrument 134. For instance, the payment service 108 may offer a suite of "card designs" for qualifying users 102 to choose from when they are offered the payment instrument(s) 134, and the card designs may range in terms of their creativity (e.g., from simple card designs to very creative card designs). In some examples, the suite of card designs may include card designs geared towards younger users (e.g., teens), card designs geared towards popular culture and/or fashion trends, card designs geared towards historical figures and/or events, etc. In some examples, the suite of card designs may include options for choosing stamps to put on the payment instrument(s) 134.

The user data 120 is associated with the respective users 102 and may include user transaction history data, user purchase history data, user payment history data, user interaction data, user payment activity data, user attribute data, location history data, stored balance history data, and so forth. The user data 120 can be collected by the PSS 110 at any suitable time, such as when new users 102 are onboarded to the payment service 108, and/or as many of those users 102 continue to use the payment service 108 to, among other things, complete transactions using the payment application 106 executing on their user devices (e.g., the user device 104) and/or using the payment instrument 134. In some examples, the account manager component 132 can prompt the user 102(1), during the onboarding process or at any other suitable time, to allow access to location of the user device 104 (e.g., obtained via Geo tracking, global positioning system (GPS), Internet Protocol (IP) address, cell tower triangulation, etc.), and, if the user 102(1) consents to allowing access to the location of their user device 104, as well as any of the aforementioned examples of user data, the shared user data is stored in the datastore 114 as the user data 120.

The contextual data 116 may be received by the PSS 110 in association with payments between user accounts 130 of the payment service 108. To illustrate, instances of the payment application 106 execute on user device (e.g., the user device 104) of the users 102 to facilitate transactions. Each user 102 has a financial account(s) (e.g., a spending account, savings account, investing account, cryptocurrency account, etc.) with the payment service 108. The user 102 can add funds to a stored balance associated with the financial account and/or funds can be added to the stored balance automatically whenever payments are received (e.g., from other users 102 of the payment service 108, from direct deposits (e.g., paychecks, tax refunds, etc.), loans or other lending mechanisms, etc.). In some examples, the user 102 can access the funds on-demand in order to make payments (e.g., to other users and/or to merchants (e.g., in stores, online, etc.)). FIG. 1 shows an example where the user 102(1) sends a first payment 136(1) using the payment application 106 and receives a second payment 136(2) via the payment application 106. As payments between user accounts 130 (e.g., the payments 136) are processed by a payment processing component 138 of the payment service 108, contextual data 116 associated with the payments is stored in the datastore(s) 114. In some examples, the payment processing component 138 processes an individual payment by adding funds to the financial account(s) associated with a user account 130 of a payee, and by subtracting funds from the financial account(s) associated with user account 130 of a payor, and/or by exchanging data with an external (e.g., third-party) system, such as a computing system associated with a card issuing entity, a third-party financial institution, and/or the like, which may be accessible to the PSS 110 over the network(s) 112.

In the example of FIG. 1, the payment service 108 is shown as including the account manager component 138 and the payment processing component 138 mentioned above, as well as a training component 142, one or more AI models 144, a classification component 146, and/or a user interface component 148. The components 132, 138, 142, 146, and 148, and the payment service 108 itself, may represent computer-executable instructions that, when executed by a processor(s) (e.g., a processor(s) of the PSS 110) cause performance of one or more operations described herein. In some examples, one or more of these components may utilize the AI model(s) 144 to perform their respective tasks.

The PSS 110 is configured to, among other things, determine user types 140 from behavior. In some examples, the PSS 110 uses the AI model(s) 144 to determine user types 140 from data indicative of user behavior. For example, the payment processing component 138 may process payments (e.g., the payments 136) between user accounts 130 of the payment service 108, and the training component 142 may use contextual data 116 associated with at least some of the processed payments (e.g., a sampled set of the processed payments) to train the AI model(s) 144 to classify the user accounts 130 into different user types 140. In some examples, the different user types 140 represent different age ranges. FIG. 1 shows user types 140(1) to 140(N), N being any suitable integer greater than one. In the "age range" example of user types 140, there may be N different user types 140 including a first user type 140(1) that represents a first age range and an Nth user type 140(N) that represent an Nth age range different than the first age range. In a binary classification example, the AI model(s) 144 may be trained to classify the user accounts 130 into two different user types 140 (e.g., N=2), such as a first user type 140 that represents a "young" age range (e.g., minors or teens who are less than 18 years of age) and a second user type 140 that represents an "older" age range (e.g., adults who are 18 years of age and older). In a non-binary multi-label classification example, the AI model(s) 144 may be trained to classify the user accounts 130 into three or more different user types 140 (e.g., N≥3), such as a first user type 140 that represents a first age range (e.g., minors or teens who are less than 18 years of age), a second user type 140 that represents a second age range (e.g., young adults who are 18 to 22 years of age), and a third user type 140 that represents a third age range (e.g., older adults who are over 22 years of age). These are merely example age ranges, and other age ranges (e.g., minor, young adult, older adult, senior, etc.) and/or a greater number of user types 140 are contemplated herein.

In some examples, the AI model(s) 144 may be trained to predict an exact age associated with a user account 130 such that user accounts 130 may be classified into different user types 140, each user type 140 representing a particular age, such as a first user type 140 that represents 13 years of age, a second user type 140 that represents 14 years of age, a third user type 140 that represents 15 years of age, and so on. A more granular approach to classification of user accounts 130 into three or more user types 140 representing different age ranges acknowledges that behavior evolves gradually and varies significantly across different life stages, and it allows the AI model(s) 144 to distinguish among the three or more user types 140(rather than treating all adults as a single group, for example), which can aid in the learning process of the AI model(s) 144. For instance, forcing the AI model(s) 144 to classify a 20 year-old and a 45 year-old as the same user type 140 can be counterproductive, as the differences in behavior between these example ages can be substantial. The tiered approach to classification (e.g., classification into N different user types 140 where N≥3) not only reflects the continuous nature of behavioral development as users age, but it also improves AI model performance to ensure that the AI-generated output is highly aligned with the reality of user behavior across different age ranges. In some examples, the user types 140 may include a user type 140 that represents an "unknown" age range (e.g., where contextual data 116 may be conflicting, inconsistent, and/or sparse, thereby preventing definitive classification of certain user accounts 130 into any of the user types 140) and/or a "gray zone" age range (e.g., where contextual data 116 indicates user behavior that is associated with either of two different adjacent age ranges, thereby preventing definitive classification into one of two adjacent user types 140). In some examples, user accounts 130 that are classified as a user type 140 that represents an "unknown" age range or a "gray zone" age range are filtered out from a training dataset used to train the AI model(s) 144 and/or filtered out from the results that are used to evaluate performance of the AI model(s) 144. In some examples, the user types 140 may include a user type 140 that represents an age range below a minimum threshold indicating that a user 102 of the user account 130 is too young to be on the PSS 110.

In some examples, the user types 140 may represent other user characteristics besides age, such as different levels of risk, different levels of authentication, and/or different levels of access to the payment service 108. For example, the AI model(s) 144 may be trained to classify the user accounts 130 into different user types 140 representing different risk level, such as a first user type 140 that represents a low risk user account 130, a second user type 140 that represents a high risk user account 130, and/or one or more additional user types 140 that represent one or more intermediate risk levels. In this example, risk may be indicative of a risk that a user 102 associated with the user account 130 will be unable to successfully complete a transaction, a risk that the user will default on a loan, and/or similar types of risk. In another example, the AI model(s) 144 may be trained to classify the user accounts 130 into different user types 140 representing different authentication levels, such as a first user type 140 that represents a less authenticated user account 130, a second user type 140 that represents a more authenticated user account 130, and/or one or more additional user types 140 that represent one or more intermediate authentication levels. In this example, authentication may be based on the amount of information that is known about a user 102 associated with a given user account 130. In yet another example, the AI model(s) 144 may be trained to classify the user accounts 130 into different user types 140 representing different access levels, such as a first user type 140 that represents a lower level of access to the payment service 108 (e.g., access to features and/or functionality of the payment service 108), a second user type 140 that represents a higher level of access to the payment service 108, and/or one or more additional user types 140 that represent one or more intermediate access levels. In this example, access to payment service features and/or functionality may be based on payment activity on the PSS 110, an amount of progress through an IDV workflow for a given user account 130, and/or the like. Other user characteristics represented by the user types 140 may include profession-related characteristics (e.g., classifying user accounts 130 as an artist (e.g., a musician) vs. a non-artist), application usage characteristics (e.g., classifying user accounts 130 as business entities (business accounts) who use the payment application 106 for business purposes vs. non-business users (personal accounts) who use the payment application 106 for personal payments), family hierarchy characteristics (e.g., classifying user accounts 130 as a parent or a guardian vs. a non-parent/guardian), and/or the like.

Regardless of what user characteristics the user types 140 represent, the contextual data 116 that is used to train the AI model(s) 144 is indicative of user payment behavior, and training the AI model(s) 144 on such contextual data 116 is based on the notion that, if a user 102 behaves (e.g., talks, transacts, interacts, etc.) like a particular user type 140, the user 102 is most likely that particular user type 140. Once trained, the classification component 146 may use the AI model(s) 144 to analyze additional contextual data 116 associated with additional payments between additional user accounts 130 of the payment service 108 to classify the additional user accounts 130. These additional user accounts 130 may include accounts that have never been classified before and/or accounts associated with previous classifications that have become outdated (e.g., accounts that have not been reclassified for at least a threshold amount of time, such as a threshold of 30 days, 60 days, etc.). Once the additional user accounts 130 are classified, the classification component 146 can determine whether any of the additional user accounts 130 are associated with a user type(s) 140 that requires an action(s) to be performed, such as an action(s) to request sponsorship from a parent or a guardian, an action(s) to complete an IDV workflow successfully, an action(s) to add a PIN and/or a biometric identifier to account data 118, and/or the like. If a particular user account 130 is determined to be associated with a user type 140 that requires such an action(s) to be performed, the user interface component 148 sends an instruction (e.g., over the network(s) 112) to a user device 104 associated with the particular user account 130 and executing the payment application 106, the instruction causing the payment application 106 to present a user interface element(s) 150 prompting a user 102(1) of the user device 104 to perform the action(s). In the example of FIG. 1, the user device 104 is shown as presenting, on a display of the user device 104, a user interface 152 of the payment application 106, the user interface 152 including a user interface element 150 (e.g., a pop-up element) that prompts the user 102(1) to perform an action(s), which may allow the user 102 to access certain features and/or functionality of the payment service 108 (and not other features and/or functionality, at least until the action(s) are performed). In the example of FIG. 1, the user 102(1) may interact with (e.g., select) a first interactive element 154 to perform the action(s), or to otherwise proceed to a user interface flow that allows the user 102(1) to perform the action(s). In some examples, the user 102(1) may interact with (e.g., select) a second interactive element 156 to "learn more" about the action(s) that the user 102(1) is being prompted to perform. The account manager component 132 can store, in the datastore(s) 114, account data 118 indicating whether the particular user account 130 is an authorized account based at least in part on whether the action(s) was performed. For example, if the user 102(1) interacts with the first interactive element 154 to perform, or to subsequently perform, the action(s), the user account 130 of the user 102(1) may be converted to an authenticated and/or authorized account by storing the corresponding account data 118 in association with the user account 130.

Figure 2:
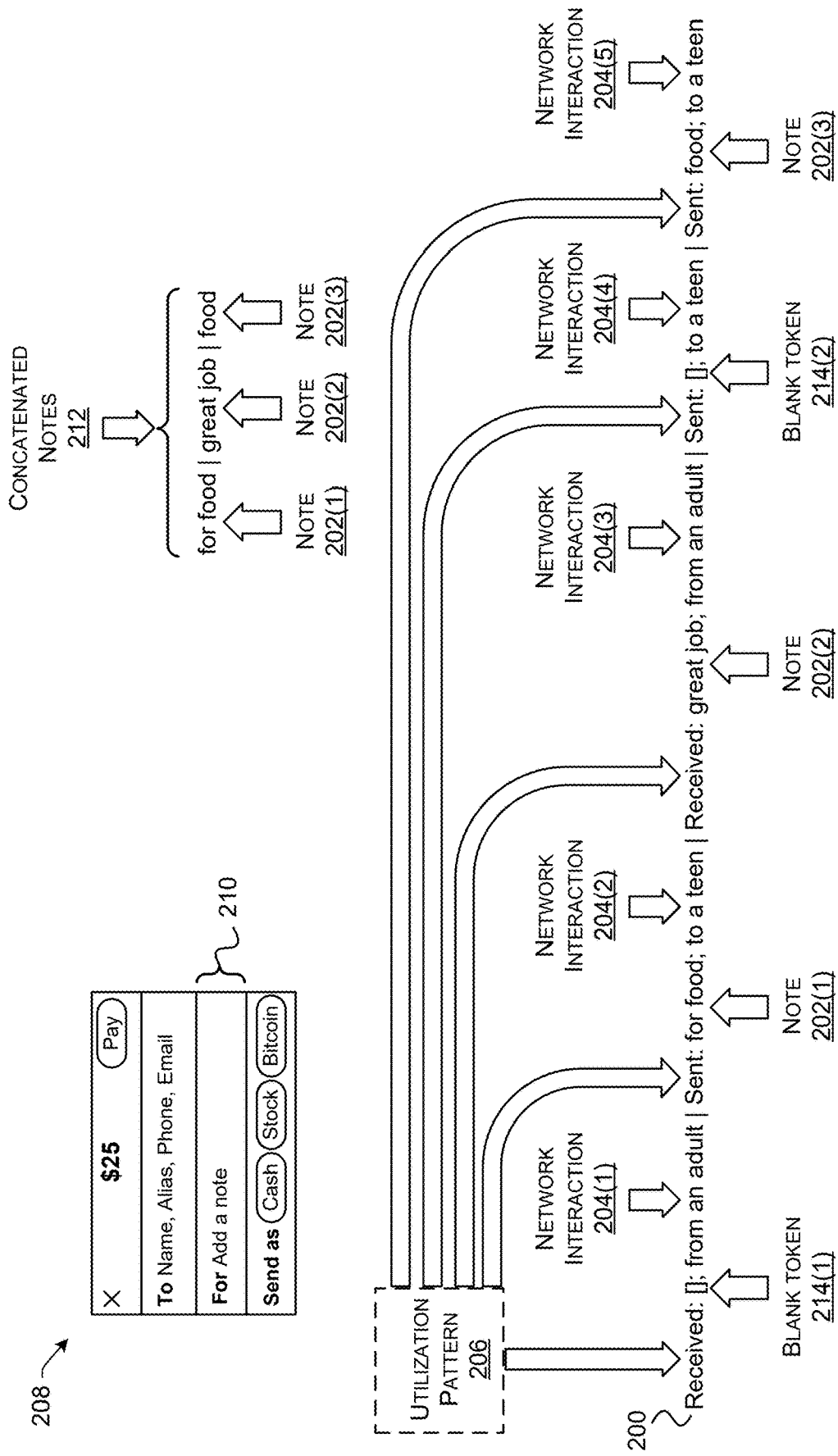
FIG. 2 is an example representation of contextual data associated with payments, the contextual data being usable for training an artificial intelligence (AI) model(s) to classify the user accounts into different user types, according to an implementation of the present subject matter.

FIG. 2 is an example representation of contextual data 116 associated with payments between user accounts 130 of the payment service 108, the contextual data 116 being usable for training the AI model(s) 144 to classify the user accounts 130 into different user types 140, according to an implementation of the present subject matter. In some examples, the AI models 144 described herein can be, or include, machine learning models. Machine learning generally involves processing a set of examples (called "training data" or a "training dataset") in order to train the model(s). In some examples, the AI model(s) 144 (e.g., machine learning model(s)) is/are trained by the training component 142 and using a training dataset. In some examples, the training dataset used to train the AI model(s) 144 can include features and labels. However, the training dataset may be unlabeled, in some examples. Accordingly, the AI model(s) 144 (e.g., machine learning model(s)) may be trained using any suitable learning technique, such as supervised learning, unsupervised learning, semi-supervised learning, reinforcement learning, and so on. In examples where the training dataset is labeled, the labels may include positive labels (e.g., this user account 130 is a particular user type 140) and negative labels (e.g., this user account 130 is not a particular user type 140). In some examples, the training component 142 may use machine learning to train the AI model(s) 144, which may utilize statistical techniques, as well as techniques to generate and/or modify the layers and/or models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning. In the context of generative AI models, such models can be trained on visual data, text data, audio data, or the like, to generate user type classifications. During training of the AI model(s) 144, a discriminator may be used to evaluate the performance of the model in generating user type classifications. In some examples, the features of the training dataset may be utilized to predict trends and behavior patterns. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome. Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. In some examples, the training dataset may be formatted into input vectors and/or signals for the AI model(s) 144 (e.g., machine learning model(s)) to intake, as well as associating the various data with the outcomes.

As shown in the example of FIG. 2, the contextual data 116 associated with payments between user accounts 130 may be aggregated to form a string 200 that includes aggregated contextual data 116, which may then be used in the training dataset to train the AI model(s) 144. In the example of FIG. 2, the contextual data 116 in the string 200 may be associated with a given user account 130 and may include notes 202 associated with payments involving the given user account 130, network interactions 204 associated with the payments, and/or utilization patterns 206 associated with the payments. Accordingly, the string 200 represents a conceptualization of the payments. In some examples, the string 200 represents a time ordered sequence, where each element in the sequence includes a note(s) 202 and one or more numeric features associated with a network interaction 204 and/or a utilization pattern 206. In some examples, the string 200 represents a single element representative of a transaction history (e.g., of a user account 130) associated with multiple payments. In this latter example, the single-element string 200 is formed by aggregating multiple notes 202 and multiple numeric features associated with multiple network interactions 204 and/or multiple utilization patterns 206.

To illustrate how notes 202 are generated, FIG. 2 shows a partial user interface 208 of the payment application 106 that may be displayed on a user device 104 when a user 102 of the user device 104 is making a payment. As shown in the partial user interface 208, in the example of FIG. 2, a user 102 is about to pay $25 to an unspecified recipient via the payment application 106. The user 102 may specify, via the payment application 106, the recipient of the payment, and the user 102 may also add a note 202 to a notes field 210 of the payment application 106. Notes 202 can be added to the notes field 210 to indicate what the payment is for and/or to write a short message to the recipient(s) of the payment. FIG. 2 further illustrates an example of concatenated notes 212, which includes a first note 202(1) "for food," a second note 202(2) "great job," and a third note 202(3) "for food." Additionally, or alternatively, users 102 may personalize payments in other ways, such as by adding, to their payments, other types of personalized text (e.g., text to be presented in a custom font, at a custom size, in a custom color, at a custom location and/or in a custom orientation on the screen, etc.), personalized images/videos (e.g., backgrounds, photographs, stamps, emojis, graphics (e.g., GIFs), video clips, etc.), personalized audio (e.g., music (music clips), sound bites, etc.), and/or the like. By using the notes 202 and/or other personalized text, personalized images/videos, personalized audio, the AI model(s) 144 can learn how different users 102 "talk" to (or otherwise interact with) each other in association with making payments on the PSS 110. While notes 202 provide valuable insights into user behavior, enriching the notes 202 with additional contextual data 116 can enhance the AI model(s) 144 understanding of the notes 202. For example, network interactions 204, utilization patterns 206, and/or the aforementioned personalization (e.g., text, images/videos, audio, etc.) can be used in conjunction with the notes 202, in some examples, to train the AI model(s) 144 to understand how different users 102 "talk" to each other in association with sending payments versus receiving payments, and how different users 102 "talk" in the context of payments with certain types of user accounts 130 (e.g., adults vs. teens).

A "network interaction" 204, as used herein, means the type of user account(s) 130 with which a given user account 130 has interacted in association with a payment involving the given user account 103. Network interactions 204 may be derived from a user's transactional network indicating who the user 102 has paid and who has paid the user 102. For example, the example string 200 includes a first network interaction 204(1) indicating a first payment was received "from an adult" ("adult" being an example user type 140), a second network interaction 204(2) indicating a second payment was sent "to a teen" ("teen" being another example user type 140), a third network interaction 204(3) indicating a third payment was received "from an adult," a fourth network interaction 204(4) indicating a fourth payment was sent "to a teen," and a fifth network interaction 204(5) indicating a fifth payment was sent "to a teen." In an example where user types 140 are representative of different age ranges, network interactions 204 may, in some examples, indicate a percentage of payments associated with a given user account 130 that are with a user type 140 of a particular age range (e.g., a percentage of payments with a teen who is less than 18 years of age, with a young adult who is 18 to 22 years of age, or with an older adult who is over 22 years of age). By using network interactions 204, the AI model(s) 144 can learn how different users 102 interact with each other on the PSS 110, at least in the context of payments.

A "utilization pattern" 206, as used herein, relates to any suitable metric indicative of a payment pattern and associated with payments involving a given user account 130, such as a metric indicative of the directionality of payments, such as a frequency at which the given user account 130 sends payments, a frequency at which the given user account 130 receives payments, or another type of payment metric, such as an average payment amount of the payments the given user account 130 is involved in, and/or the like. For example, the example string 200 indicates that a utilization pattern 206 can be derived from payment directionality data indicating a first payment was received (as opposed to being sent), a second payment was sent (as opposed to being received), a third payment was received, a fourth payment was sent, and a fifth payment was sent, and so on. In an example, utilization patterns 206 may indicate a percentage of payments that are sent (as opposed to a percentage of received payments), or vice versa. By using utilization patterns 206, the AI model(s) 144 can learn how different users 102 transact on the PSS 110. The enriched representation of the training dataset in FIG. 2 (e.g., the string 200) not only retains the notes 202, but also incorporates behavioral and relational cues, offering a richer dataset for the AI model(s) 144 to analyze. For example, the AI model(s) 144 may be able to infer that a user account 130 likely belongs to a user type 140 representative of a teen who is less than 18 years of age based on the nature and context of the payments associated with the user account 130. In some examples, at least the network interactions 204 and the utilization patterns 206 may be represented as graph data, which may include one or more of the features discussed above with respect to network interactions 204 and utilization patterns 206. For example, nodes of a graph may represent types of user accounts 130 that a given user account 130 has interacted with, and edges connecting the nodes may have directionality indicating directionality of payments to/from the nodes.

The use of text within the training dataset for the AI model(s) 144 aligns with established natural language processing techniques, and it allows for using pretrained AI models 144, such as bidirectional encoder representations from transformers (BERT). To integrate text with numeric features, multiple different approaches can be used. One example approach for integrating text with numeric features is to use a side numeric multi-layer perceptron (MLP) network, where numeric features from transactions are aggregated and input into a MLP network. The features are then concatenated with the transformer's hidden state, which processes the text data. Another approach for integrating text with numeric features is to convert the numeric features of the contextual data 116 into text and to use notes 202 as the context of the payment. In this latter approach, the numeric "context" of each payment can be converted into text, and the payment note 202 can be included to add additional contextual information.

Considering that payments may lack notes 202, contextual data 116 associated with payments that lack notes 202 may still be included in the training dataset while accounting for the lack of notes 202 using, for example, placeholder data elements (e.g., blank tokens 214), indicating the absence of notes 202 in individual payments, which ensures that the AI model(s) 144 remains effective across user accounts 130 with varying levels of payment note activity. In the example of FIG. 2, the string 200 includes a first payment with a first blank token 214(1) to indicate that the first payment lacks a note 202. The fourth payment in the string 200 similarly includes a second blank token 214(2) to indicate that the fourth payment also lacks a note 202. In some examples, the numeric features within the contextual data 116 are categorized, and raw numbers are transformed into interpretable text data. By framing numeric contextual data 116 as text and integrating payment notes 202 as additional context of a payment, a comprehensive view of user payment behavior can be evaluated by the AI model(s) 144 during training.

Yet another approach for integrating text with numeric features is to use a combined text and numeric transformer. This approach involves merging text and numeric data at the transaction level before analyzing the aggregated sequence. This approach also allows the AI model(s) 144 to view the payments as an original sequence with the full representation of numeric values.

In some examples, to train the AI model(s) 144, the training component 142 uses contextual data 116 associated with payments between user accounts 130 of known user types 140 that are likely to be legitimate user accounts 130 using filtering criteria. In examples where user types 140 are representative of different age ranges, for example, unsponsored user accounts 130 and/or user accounts 130 that have not completed an IDV workflow successfully can be filtered out from the training dataset, thereby obtaining a training dataset with contextual data 116 associated with payments between user accounts 130 that have been sponsored by a parent or a guardian on the PSS 110, and/or contextual data 116 associated with payments between user accounts 130 that have completed an IDV workflow successfully. Because some user accounts 130 may have incorrect labels (e.g., ages or age ranges), whether on purpose or by accident, the contextual data 116 that is used to train the AI model(s) 144 may be associated with a filtered set of user accounts 130 that has been filtered to ensure that the AI model(s) 144 trains on a high quality, reliable training dataset that is labeled with high-confidence labels. That is, filtering out user accounts 130 with unreliable labels (e.g., ages or age ranges) can reduce the proportion of the training dataset that includes low quality training data. For example, a plurality of candidate user accounts 130 may be filtered for use in training the AI model(s) 144 by excluding a subset of the plurality of candidate user accounts 130 that are associated with user profile data 122 indicating that DOB information has changed one or more times, and/or by excluding a subset of the plurality of candidate user accounts 130 that are associated with IDV data 124 indicating inconsistent IDV attempts. In other words, the AI model(s) 144 can be trained using contextual data 116 associated with user accounts 130 that are likely to be legitimate user accounts 130 associated (e.g., labeled) with known, accurate user types 140. In some examples, the filtering criteria for the training dataset includes, for teens (e.g., users under the age of 18): (i) consistent IDV or sponsorship attempts with stable DOB information, (ii) a significant age difference (e.g., at least a difference of 15 years) between the teen user account 130 and a sponsor user account 130 for that teen, (iii) a sponsor named Mom, Dad, or the like in the contact book (e.g., contact book data 126) of the teen user account 130, and/or (iv) no history of denylisting or adverse actions. In some examples, the filtering criteria for the training dataset includes, for adults (e.g., users 18 years of age and older): (i) consistent IDV attempts with stable DOB information, and/or (ii) no history of denylisting or adverse actions.

In some examples, features used by the training component 142 to train the AI model(s) 144 include P2P features and/or contact book features. P2P features may be included in the user data 120 (e.g., user payment history data). For example, the training component 142 may look up, for an individual user account 130, the past N months, "N" being any suitable integer (e.g., 18 months, 20 months, 22 months, etc.) of payment history data and may create ratios based on different payment properties. In some examples, the training component 142 may include, in the training dataset, the P most recent payments for an individual user account 130, "P" being any suitable integer (e.g., the latest 150 payments, the latest 180 payments, the latest 200 payments, etc.). The ratios and/or counts that the training component 142 may create based on the user payment history data may include ratios indicating the type of transactions (e.g., the ratio of transactions that are sent, the ratio of transactions that are received, etc.), ratios indicating the orientation of transactions (e.g., the ratio of request payments, the ratio of sent payments, etc.), ratios indicating the amount category of transactions (e.g., payments with $50 or more, payments with $10 or more, payments with $1 or more, payments with $0 or more, etc.), ratios indicating whether payments were successful or not (e.g., payments that succeeded, payments that failed, etc.), ratios indicating the P2P transaction activities with different age groups (e.g., the ratio of P2P transactions with adults (e.g., age 22 and above), the ratio of P2P transactions with young adults (e.g., age 18-22), etc.), counts of P2P transactions with different cohorts (e.g., total count of all P2Ps for a user account 130), and/or the like.

Contact book features may be included in the contact book data 126. For example, the training component 142 may look up aggregated contact book features and may create ratios based on contact book features. For example, the training component 142 may create ratios indicating the distribution of ages in the contact book associated with a given user account 130 (e.g., the ratio of teen (e.g., less than 18 years of age) contacts in the contact book, the ratio of young adult (e.g., age 18-22) contacts in the contact book, the ratio of adult (e.g., 22 years of age or older) contacts in the contact book, etc.). In some examples, the training component 142 may generate a count of the total number of contacts in the contact book associated with a given user account 130.

An AI model(s) 144 (e.g., machine learning model(s)), once trained, is a learned mechanism that can receive new data as input and estimate or predict a result as output. For example, a trained machine learning model can comprise a classifier that is tasked with classifying unknown input (e.g., an unknown image) as one of multiple class labels (e.g., labeling the image as a cat or a dog). In some cases, a trained machine learning model is configured to implement a multi-label classification task (e.g., labeling images as "cat," "dog," "duck," "penguin," and so on). Additionally, or alternatively, a trained AI model can be trained to infer a probability, or a set of probabilities, for a classification task based on unknown data received as input. In some examples, the AI models 144 described herein can be, or include, generative AI models, such as large language models (LLMs), neural networks (e.g., generative adversarial networks (GANs)), and/or the like, which may be configured to generate text, images, and/or other media as output. In the context of the present disclosure, the trained AI model(s) 144 may generate any suitable output that is indicative of a user type classification, such as a classification as one of multiple class labels (e.g., class labels such as "teen," "young adult," "adult," "senior," etc.) and/or a metric (e.g., a value, a score, a binary indication, etc.), the metric indicating, or otherwise relating to, a probability of the user account 130 being associated with a particular user type 140.

Figure 3:
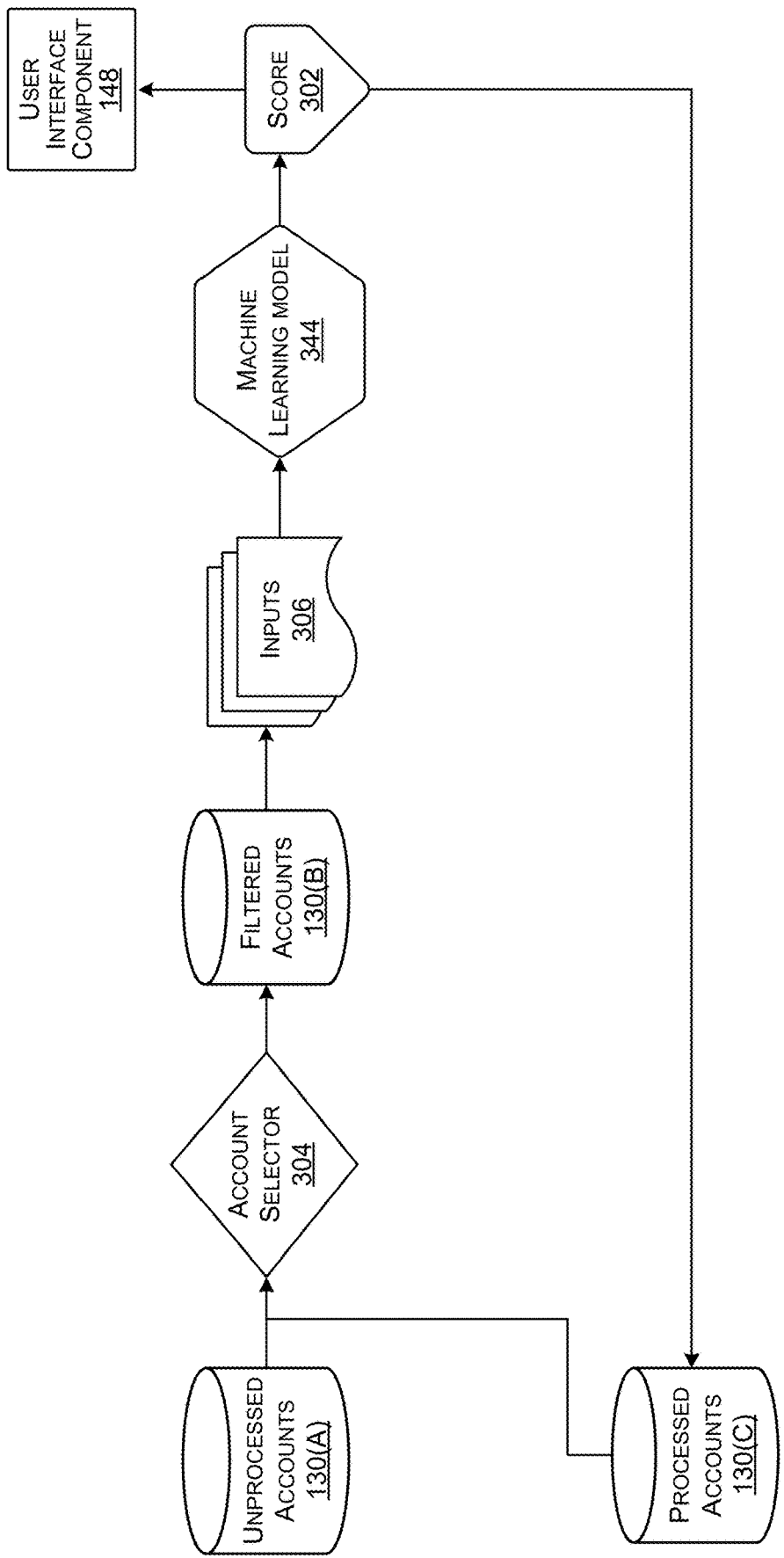
FIG. 3 is an example user account classification workflow, according to an implementation of the present subject matter.

FIG. 3 is an example user account classification workflow 300, according to an implementation of the present subject matter. The workflow 300 represents an example technique of using a trained machine learning model(s) 344 (which is an example of the AI model(s) 144 described herein) to classify user accounts 130 into different user types 140 by outputting a score 302 indicative of, or otherwise relating to, a probability of a user account 130 being associated with a particular user type 140. Consider an example where the trained machine learning model(s) 344 is configured to output a score 302 between zero and one, where a score 302 of one indicates a 100% probability of a user account 130 being associated with a particular user type 140 (e.g., a user type 140 representative of a teen who is less than 18 years of age), and where a score 302 of zero indicates a 0% probability of the user account 130 being associated with the particular user type 140. In some examples, a score 302 of one indicates that the user account 130 is a first user type 140 (e.g., a teen) and a score 302 of zero indicates that the user account 130 is a second user type 140 (e.g., an adult). In this example, the machine learning model 344 can be used to classify user accounts 130 as a particular user type 140 (e.g., a teen) or not the particular user type 140 (e.g., an adult) based at least in part on the score 302.

It is to be appreciated that the machine learning model(s) 344 depicted in FIG. 3 is merely an example and may include any suitable machine learning model(s) and/or may be replaced with any suitable AI model(s) 144 described herein. For example, the AI model(s) 144 (e.g., machine learning model(s) 344) described herein may represent a single model or an ensemble of base-level AI models and may be implemented as any type of AI model. For example, suitable AI models 144 for use by the techniques and systems described herein include, without limitation, LLMs, neural networks (e.g., GANs, deep neural networks (DNNs), recurrent neural networks (RNNs), etc.), tree-based models (e.g., eXtreme Gradient Boosting (XGBoost) models), support vector machines (SVMs), kernel methods, random forests, splines (e.g., multivariate adaptive regression splines), hidden Markov model (HMMs), Kalman filters (or enhanced Kalman filters), Bayesian networks (or Bayesian belief networks), multilayer perceptrons (MLPs), expectation maximization, genetic algorithms, linear regression algorithms, nonlinear regression algorithms, logistic regression-based classification models, or an ensemble thereof. An "ensemble" can comprise a collection of AI models 144 whose outputs (predictions) are combined, such as by using weighted averaging or voting. The individual AI models of an ensemble can differ in their expertise, and the ensemble can operate as a committee of individual AI models that is collectively "smarter" than any individual AI model of the ensemble.

In some examples, the classification component 146 may execute the workflow 300 offline, at any suitable cadence, such as once a day (e.g., nightly). Executing the workflow 300 involves running the machine learning model(s) 344, and running the machine learning model(s) 344 offline and/or at times of low traffic on the PSS 110 allows for using a more powerful machine learning model(s) 344 to classify user accounts 130 into different user types 140 with improved accuracy, with minimal disruption to the PSS 110, and without constrains on latency. Initially, an account selector 304 may select unprocessed users accounts 130(A) for classification as a particular user type 140, such as a user type 140 representative of a teen who is less than 18 years of age). The account selector 304 may be a subcomponent of the classification component 146 introduced above. In some examples, the account selector 304 may select unprocessed user accounts 130(A) that have never been classified before and/or the account selector 304 may select unprocessed user accounts 130(A) associated with previous classifications that have become outdated (e.g., accounts that have not been reclassified for at least a threshold amount of time, such as a threshold of 30 days, 60 days, etc.). In other words, in some examples, user accounts 130 are re-run through the workflow 300 periodically (e.g., every 30 days, every 60 days, etc.) to determine whether those user accounts 130 should be reclassified as a different user type 140 than they were previously. In some examples, a previously computed score 302 for a previously classified user account 130 is a factor in the account selector 304 determining whether to select the user account 130 for classification via the workflow 300. For example, user accounts 130 that previously received scores 302 within a predefine range of scores may be selected for reclassification more frequently than user accounts 130 that previously received scores 302 outside of the predefined range of scores. To illustrate, a user account 130 that previously received a score 302 of zero may be selected less frequently for classification via the workflow 300 than a user account 130 that previously received a score within a range of 0.3 to 0.8, or some other predefined range of scores. In some examples, the account selector 304 is configured to filter the unprocessed user accounts 130(A) to obtain filtered user accounts 130(B) by excluding a subset of the unprocessed user accounts 130(A), such as a subset of inactive user accounts. Accordingly, the account selector 304 may conserve resources (e.g., processing resources, power resources, etc.) by being selective about which user accounts 130 it selects for running through the workflow 300 and/or how frequently user accounts 130 are selected to be run through the workflow 300. For example, if a given user account 130 receives a score 302 of one or close to one (e.g., a score 302 of 0.9) on a first pass through the workflow 300 on Day 0, it is unlikely that the given user account 130 will receive a significantly different score 302 on the next day, Day 1. Accordingly, the account selector 304 can wait a sufficient period of time (e.g., 30 days, 60 days, etc.) before selecting unprocessed user accounts 130(A) that have been previously classified, and/or the account selector 304 can implement filtering criteria, as described above, to reduce the number of user accounts 130 that are being classified via the workflow 300, thereby conserving resources.

Once the filtered user accounts 130(B) are obtained by the account selector 304, inputs 306 associated with the filtered user accounts 130(B) are provided as input to the machine learning model(s) 344. In some examples, the inputs 306 represent the contextual data 116 associated with payments between the filtered user accounts 130(B) and other user accounts 130 of the payment service 108. In some examples, the contextual data 116 includes notes 202 associated with the payments (e.g., what the payment is for, such as items, music, etc.), network interactions 204 associated with the payments (e.g., who the filtered user accounts 130(B) are sending payments to and/or receiving payments from), or utilization patterns 206 (e.g., average payment amount, frequency of sending payments, frequency of receiving payments, frequency of group payments where funds amongst multiple user accounts 130 are pooled to make a payment, etc.) associated with the payments, location data indicating, for example, locations of user devices 104 associated with the filtered user accounts 130(B) at times at which the payments were made, proximity of user devices 104 of known family members involved in the payments, and/or the like, graph data representing P2P payment graphs associated with the filtered user accounts 130(B), emojis associated with the payments, payment failure metrics associated with the payments (e.g., certain user types 140 may request large sums of money from their friends as a joke, which results in payment failure because the request payment amount exceeds a limit imposed by the payment service 108), and/or the like.

In some examples, the inputs 306 represent contact book data 126 associated with the filtered user accounts 130(B) (e.g., a percentage of contacts in a contact book classified as a particular user type 140 (e.g., a teen), names of contacts in the contact book (e.g., Mom, Dad, Grandma, Grandpa, Jimmy, Timmy, J-Dawg, etc.), email address type (e.g., a .edu email addresses suggestive of contacts that are college students, work email addresses, etc.), image data in the contact book, such as profile pictures of contacts, etc.), card data 128 associated with (e.g., indicating usage of) payment instruments 134 associated with the filtered user accounts 130(B) (e.g., locations where the payment instruments 134 were used, payment amounts, usage frequency, card designs (e.g., stamps selected for placement on the payment instruments 134), etc.), user profile data 122 indicating profile information submitted by users 102 associated with the filtered user accounts 130(B), IDV data 124 indicating IDV attempts associated with the filtered user accounts 130(B), user data 120 associated with the filtered user accounts 130(B), and/or the like. These various types of data, which may be provided as inputs 306 to the machine learning model(s) 344, are described above in detail. In an example where the inputs 306 represent contact book data 126, if a given user account 130 is associated with a shared contact book with a high percentage of contacts that are classified as teens (which is an example of a user type 140), the given user account 130 may be more likely to be a teen than an adult. In another example where the inputs 306 represent contact book data 126, if a given user account 130 is associated with a shared contact book that includes names of contacts such as Mom, Dad, Grandma, Grandpa, J-Dawg, and/or the like, the names may be suggestive of the given user account 130 being a teen rather than an adult. In another example where the inputs 306 represent contact book data 126, if a given user account 130 is associated with a shared contact book that includes an above-threshold number of university/college email addresses, the given user account 130 may be more likely to be an adult than a teen. In another example where the inputs 306 represent contact book data 126, if a given user account 130 is associated with a shared contact book that includes profile pictures associated with contacts that include younger-looking faces and/or images of pop-culture that is trending with teens, the given user account 130 may be more likely to be a teen than an adult.

As mentioned above, the machine learning model(s) 344 may be configured to output a score 302 indicative of, or otherwise relating to, a probability of a filtered user account 130(B) being associated with a particular user type 140. In some examples, the score 302 is output as a value between zero and one, where a score 302 of one indicates a 100% probability of a user account 130 being associated with a particular user type 140 (e.g., a user type 140 representative of a teen who is less than 18 years of age), and where a score 302 of zero indicates a 0% probability of the user account 130 being associated with the particular user type 140. In some examples, the classification component 146 is configured to compare the score 302 to a threshold score to determine whether the score 302 satisfies the threshold score. A score 302 may satisfy a threshold score if the score 302 is equal to or greater than the threshold score, or if the score 302 is strictly greater than the threshold score. In some examples, a threshold score is utilized to determine whether the user account 130 is associated with the particular user type 140. For example, if the score 302 satisfies a threshold score, the classification component 146 may determine that the particular user account 130 is associated with a particular user type 140. Consider an example where a user account 130 receives a score 302 of 0.97 and the threshold score is set at 0.35. In this example, the score 302 satisfies the threshold score because the score 302 exceeds the threshold score, and, as a result, the classification component 146 may determine that the user account 130 is associated with a particular user type 140 (e.g., a user type 140 representative of a teen who is less than 18 years of age). The threshold score can be set to any suitable value, such as a threshold score of 0.3, 0.35, 0.4, 0.45, or any suitable value. In some examples, the value of the threshold score may be influenced by the performance of the AI model(s) 144 (e.g., machine learning model(s) 344) across various thresholds, where the selected threshold score is the threshold score that maximizes model performance. In some examples, model performance metrics include precision, recall, and/or prevalence. In some examples, the score 302, and/or a corresponding classification of the user account 130 as a particular user type 140, is stored in the datastore(s) 114. In some examples, the filtered user accounts 130(B) that have received scores 302 are designated as processed user accounts 130(C), which may include storing, in the account data 118, a time (e.g., a date, a time of day, etc.) at which the processed user accounts 130(C) were run through the workflow 300. In this way, the account selector 304 can utilize the time data to determine whether and when to reclassify the processed user accounts 130(C), as described herein.

In the example of FIG. 3, the classification component 146 can determine, based at least in part on the scores 302 assigned to the filtered user accounts 130(B), whether any of the filtered user accounts 130(B) are associated with a user type(s) 140 that requires an action(s) to be performed, such as an action(s) to request sponsorship from a parent or a guardian, an action(s) to complete an IDV workflow successfully, an action(s) to add a PIN and/or a biometric identifier to account data 118, and/or the like. In some examples, user accounts 130 that receive a score 302 that satisfies the threshold score are determined to be associated with a user type(s) 140 that requires the action(s) to be performed. Such user accounts 130 are identified for the user interface component 148, and the user interface component 148 is configured to send instructions (e.g., over the network(s) 112) to user devices 104 associated with the user accounts 130 and executing the payment application 106, the instructions causing the payment application 106 to present a user interface element(s) 150 prompting users 102 of the user devices 104 to perform the action(s).

Example user interfaces will now be described with reference to FIGS. 4A and 4B.

Figure 4:
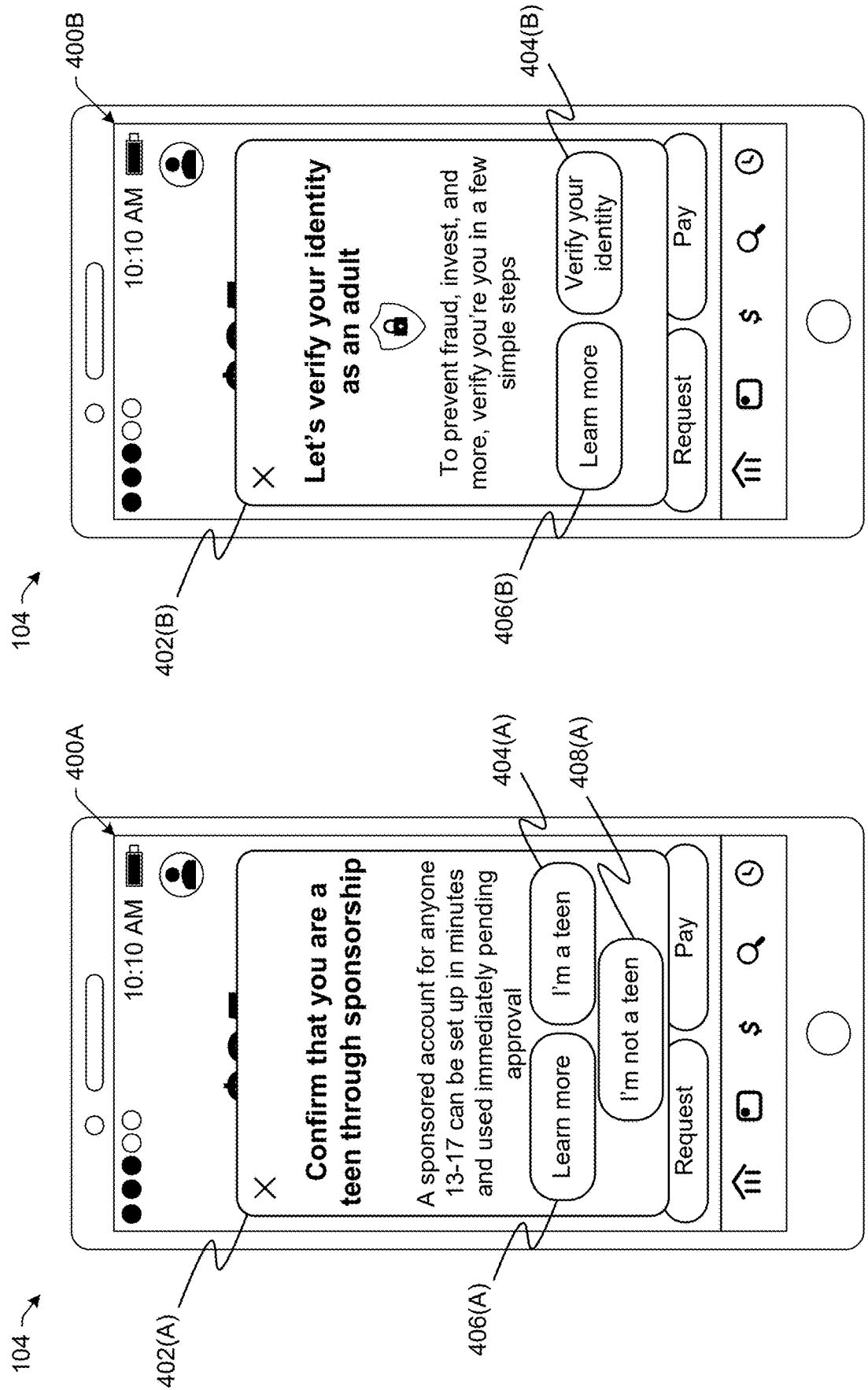
FIG. 4A is an example user interface of a payment application, the user interface presenting a user interface element prompting a user of a user device to perform an action(s), according to an implementation of the present subject matter.
FIG. 4B is an example user interface of a payment application, the user interface presenting another user interface element prompting a user of a user device to perform an action(s), according to an implementation of the present subject matter.

FIG. 4A is an example user interface 400A of a payment application 106, the user interface 400A presenting a user interface element 402(A) prompting a user 102 of a user device 104 to perform an action(s), according to an implementation of the present subject matter. The user interface 400A may be the same as, or similar to, the user interface 152 depicted in FIG. 1. The user interface 400A may be displayed at any suitable time after a user account 130 associated with the user device 104 has been determined to be associated with a user type 140 that requires an action(s) to be performed. In some examples, the user interface 400A is displayed in response to the user 102 opening the payment application 106. In some examples, the user interface 400A is displayed in response to the user 102 interacting with (e.g., selecting) an interactive element of the payment application 106, such as in response to the user 102 entering a payment amount to pay another user 102 of the payment service 108.

In the example of FIG. 4A, the user account 130 associated with the user device 104 may have been classified as a user type 140 representative of a teen who is less than 18 years of age. Accordingly, the user interface 400A includes a user interface element 402(A) (e.g., a pop-up element) that prompts the user 102 to request sponsorship from a parent or a guardian of the user 102. In the example of FIG. 4A, the user 102 may interact with (e.g., select) a first interactive element 404(A) to request sponsorship from a parent or a guardian, which may involve the user 102 navigating through one or more user interfaces to identify the user account 130 of their parent or guardian. In some examples, the user 102 may interact with (e.g., select) a second interactive element 406(A) to "learn more" about sponsorship. The account manager component 132 can store, in the datastore(s) 114, account data 118 indicating whether the particular user account 130 is an authorized account based at least in part on whether sponsorship was requested. For example, if the user 102 interacts with the first interactive element 404(A) to request sponsorship from a parent or a guardian, the user account 130 of the user 102 may be converted to an authenticated and/or authorized account by storing the corresponding account data 118 in association with the user account 130. In some examples, the user 102 may interact with (e.g., select) a third interactive element 408(A) to indicate that the user 102 is not a teen. In this scenario, upon interacting with (e.g., selecting) the third interactive element 408(A), the user 102 may be prompted to complete an IDV workflow, which may involve the user 102 navigating through one or more user interfaces to provide personal data and/or identifying information, as described above, which may be used to prove that the user 102 is not a teen.

FIG. 4B is an example user interface 400B of a payment application 106, the user interface 400B presenting another user interface element 402(B) prompting a user 102 of a user device 104 to perform an action(s), according to an implementation of the present subject matter. The user interface 400B may be the same as, or similar to, the user interface 152 depicted in FIG. 1. The user interface 400B may be displayed at any suitable time after a user account 130 associated with the user device 104 has been determined to be associated with a user type 140 that requires an action(s) to be performed. In some examples, the user interface 400B is displayed in response to the user 102 opening the payment application 106. In some examples, the user interface 400B is displayed in response to the user 102 interacting with (e.g., selecting) an interactive element of the payment application 106, such as in response to the user 102 entering a payment amount to pay another user 102 of the payment service 108.

In the example of FIG. 4B, the user account 130 associated with the user device 104 may have been classified as a user type 140 representative of an adult who is over 18 years of age, over 22 years of age, or some other age threshold indicative of an adult. Accordingly, the user interface 400B includes a user interface element 402(B) (e.g., a pop-up element) that prompts the user 102 to complete an IDV workflow. In the example of FIG. 4B, the user 102 may interact with (e.g., select) a first interactive element 404(B) to complete the IDV workflow, which may involve the user 102 navigating through one or more user interfaces to provide personal data and/or identifying information, as described above. In some examples, the user 102 may interact with (e.g., select) a second interactive element 406(B) to "learn more" about IDV. The account manager component 132 can store, in the datastore(s) 114, account data 118 indicating whether the particular user account 130 is an authorized account based at least in part on whether the IDV workflow was completed successfully. For example, if the user 102 interacts with the first interactive element 404(B) and subsequently completes the IDV workflow successfully, the user account 130 of the user 102 may be converted to an authenticated and/or authorized account by storing the corresponding account data 118 in association with the user account 130.

The user interfaces 152, 400A, and 400B, are provided as examples of user interfaces that can be presented to facilitate techniques described herein. User interfaces can present additional or alternative data in additional or alternative configurations. That is, user interfaces 152, 400A, and 400B should not be construed as limiting.

The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 5:
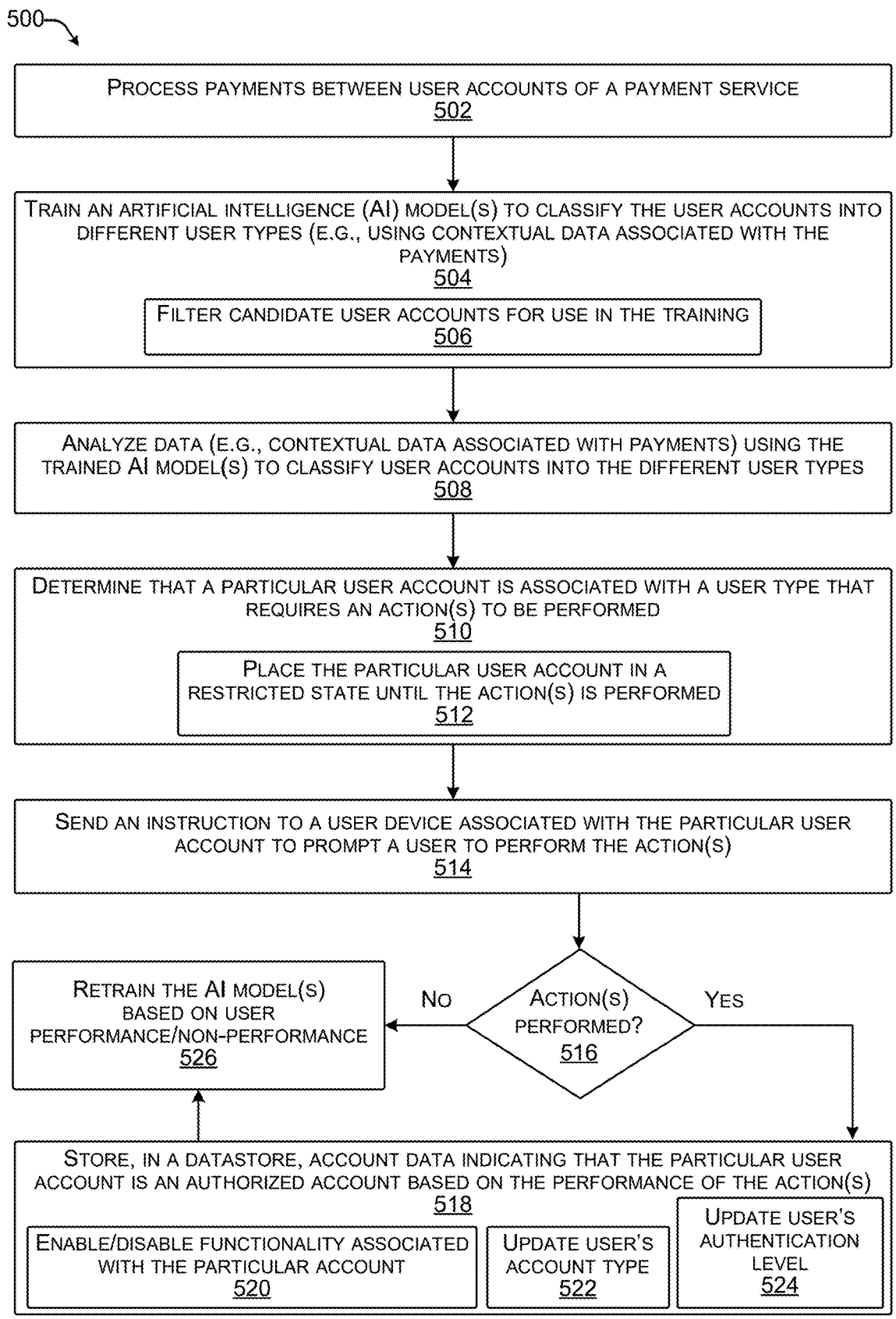
FIG. 5 is an example process for determining user types from behavior, and for prompting a user associated with a particular user type to perform an action(s) that, if performed, converts the user account from an unauthorized account to an authorized account, according to an implementation of the present subject matter.

FIG. 5 is an example process 500 for determining user types from behavior, and for prompting a user associated with a particular user type to perform an action(s) that, if performed, converts the user account from an unauthorized account to an authorized account, according to an implementation of the present subject matter. The process 500 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process 500. The process 500 can be implemented by a system including one or more processors and memory storing computer-executable instructions to cause the one or more processors to perform the process 500. In some examples, the process 500 can be implemented by a processing device(s) (e.g., a computing system and/or a server(s) of the PSS 110). For discussion purposes, the process 500 is described with reference to the previous figures.

At 502, payments between user accounts 130 of a payment service 108 are processed. In some examples, the payment processing component 138 of the PSS 110 may be executed to process the payments at block 502. In some examples, the payments processed at block 502 are associated with contextual data 116, as described herein. In some examples, the user accounts 130 are associated with different user types 140. As such, the contextual data 116 associated with the payments may be usable to train an AI model(s) 144. For example, contextual data 116 may be usable as a training dataset with the known user types 140 serving as labels of the training dataset. In some examples, each user type 140 is representative of an age range. It is to be appreciated, however, that the user types 140 may represent other user characteristics besides age, as described above.

At 504, an AI model(s) 144 is trained to classify the user accounts 130 into different user types 140, such as by using the contextual data 116 associated with the payments. In some examples, the training component 142 of the PSS 110 may be executed to train the AI model(s) 144 at block 504. In some examples, the AI model(s) 144 trained at block 504 is a machine learning model(s) 344. In some examples, the AI model(s) 144 (e.g., the machine learning model(s) 344) uses at least one of notes 202 associated with the payments, network interactions 204 associated with the payments, and/or utilization patterns 206 associated with the payments to determine, at block 504, which user type 140 of the different user types 140 is associated with a user account 130. For example, the contextual data 116 used for training the AI model(s) 144 (e.g., the machine learning model(s) 344) may include notes 202, network interactions 204, and/or utilization patterns 206, as described herein. In some examples, notes 202 used at block 504 indicate what the payment is for, such as items, music, etc. In some examples, network interactions 204 used at block 504 indicate who the user accounts 130 are sending payments to and/or receiving payments from. In some examples, utilization patterns 206 used at block 504 indicate an average payment amount, a frequency of sending payments, a frequency of receiving payments, a frequency of group payments, etc. In some examples, contextual data 116 used at block 504 includes location data indicating, for example, locations of user devices 104 associated with the user accounts 130 at times at which the payments were made, proximity of user devices 104 of known family members involved in the payments, and/or the like, graph data representing P2P payment graphs associated with the user accounts 130, emojis associated with the payments, payment failure metrics associated with the payments, and/or the like. In some examples, the data used for training at block 504 (e.g., the contextual data 116) is formatted into a string(s) 200, as described above with reference to FIG. 2.

In some examples, the AI model(s) 144 (e.g., the machine learning model(s) 344) is trained at block 504 using other data besides contextual data 116 associated with the payments, such as contact book data 126 associated with the user accounts 130, card data 128 indicating usage of payment instruments 134 associated with the user accounts 130, user profile data 122 indicating profile information submitted by users 102 associated with the user accounts 130, IDV data 124 indicating IDV attempts associated with the user accounts 130, user data 120 associated with the user accounts 130, and/or the like, as described herein. As shown by sub-block 506, in some examples, prior to the training at block 504, a plurality of candidate user accounts 130 are filtered to obtain the user accounts 130 for use in the training at block 504. For example, the training component 142 may filter a plurality of candidate user accounts 130 by excluding a subset of the plurality of candidate user accounts 130 that are associated with (i) user profile data 122 indicating that DOB information has been changed one or more times, and/or (ii) IDV data 124 indicating inconsistent IDV attempts. Such filtering of user accounts 130 may improve the quality of the training dataset.

At 508, data is analyzed using the AI model(s) 144 (e.g., the machine learning model(s) 344) to classify additional user accounts 130 of the payment service 108 into the different user types 140. In some examples, the classification component 146 of the PSS 110 may be executed to analyze the data using the AI model(s) 144 at block 508. In some examples, the data analyzed at block 508 includes additional contextual data 116 associated with additional payments between the additional user accounts 130. The additional contextual data 116 analyzed at block 508 may be the same as or similar to the contextual data 116 described above, such as the contextual data 116 described above as being used at block 504 to train the AI model(s) 144. In some examples, other data (besides additional contextual data 116 associated with the payments) is analyzed at block 508, such as contact book data 126 associated with the additional user accounts 130, card data 128 indicating usage of payment instruments 134 associated with the additional user accounts 130, user profile data 122 indicating profile information submitted by users 102 associated with the additional user accounts 130, IDV data 124 indicating IDV attempts associated with the additional user accounts 130, user data 120 associated with the additional user accounts 130, and/or the like, as described herein. In some examples, the data analyzed at block 508 may correspond to the data represented by the inputs 306 discussed above with reference to FIG. 3. In some examples, prior to the analyzing at block 508, at least some of the additional user accounts 130 are selected for classification into the different user types 140 based at least in part on determining that a predefined period of time has lapsed since the AI model(s) 144 was last used to classify the at least some of the additional user accounts 130 into the different user types 140. For example, the account selector 304 described above with reference to FIG. 3 may be used to select the additional user accounts 130 for classification.

At 510, a determination is made, based at least in part on the analyzing at block 508, that a particular user account 130 of the additional user accounts 130 is associated with a user type 140 of the different user types 140 that requires an action(s) to be performed. In some examples, the classification component 146 of the PSS 110 may be executed to make the determination at block 510. In some examples, the determination is made at block 510 based at least in part on a score or a classification output by the AI model(s) 144. In some examples, the determination is made at block 510 based at least in part on a score (e.g., the score 302) output by the AI model(s) 144 satisfying a threshold score. As shown by sub-block 512, in some examples, in response to the determining that the particular user account 130 is associated with the user type 140 at block 510, the particular user account 130 is placed in a restricted state until the action(s) is performed. For example, the user 102 associated with the user account 130 may be unable to access certain features and/or functionality of the payment service 108 while their user account 130 is placed in the restricted state.

At 514, an instruction is sent to a user device 104 associated with the particular user account 130 and executing a payment application 106 associated with the payment service 108, the instruction causing the payment application 106 to present a user interface element (e.g., the user interface element 150, the use interface element 402(A), the user interface element 402(B), etc.) prompting a user 102 of the user device 104 to perform the action(s). In some examples, the user interface component 148 of the PSS 110 may be executed to send the instruction at block 514. In some examples, the instruction may include, or may be sent with, data that, when received by the user device 104, causes the payment application 106 to present the user interface element. In some examples, the instruction causes the user payment application 106 to present the user interface element in response to the user 102 opening the payment application 106 and/or interacting with the payment application 106 in a particular way (e.g., by attempting to make a payment).

At 516, a determination is made as to whether the action(s) is performed. In some examples, the user interface component 148 of the PSS 110 may be executed to make the determination at block 516. In some examples, the determination is made at block 516 based at least in part on the PSS 110 receiving an indication that the user 102 interacted with (e.g., selected) an interactive element being presented via the payment application 106, such as the interactive element 154, the interactive element 404(A), the interactive element 404(B), etc. If a determination is made, at block 516, that the action(s) is performed, the process 500 follows the YES route from block 516 to block 518.

At 518, account data 118 is stored in a datastore 114, the account data 118, indicating that the particular user account 130 is an authorized account based at least in part on the action(s) having been performed. In some examples, the account manager component 132 of the PSS 110 may be executed to store the account data at block 518. Performing the action(s) may include requesting sponsorship from a parent or a guardian of the user 102, completing an IDV workflow successfully, and/or adding at least one of a PIN or a biometric identifier to the account data 118. In some examples, the account data 118 stored at block 518 indicates that the particular user account 130 is an authorized user account based at least in part on determining that the particular user account 130 is not fraudulent, verified by completing the IDV workflow successfully, approved to perform an operation, and/or linked to a sponsor.

As shown by sub-block 520, in some examples, a functionality associated with the payment service 108 is enabled or disabled for the particular user account 130 based at least in part on whether the action(s) was performed. For example, performance of the action(s) may unlock, for the particular user account 130, certain features and/or functionality that was inaccessible to the particular user account 130 prior to performance of the action(s) (e.g., such as increased spending limits, an offer to obtain the payment instrument 134, discounts, incentives, etc.). As another example, performance of the action(s) may restrict, for the particular user account 130, certain features and/or functionality, which may be the case if the particular user account 130 is classified as a teen and performing the action(s) includes requesting sponsorship from a parent or a guardian, which may help to safeguard the teen on the PSS 110 through restriction of features and/or functionality. As shown by sub-block 522, in some examples, a type of the particular user account 130 is updated in the account data 118 based at least in part on whether the action(s) was performed. For instance, performance of the action(s) may be taken, by the PSS 110, as an affirmation from the user 102 that the AI-generated output correctly classified the particular user account 130 as the user type 140, and the type of the particular user account 130 may be updated based on this affirmation from the user 102. As shown by sub-block 524, in some examples, an authentication level associated with the particular user account 130 is updated in the account data 118 based at least in part on whether the action(s) was performed. In some examples, users 102 that have achieved a higher authentication level (e.g., through IDV or otherwise) may be permitted to engage with features and/or functionality of the payment service 108 that is inaccessible to users 102 at lower authentication levels, such as tax features (e.g., a particular tax status associated with an authentication level may allow a user 102 to file their taxes using the payment application 106), lending and/or credit reporting features, legal ownership of account features, and/or the like.

Following block 518, or if a determination is made, at block 516, that the action(s) is not performed (e.g., after a timeout), in which case the process 500 follows the NO route from block 516, the process 500 may proceed to block 526. At 526, the AI model(s) 144 is retrained based at least in part on the performance or the non-performance of the action(s), as the case may be. In some examples, the training component 142 of the PSS 110 may be executed to retrain the AI model(s) at block 526. Retraining the AI model(s) 144 at block 526 can take a user's performance of the action(s) as positive reinforcement that the AI-generated output was accurate. Additionally, or alternatively, retraining the AI model(s) 144 at block 526 can take a user's non-performance of the action(s) as negative reinforcement that the AI-generated output may have been inaccurate.

Figure 6:
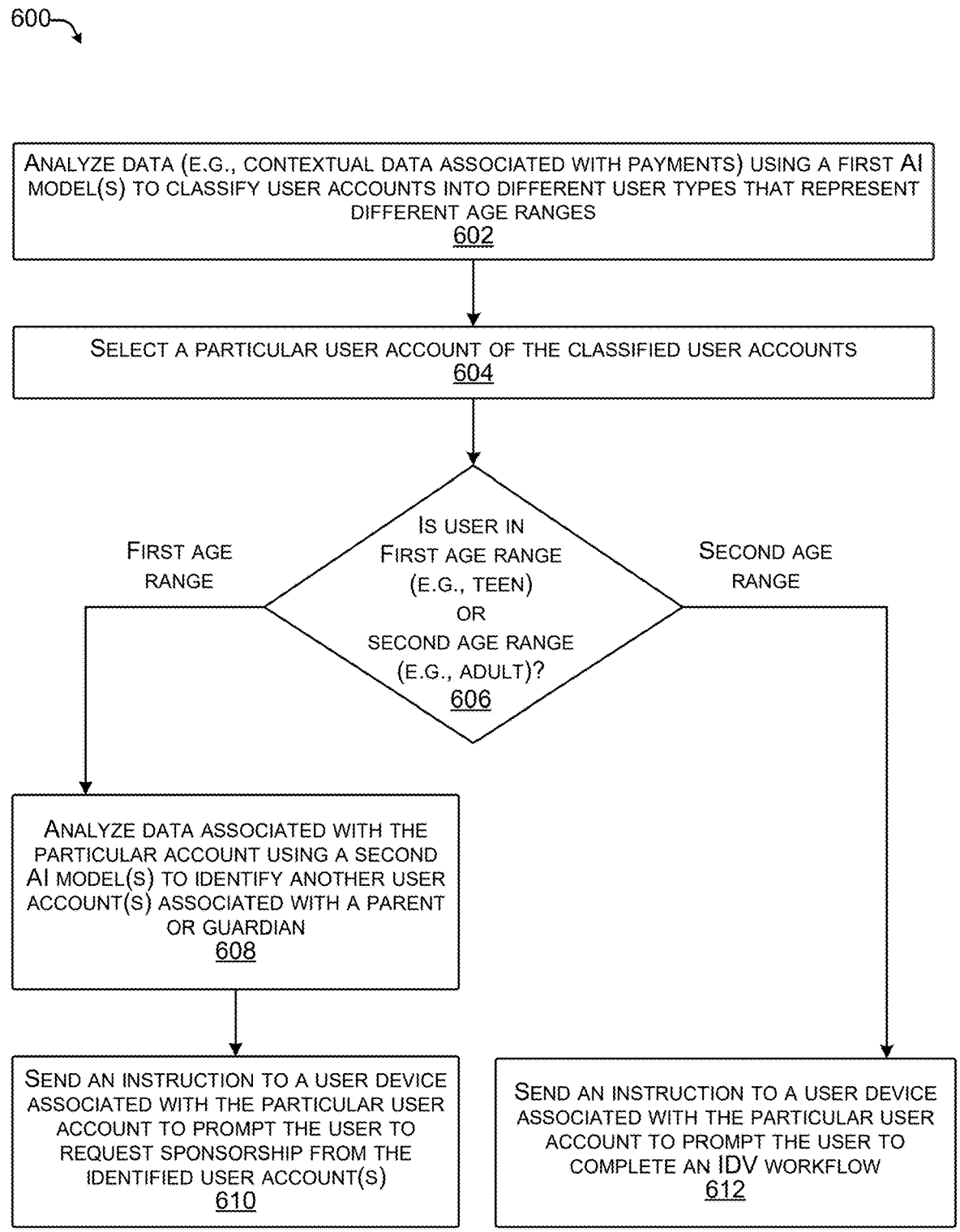
FIG. 6 is an example process for using multiple AI models, a first AI model being used to determining age ranges of users, a second AI model being used to identify parents or guardians of users classified in a first age range, according to an implementation of the present subject matter.

FIG. 6 is an example process 600 for using multiple AI models, a first AI model being used to determining age ranges of users, a second AI model being used to identify parents or guardians of users classified in a first age range, according to an implementation of the present subject matter. The process 600 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process 600. The process 600 can be implemented by a system including one or more processors and memory storing computer-executable instructions to cause the one or more processors to perform the process 600. In some examples, the process 600 can be implemented by a processing device(s) (e.g., a computing system and/or a server(s) of the PSS 110). For discussion purposes, the process 600 is described with reference to the previous figures.

At 602, data is analyzed using a first AI model(s) 144 (e.g., a first machine learning model(s) 344) to classify user accounts 130 of the payment service 108 into the different user types 140 that represent different age ranges. In some examples, the classification component 146 of the PSS 110 may be executed to analyze the data using the AI model(s) 144 at block 602. In some examples, the data analyzed at block 602 includes contextual data 116 associated with payments between the user accounts 130. The contextual data 116 analyzed at block 602 may be the same as or similar to the contextual data 116 described above, such as the contextual data 116 described above as being used at block 508 of the process 500. In some examples, other data (besides contextual data 116 associated with the payments) is analyzed at block 602, such as contact book data 126 associated with the user accounts 130, card data 128 indicating usage of payment instruments 134 associated with the user accounts 130, user profile data 122 indicating profile information submitted by users 102 associated with the user accounts 130, IDV data 124 indicating IDV attempts associated with the user accounts 130, user data 120 associated with the user accounts 130, and/or the like, as described herein. In some examples, the data analyzed at block 602 may correspond to the data represented by the inputs 306 discussed above with reference to FIG. 3. In some examples, the different user types 140 into which the user accounts 130 are classified at block 602 include a first user type 140 representative of a first age range and a second user type 140 representative of a second age range greater than the first age range. In some examples, the different user types 140 include three or more user types 140 for a more granular classification approach.

At 604, a particular user account 130 of the user accounts 130 classified at block 602 is selected. In some examples, the classification component 146 of the PSS 110 may be executed to select the particular user account 130 at block 604. In some examples, the selection of the particular user account 130 is random. In some examples, the selection of the particular user account 130 is based on one or more factors, such as the particular user account 130 having been classified as a particular user type 140 representative of a particular age range.

At 606, a determination is made as to whether the particular user account 130 selected at block 604 is associated with a user 102 who is in a first age range (e.g., less than 18 years of age, representative of a teen) or a second age range (e.g., 18 years of age or older, representative of an adult). In some examples, the classification component 146 of the PSS 110 may be executed to make the determination at block 606. If it is determined that the particular user account 130 is associated with a user 102 who is in the first age range (e.g., less than 18 years of age, representative of a teen), the process 600 may follow the FIRST AGE RANGE route from block 606 to block 608.

At 608, data associated with the particular user account 130 is analyzed using a second AI model(s) 144 (e.g., a second machine learning model(s) 344) to identify one or more user accounts 130 of the payment service 108 associated with the parent or the guardian of the user 102. That is, a second AI model(s) 144 may be used "on top of" the first AI model(s) 144 in a "layered model" approach to first identify a teen on the PSS 110, and to subsequently identify a parent or a guardian of the teen, as an example. The data analyzed using the second AI model(s) 144 at block 608 may be any of the data discussed above as being stored in the datastore 114.

At 610, an instruction is sent to a user device 104 associated with the particular user account 130 and executing a payment application 106 associated with the payment service 108, the instruction causing the payment application 106 to present a user interface element prompting a user 102 of the user device 104 to request sponsorship from at least one of the one or more user accounts 130 identified at block 608 using the second AI model(s) 144. In some examples, the user interface component 148 of the PSS 110 may be executed to send the instruction at block 610. In some examples, the instruction may include, or may be sent with, data that, when received by the user device 104, causes the payment application 106 to present the user interface element. In some examples, the instruction causes the user payment application 106 to present the user interface element in response to the user 102 opening the payment application 106 and/or interacting with the payment application 106 in a particular way (e.g., by attempting to make a payment).

Returning to block 606, if it is determined that the particular user account 130 is associated with a user 102 who is in the second age range (e.g., 18 years of age or older, representative of an adult), the process 600 may follow the SECOND AGE RANGE route from block 606 to block 612.

At 612, an instruction is sent to a user device 104 associated with the particular user account 130 and executing a payment application 106 associated with the payment service 108, the instruction causing the payment application 106 to present a user interface element prompting a user 102 of the user device 104 to complete an IDV workflow. In some examples, the user interface component 148 of the PSS 110 may be executed to send the instruction at block 612. In some examples, the instruction may include, or may be sent with, data that, when received by the user device 104, causes the payment application 106 to present the user interface element. In some examples, the instruction causes the user payment application 106 to present the user interface element in response to the user 102 opening the payment application 106 and/or interacting with the payment application 106 in a particular way (e.g., by attempting to make a payment).

In some examples, generative AI can be used with, or by, the techniques, devices, and systems described herein. For example, once a user account 130 is classified as a user type 140, the classification (e.g., the user type 140, such as an age range associated with the user account 130), and potentially additional data associated with the user account 130, can be provided as input to a generative AI model(s) (which is an example of an AI model(s) 144, as described herein) along with a prompt that asks the generative AI model(s) to suggest something to present to the user 102 associated with the user account 130. Consider an example where the generative AI model(s) receives a user type 140 representative of an age range between 13 and 15 years of age along with the aforementioned prompt. In this example, the generative AI model(s) may suggest outputting a prompt via the user device 104 of the user 102 prompting the user to give their user device 104 to a parent or a guardian. In this example, the user interface component 148 may receive the generative AI model's suggestion and may send an instruction the user device 104 associated with the user account 130 and executing a payment application 106 associated with the payment service 108, the instruction causing the payment application 106 to present a user interface element prompting the user 102 of the user device 104 to give their user device 104 to a parent or a guardian, which may help safeguard users 102 of the payment service 108 who are very young (e.g., below an age threshold, such as 15 years of age). This is merely an example of how generative AI can be used, and other uses are contemplated.

As mentioned above, users 102 may, in some examples, be prompted to create a PIN or to setup a biometric identifier. For example, a user account 130 may be classified as a user type 140 that requires adding a PIN and/or a biometric identifier to the account data 118, as described herein. This may be useful for user types 140 who may be more vulnerable (e.g., to identity theft or fraud in relation to their user account 130) than other user types 140 on the PSS 110, and/or for user types 140 that are high risk. A PIN and/or a biometric identifier (e.g., a fingerprint, face image/video, iris scan, voice signature, etc.) may provide additional security measures to certain user types 140 who may benefit from additional security measures in association with their user account 130. In some examples, particular users may be prompted to perform other security-related actions, such as enabling the PSS 110 to access the location of their user device 104, which may allow for setting up geographic proximity security measure for future payments. In some examples, particular users may be prompted to add a verified or trusted user to their user account 130, such as a trusted friend, family member, and/or a beneficiary who may be able to help the user in association with interacting with the PSS 110 and/or using the payment service 108. In an illustrative example, if a user account 130 is classified as a user type 140 representative of an age range that is 60 years of age or older (e.g., a senior), in order to provide an added layer of security for their future transactions on the PSS (e.g., so that the user 102 is prevented from accidentally sending large sums of money, cryptocurrency, etc. to an unintended recipient), the user 102 may be prompted to add a PIN, a biometric identifier, and/or a verified or trusted user to their user account 130.

In some examples, a security score can be computed for, and assigned to, user accounts 130. The security score may be indicative of a level of security achieved in association with the user account 130. For example, a high security score (e.g., a security score of one, on a scale of zero to one) may indicate that a user account 130 is very secure (e.g., from identity theft, fraud, etc.), whereas a low security score (e.g., a security score of zero) may indicate that a user account 130 is not very secure. The generation of the security score for a given user account 130 may be based at least in part on contextual data 116 associated with payments involving the given user account 130 (e.g., payment activity), an amount of progress through an IDV workflow, whether, and/or in what context, the user 102 of the user account 130 has setup and/or used a PIN and/or a biometric identifier, whether the given user account 130 has activated an auto-fill functionality in the payment application 106

(e.g., to have the payment application 106 automatically fill forms and/or fields with predefined information), and/or the like. In some examples, user accounts 130 that have been assigned security scores that fail to satisfy a threshold security score (e.g., a security score below 0.3 on a scale of zero to one), can be prompted to add additional security measures, such as setting up a PIN, a biometric identifier, enabling multi-factor authentication (MFA), and/or providing permission to access the location of their user device 104, which may mitigate fraud on the PSS 110.

In some examples, the user types 140 described herein may be utilized to identify pairs and/or groups of user accounts 130 who may be associated with each other in some way (e.g., in a same family unit), and a joint balance may be recommended and/or created for the identified pairs and/or groups of user accounts 130 such that two or more users can manage money. For example, a pair of user accounts 130 that have both been classified as a user type 140 representative of an age range of 22 years of age or older may be identified as partners (e.g., a married couple). In some examples, user accounts 130 may be determined to be associated with each other based on an overlap of mutual connections and/or their shared contact books including another user account(s) 130 that has been classified as a particular user type 140 (e.g., a user type 140 representative of an age range less than 18 years of age (e.g., a teen) with a shared contact book that includes names associated with the pair of user accounts 130 (e.g., Mom and Dad), respectively). In these examples, user accounts 130 who are identified as being associated with each other (e.g., in a same family unit) may be prompted to setup a joint balance or a shared financial account, and/or a joint balance may be created automatically for the user accounts 130 and allowing the user accounts 130 to opt-out of an automatically created joint balance. In some examples, the user interface component 148 may send respective instructions to the user devices 104 associated with the identified user accounts 130, the instruction causing instances of the payment application 106 executing on the user devices 104 to output a user interface element recommending a type of joint balance and/or controls, tools, or the like around who can spend money from the joint balance, spending limits, etc.

In some examples, once a user account 130 is classified as a user type 140 representative of an age range that is less than a threshold age, particular restrictions may be implemented with respect to that user account 130 in order to safeguard the user 102 associated with that user account 130. For example, if a user account 130 is classified as a minor, the PSS 110 may restrict access of the user account 130 to certain content that is generally accessible via the PSS 110 to older users 102 of the PSS 110 (e.g., music or other audio content with a parental advisory label, movies and/or video streaming series above a particular rating, etc.), and/or to certain features and/or functionality of the payment service 108, such as reduced spending limits, permissions required to make payments, etc.

In some examples, once a user account 130 is classified as a user type 140, the user interface component 148 may be configured to generate one or more personalized offers for the user account 130. For example, the user interface component 148 may cause an interactive element to be presented on a user interface of a payment application 106 executing on a user device 104 associated with the user account 130. The interactive element may indicate, to the user 102, that they can have the payment service 108 generate a personalized offer for them. In this example, upon the user 102 interacting with (e.g., selecting) the interactive element, the PSS 110 may generate a personalized offer for the user account 130 and send the personalized offer to the user device 104 associated with the user account 130. In some examples, generative AI is used to generate such personalized offers for particular user types 140, which is yet another example way of using generative AI with, or by, the techniques, devices, and systems described herein.

Figure 7:
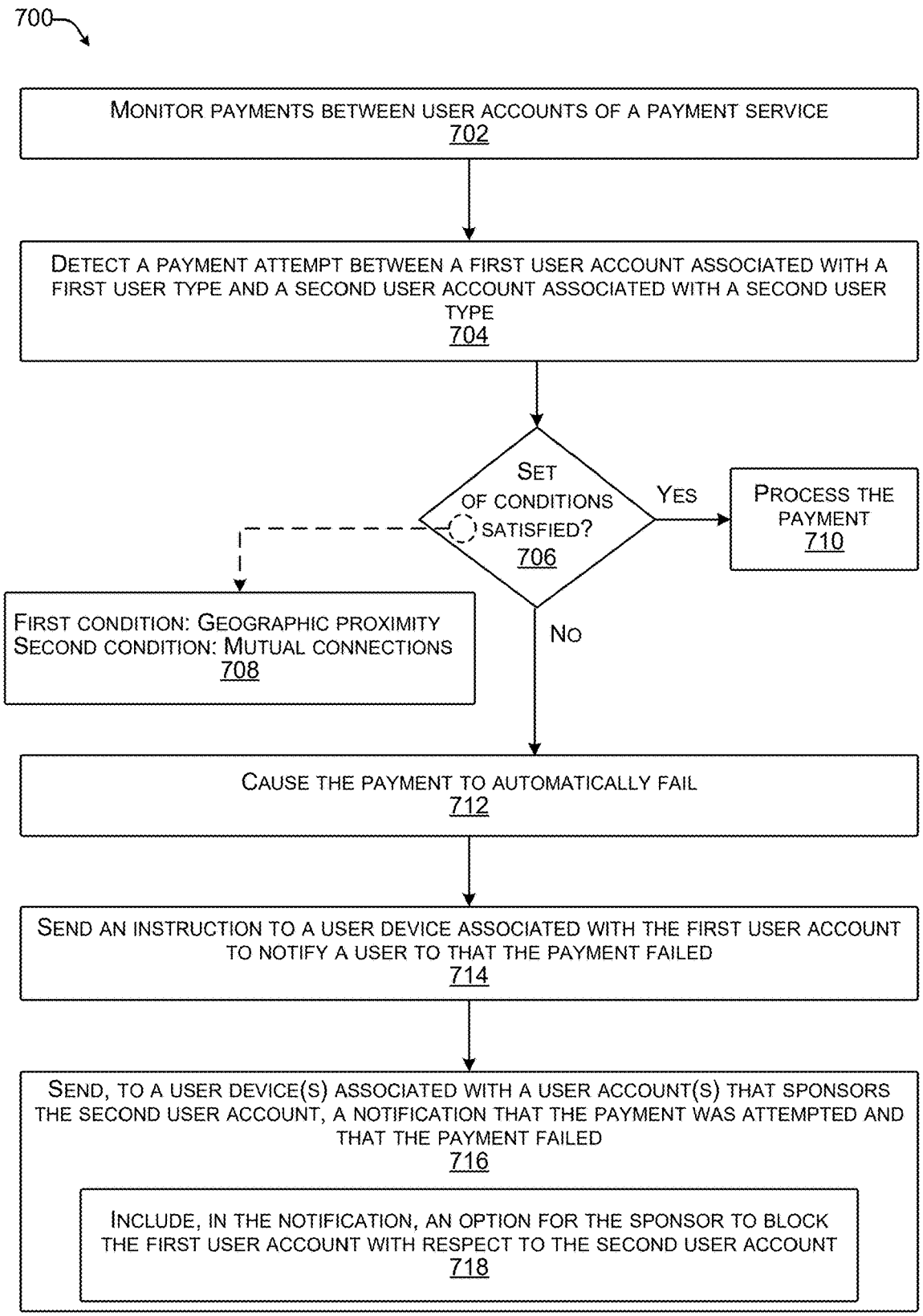
FIG. 7 is an example process for performing an automated action(s) for fraud reduction, according to an implementation of the present subject matter.

FIG. 7 is an example process 700 for performing an automated action(s) for fraud reduction, according to an implementation of the present subject matter. The process 700 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process 700. The process 700 can be implemented by a system including one or more processors and memory storing computer-executable instructions to cause the one or more processors to perform the process 700. In some examples, the process 700 can be implemented by a processing device(s) (e.g., a computing system and/or a server(s) of the PSS 110). For discussion purposes, the process 700 is described with reference to the previous figures.

At 702, payments between user accounts 130 of a payment service 108 are monitored to determine whether any of the user accounts 130 associated with a first user type 140 are attempting to pay any of the user accounts 130 associated with a second user type 140 that is different than the first user type 140. In some examples, the payment processing component 138 of the PSS 110 may be executed to monitor the payments at block 702. In some examples, account data 118 stored in a datastore 114 indicates different user types 140 associated with the user accounts 130 of the payment service 108. These user types 140 can be determined from behavior, as described herein, such as by performing the process 500, as described above. Accordingly, the payment processing component 138 may, for example, monitor a payment 136(1) sent from a user account 130 of a user 102(1) to another user account(s) 130 of another user 102, and the payment processing component 138 may access the account data 118 to determine the respective user types 140 associated with the user accounts 130 involved in the payment attempt.

At 704, a payment attempt is detected between a first user account 130 associated with the first user type 140 and a second user account 130 associated with the second user type 140. In some examples, the payment processing component 138 of the PSS 110 detects that the first user account 130 associated with the first user type 140 is attempting to make a payment to the second user account 130 associated with the second user type 140 at block 704. In some examples, the first user type 140 is representative of a first age range, and the second user type 140 is representative of a second age range different than the first age range. In some examples, the first user type 140 is representative of a first age range, and the second user type 140 is representative of a second age range less than the first age range and below an age threshold. For instance, the detection at block 704 may detect a payment attempt between an adult and a teen.

At 706, in response to the detecting at block 704, a determination is made as to whether a set of conditions is satisfied. In some examples, the payment processing component 138 of the PSS 110 may be executed to make the determination at block 706. In some examples, the determination is made at block 706 at or near a time of the detecting at block 704 (e.g., in real-time as the payment attempt is detected). As shown by sub-block 708, the set of conditions, in some examples, includes: (i) a first condition relating to geographic proximity, and a second condition relating to mutual connections. Accordingly, in some examples, the determination is made at block 706 using location data (e.g., location data included in the user data 120, location data included in the user profile data 122, location data obtained from user devices 104 or associated systems that track device location, etc.) and contact book data 126, which may be accessible to the PSS 110 (e.g., via the datastore(s) 114).

In an example, the first condition (relating to geographic proximity) is satisfied if a first location associated with the first user account 130 is within a threshold distance from a second location associated with the second user account 130. In some examples, the first location is a first verified location (e.g., mailing address) determined from first location data stored in the datastore(s) 114 in association with the first user account 130 and/or from user input provided by a first user 102 via a first user device 104 (e.g., via the payment application 106), and the second location is a second verified location (e.g., mailing address) determined from second location data stored in the datastore(s) 114 in association with the second user account 130 and/or from user input provided by a second user 102 via a second user device 104 (e.g., via the payment application 106). A verified location(s) may include a residential location(s) (e.g., home address), a work location(s) (e.g., work address), a trusted location(s) (e.g., a trusted address), a business location(s) (e.g., business address), and/or the like. The threshold distance may be any suitable distance, such as 20 miles, 30 miles, 40 miles, etc. To illustrate, if the threshold distance is set to 20 miles, the first condition is satisfied if the first location is within 20 miles of the second location (e.g., if the first user 102 associated with the first user account 130 lives within 20 miles of the second user 102 associated with the second user account 130, the first condition may be satisfied). In some examples, the first location is a first geographic location of a user device 104 associated with the first user account 130 at or near a time of the detecting at block 704. In some examples, the second location is a second geographic location of a user device 104 associated with the second user account 130 at or near a time of the detecting at block 704. In some examples, if the respective users 102 associated with the user accounts 130 consent to allowing the PSS 110 to access the respective locations of their user devices 104, the PSS 110 may obtain, at or near a time of the detecting at block 704, the location(s) of either or both user devices 104. Various technologies can be used to obtain such device locations, such as Geo tracking, GPS, IP addresses, cell tower triangulation, and/or the like. In some examples, location verification is used at block 706 to verify that a location reported by the user 102 and/or the user device 104 of the user 102 matches the actual location of the user 102 and/or the user device 104.

In some examples, the second condition (relating to mutual connections) is satisfied if a number of mutual connections of the first user account 130 and the second user account 130 satisfies a threshold number. In some examples, "mutual connections" of the first user account 130 and the second user account 130 means user accounts 130 of the payment service 108 that have shared contact books that include respective identifiers (e.g., aliases, names, etc.) associated with both the first user account 130 and the second user account 130. For example, a mutual connection of the first user account 130 and the second user account 130 may have a shared contact book with a first alias associated with the first user account 130 and a second alias associated with the second user account 130. In some examples, one or more matching algorithms may be used at block 706 to determine mutual connections of the first user account 130 and the second user account 130. For example, if a shared contact book includes a contact labeled with a nickname for a first user 102 associated with the first user account 130, the PSS 110 may be configured to analyze (e.g., search) data stored in the datastore(s) 114 for a match of the nickname to correlate the nickname with the first user account 130. For example, the PSS 110 may search user data 120, user profile data 122, notes 202 associated with payments, other shared contact books in the contact book data 126, and/or the like to identify a correlation between the nickname and the first user account 130. In some examples, users 102 may setup multiple user accounts 130 (e.g., personal accounts, business accounts, etc.), and the determination of a mutual connection at block 706 may include correlating the different user accounts 130 that may be associated with the same user 102. The threshold number of mutual connections can be any suitable number, such as one mutual connection, two mutual connections, three mutual connections, etc. To illustrate, if the threshold number of mutual connections is set to one mutual connection, the second condition is satisfied if there is at least one mutual connection of the first user account 130 and the second user account 130 on the PSS 110 (e.g., if there is at least one user account 130 of the payment service 108 that has a shared contact book that include respective identifiers (e.g., aliases, names, etc.) associated with both the first user account 130 and the second user account 130).

If, at block 706, a determination is made that the set of conditions is satisfied, the process 700 follows the YES route from block 706 to block 710, where the payment is processed. If, at block 706, a determination is made that the set of conditions is not satisfied, the process 700 follows the NO route from block 706 to block 712.

At 712, in response to determining that the set of conditions is not satisfied, the payment is caused to automatically fail. In some examples, the payment processing component 138 of the PSS 110 may be executed to cause automatic failure of the payment at block 712. In the example described above, the set of conditions includes at least two conditions. Accordingly, the payment may be caused to automatically fail at block 712 in response to determining at least one of: (i) that the first location is not within the threshold distance from the second location, or (ii) that the number of mutual connections fails to satisfy the threshold number (e.g., that the number of user accounts 130 that have shared contact books that include respective identifiers associated with both the first user account 130 and the second user account 130 fails to satisfy the threshold number).

At 714, an instruction is sent to a user device 104 associated with the first user account 130 and executing a payment application 106 associated with the payment service 108, the instruction causing the payment application 106 to present a user interface element(s) notifying a user 102 of the user device 104 that the payment failed. In some examples, the user interface component 148 of the PSS 110 may be executed to send the instruction at block 714. In some examples, the instruction may include, or may be sent with, data that, when received by the user device 104, causes the payment application 106 to present the user interface element.

At 716, a notification is sent to one or more user devices 104 associated with one or more user accounts 130 that sponsor the second user account 130 as a parent or a guardian, the notification indicating that the payment was attempted, and that the payment failed. In some examples, the user interface component 148 of the PSS 110 may be executed to send the notification at block 716. In some examples, the notification is sent as a banner notification via the payment application 106 while the payment application 106 is executing in the background (e.g., while the payment application 106 is not currently open on the user device(s) 104). In some examples, the notification causes the payment application 106 executing in the background to move to a foreground on the user device(s) 104 to conspicuously notify the user(s) 102 of the failed payment attempt. In some examples, the notification is sent as a short message service (SMS) text message, an email, and/or the like. As shown by sub-block 718, in some examples, the notification includes a selectable option to block the first user account 130 from making future payments to the second user account 130. For instance, if the payment attempt is from an adult to a teen, the parent or guardian may be given an option to block the adult from making future payments to the teen. In some examples, other functionality may be blocked via a similar mechanism, such as blocking a chat functionality, payment request functionality, and/or the like.

Figure 8:
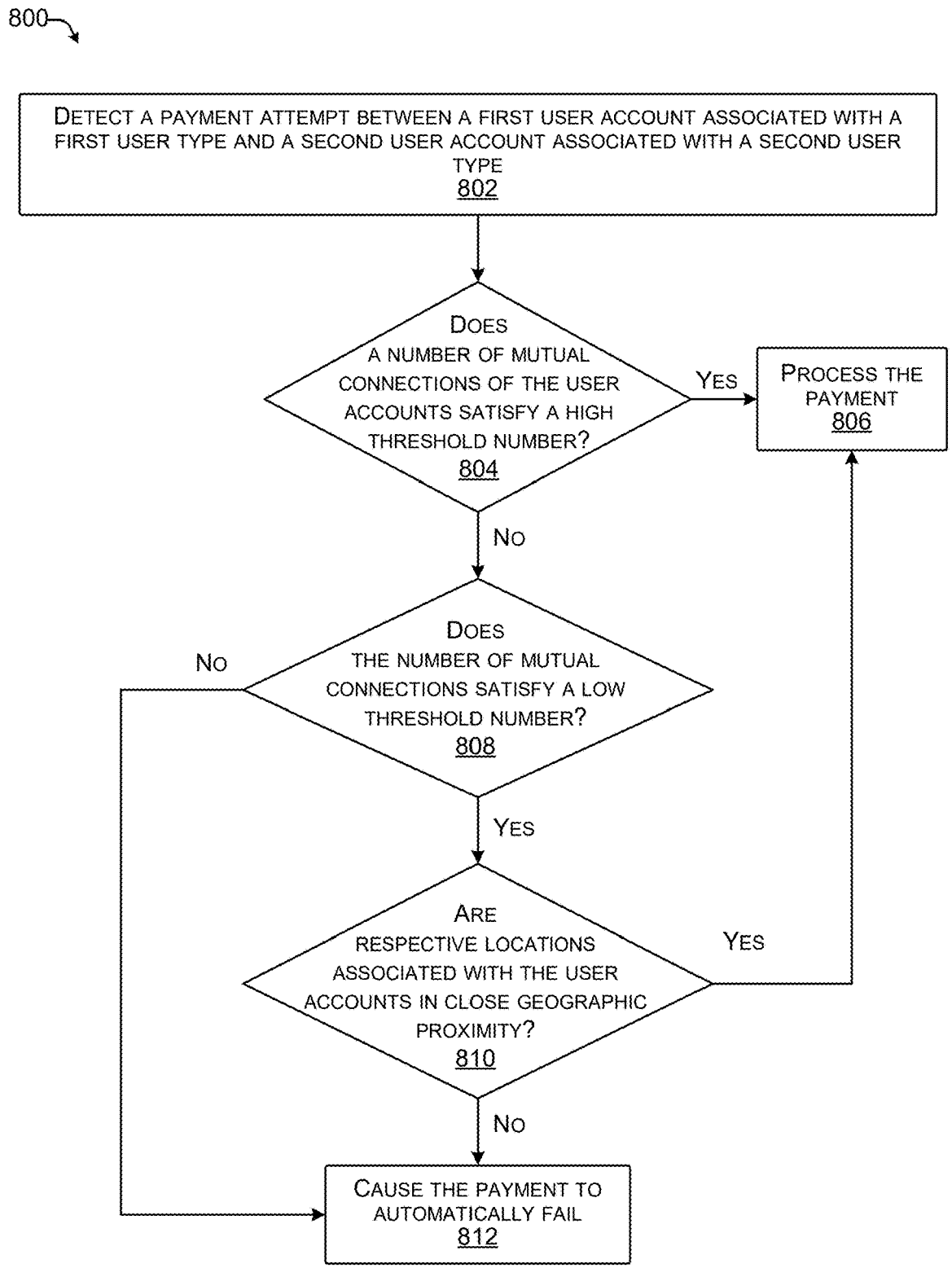
FIG. 8 is another example process for performing an automated action(s) for fraud reduction, according to an implementation of the present subject matter.

FIG. 8 is another example process 800 for performing an automated action(s) for fraud reduction, according to an implementation of the present subject matter. The process 800 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process 800. The process 800 can be implemented by a system including one or more processors and memory storing computer-executable instructions to cause the one or more processors to perform the process 800. In some examples, the process 800 can be implemented by a processing device(s) (e.g., a computing system and/or a server(s) of the PSS 110). For discussion purposes, the process 800 is described with reference to the previous figures.

At 802, a payment attempt is detected between a first user account 130 associated with a first user type 140 and a second user account 130 associated with a second user type 140. In some examples, the payment processing component 138 of the PSS 110 detects that the first user account 130 associated with the first user type 140 is attempting to make a payment to the second user account 130 associated with the second user type 140 at block 802. In some examples, the first user type 140 is representative of a first age range, and the second user type 140 is representative of a second age range different than the first age range. In some examples, the first user type 140 is representative of a first age range, and the second user type 140 is representative of a second age range less than the first age range and below an age threshold. For instance, the detection at block 802 may detect a payment attempt between an adult and a teen.

At 804, in response to the detecting at block 802, a determination is made as to whether a number of mutual connections of the first user account 130 and the second user account 130 satisfies a high (second) threshold number. In some examples, the payment processing component 138 of the PSS 110 may be executed to make the determination at block 804. In some examples, the determination is made at block 804 at or near a time of the detecting at block 802 (e.g., in real-time as the payment attempt is detected). In some examples, "mutual connections" of the first user account 130 and the second user account 130 means user accounts 130 of the payment service 108 that have shared contact books that include respective identifiers (e.g., aliases, names, etc.) associated with both the first user account 130 and the second user account 130, as described above. The high (second) threshold number of mutual connections can be any suitable number, such as five mutual connections, ten mutual connections, fifteen mutual connections, etc. To illustrate, if the high (second) threshold number of mutual connections is set to five mutual connections, the high (second) threshold may be satisfied if there are at least five mutual connections of the first user account 130 and the second user account 130 on the PSS 110 (e.g., if there are at least five user accounts 130 of the payment service 108 that have shared contact books that include respective identifiers (e.g., aliases, names, etc.) associated with both the first user account 130 and the second user account 130).

If, at block 804, a determination is made that the number of mutual connections of the first user account 130 and the second user account 130 satisfies the high (second) threshold number, the process 800 follows the YES route from block 804 to block 806, where the payment is processed. If, at block 804, a determination is made that the number of mutual connections of the first user account 130 and the second user account 130 fails to satisfy the high (second) threshold number, the process 800 follows the NO route from block 804 to block 808.

At 808, in response to determining, at block 804, that the number of mutual connections of the first user account 130 and the second user account 130 fails to satisfy the high (second) threshold number, a determination is made as to whether a number of mutual connections of the first user account 130 and the second user account 130 satisfies a low (first) threshold number. In some examples, the payment processing component 138 of the PSS 110 may be executed to make the determination at block 808. In some examples, the determination is made at block 808 at or near a time of the detecting at block 802 (e.g., in real-time as the payment attempt is detected). The low (first) threshold number of mutual connections can be any suitable number, such as one mutual connection, two mutual connections, three mutual connections, etc., so long as the low (first) threshold number is less than the high (second) threshold number To illustrate, if the low (first) threshold number of mutual connections is set to one mutual connection, the low (first) threshold may be satisfied if there is at least one mutual connection of the first user account 130 and the second user account 130 on the PSS 110 (e.g., if there is at least one user account 130 of the payment service 108 that has a shared contact book that include respective identifiers (e.g., aliases, names, etc.) associated with both the first user account 130 and the second user account 130).

If, at block 808, a determination is made that the number of mutual connections of the first user account 130 and the second user account 130 satisfies the low (first) threshold number, the process 800 follows the YES route from block 808 to block 810. At 810, in response to determining, at block 808, that the number of mutual connections of the first user account 130 and the second user account 130 satisfies the low (first) threshold number, a determination is made as to whether a first location associated with the first user account 130 is within a threshold distance from a second location associated with the second user account 130. In some examples, the first location is a first verified location (e.g., mailing address) determined from first location data stored in the datastore(s) 114 in association with the first user account 130, and the second location is a second verified location (e.g., mailing address) determined from second location data stored in the datastore(s) 114 in association with the second user account 130. The threshold distance may be any suitable distance, such as 20 miles, 30 miles, 40 miles, etc. In some examples, the first location is a first geographic location of a user device 104 associated with the first user account 130 at or near a time of the detecting at block 802. In some examples, the second location is a second geographic location of a user device 104 associated with the second user account 130 at or near a time of the detecting at block 802. In some examples, if the respective users 102 associated with the user accounts 130 consent to allowing the PSS 110 to access the respective locations of their user devices 104, the PSS 110 may obtain, at or near a time of the detecting at block 802, the location(s) of either or both user devices 104. The various technologies mentioned above can be used to obtain such device locations at block 810, such as Geo tracking, GPS, IP addresses, cell tower triangulation, and/or the like.

If, at block 810, a determination is made that the first location associated with the first user account 130 is within the threshold distance from the second location associated with the second user account 130, the process 800 follows the YES route from block 810 to block 806, where the payment is processed. If, at block 808, a determination is made that the number of mutual connections of the first user account 130 and the second user account 130 fails to satisfy the low (first) threshold number, the process 800 follows the NO route from block 808 to block 812. Alternatively, if, at block 810, a determination is made that the first location associated with the first user account 130 is not within the threshold distance from the second location associated with the second user account 130, the process 800 follows the NO route from block 810 to block 812.

At 812, the payment is caused to automatically fail. In some examples, the payment processing component 138 of the PSS 110 may be executed to cause automatic failure of the payment at block 812. Accordingly, the process 700 and the process 800 involve evaluating a set of conditions with respect to certain payment attempts to determine whether the set of conditions is satisfied before authorizing an attempted payment between a first user account 130 associated with a first user type 140 and a second user account 130 associated with a second user type 140. These processes (700 and 800) mitigate fraud on the PSS 110, thereby providing additional technical benefits because the PSS 110 is not burdened with processing as many transactions that are fraudulent, non-compliant, or otherwise illegitimate, thereby conserving resources for processing more legitimate transactions. Furthermore, certain user types 140 (e.g., teens, minors, etc.) are safeguarded on the PSS 110.

Figure 9:
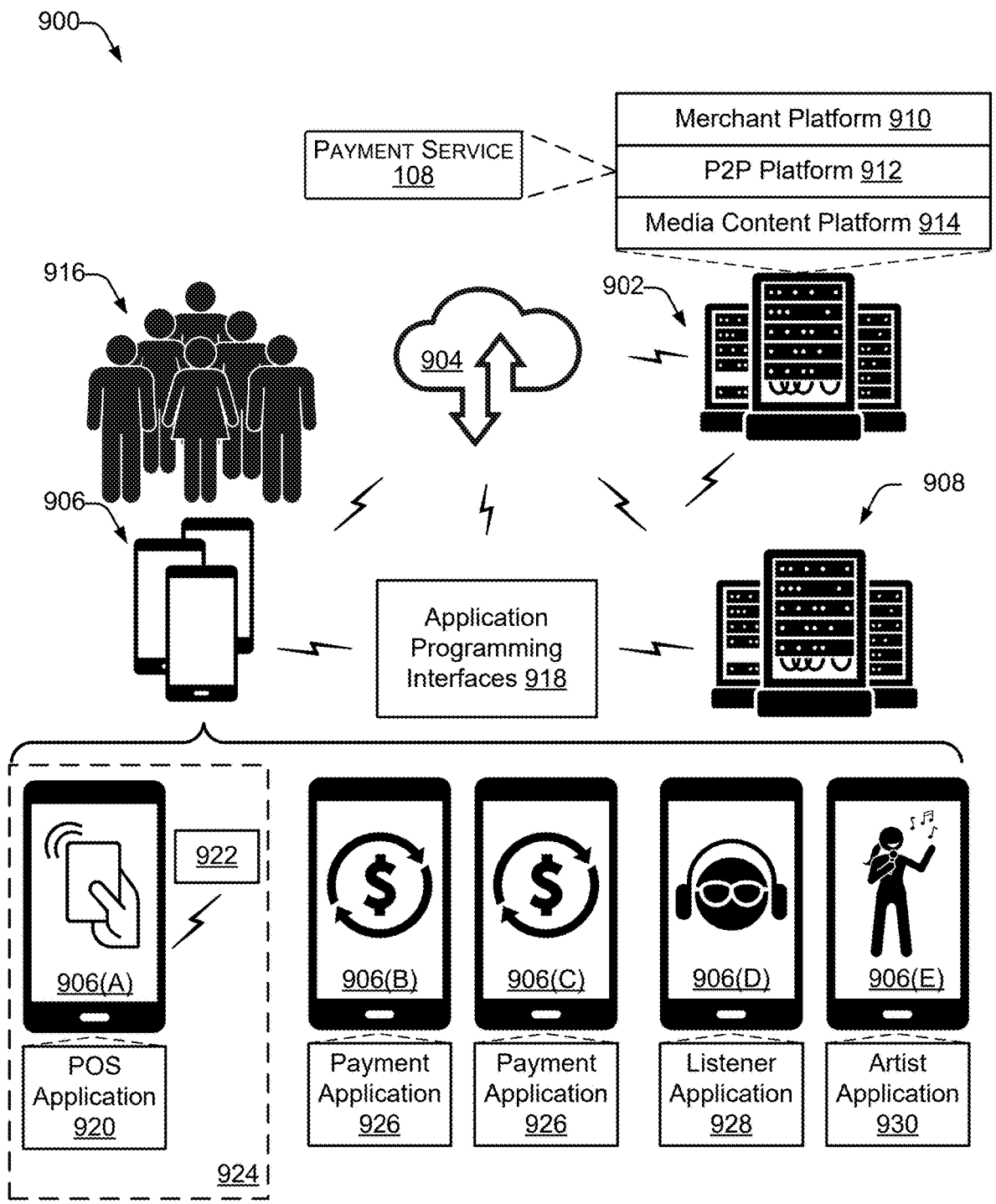
FIG. 9 is an example environment for performing techniques described herein.

FIG. 9 illustrates an example environment 900. The environment 900 includes server(s) 902 that can communicate over a network 904 with end user devices 906 and/or server(s) 908 associated with third-party service provider(s).

In various examples, the end user devices 906 may comprise one or more seller devices 906(A), one or more user devices 906(B) and/or 906(C) in a peer network, one or more content consumption devices 906(D), one or more artist user devices 906(E), combinations of these examples, or other categories of user devices. The server(s) 902 can be associated with one or more service providers that can provide one or more services for the benefit of users 916, as described below. For example, the server(s) 902 may enable services of service providers such as in association with a merchant platform 910 (which may further include a buyer platform), a peer-to-peer (P2P) payment platform 912, a media content platform 914, a combination of these platforms, or other platforms associated with other service providers. While services and features are referenced throughout in connection with a particular one of the merchant platform 910, the P2P payment platform 912, or the media content platform 914, it should be understood that any of these platforms may perform the functionality described in relation to any of the other platforms. Actions attributed to the service provider(s) can be performed by the server(s) 902.

In some examples, the server(s) 902 may be the same as or similar to the server(s) of the PSS 110 introduced in FIG. 1, and the server(s) 902 may implement the payment service 108. Accordingly, the server(s) 902 may include the account manager component 132, the payment processing component 138, the training component 142, the AI model(s) 144, the classification component 146, and/or the user interface component 148, as described herein. Furthermore, the end user device(s) 906 may be the same as or similar to the user device 104 introduced in FIG. 1, the users 916 may be the same as or similar to the users 102 introduced in FIG. 1, and the network(s) 904 may be the same as or similar to the network(s) 112 introduced in FIG. 1. In addition, the application(s) 926 may be the same as or similar to the payment application 106 introduced in FIG. 1.

In accordance with the examples described herein, the server(s) 902 may facilitate determining user types from behavior. The server(s) 902 may process payments between user accounts of a payment service 108, and train an AI model to classify the user accounts into different user types using contextual data associated with the payments. The server(s) 902 may analyze, using the AI model, additional contextual data associated with additional payments between additional user accounts of the payment service 108 to classify the additional user accounts, and determine, based at least in part on the analyzing, that a particular user account of the additional user accounts is associated with a user type of the different user types that requires an action to be performed. The server(s) 902 may send an instruction to a user device 906 associated with the particular user account and executing a payment application 926 associated with the payment service 108, the instruction causing the payment application 926 to present a user interface element prompting a user 916 of the user device 906 to perform the action. The server(s) 902 may store, in a datastore, account data indicating whether the particular user account is an authorized account based at least in part on whether the action was performed.

In accordance with the examples described herein, the server(s) 902 may facilitate performing automated actions for fraud reduction. The server(s) 902 may detect that a first user account associated with a first user type is attempting to make a payment to a second user account associated with a second user type, and, in response to the detecting, may determine whether a set of conditions is satisfied, the set of conditions comprising: (i) a first condition that a first location associated with the first user account is within a threshold distance from a second location associated with the second user account, and (ii) a second condition that a number of mutual connections of the first user account and the second user account satisfies a threshold number. In response to determining that the set of conditions is not satisfied, the server(s) 902 may cause the payment to automatically fail. The server(s) 902 may send an instruction to a user device 906 associated with the first user account and executing a payment application 926 associated with a payment service 108, the instruction causing the payment application 926 to present a user interface element notifying a user 916 of the user device 906 that the payment failed.

In some examples, individual ones of the end user devices 906 can be operable by users 916. The users 916 (individually referred to herein as "user 916") can be referred to as customers, buyers, merchants, sellers, borrowers, employees, employers, payors, payees, couriers, artists, musicians, listeners, fans, supervisors, hosts, audience members, and so on. The users 916 can interact with the end user devices 906 via user interfaces presented via the end user devices 906. In at least one example, a user interface can be presented via a web browser, or the like. Alternatively or additionally, a user interface can be presented via an application, such as a mobile application or desktop application, which can be provided by the merchant platform 910, the P2P payment platform 912, and/or the media content platform 914, or which can be an otherwise dedicated application. In some examples, individual end user devices 906 can have an instance or versioned instance of an application, which can be downloaded from an application store, for example, which can present the user interface(s) described herein.

In at least one example, the users 916 can include merchants that can operate the seller device(s) 906(A) that are configured for use by merchants. For the purpose of this discussion, a "merchant" can be any entity that offers items (e.g., goods or services) for purchase or other means of acquisition (e.g., rent, borrow, barter, etc.). The merchants can offer items for purchase or other means of acquisition via brick-and-mortar stores, mobile stores (e.g., pop-up shops, food trucks, etc.), online stores, event venues, combinations of the foregoing, and so forth. In some examples, at least some of the merchants can be associated with the same entity but can have different merchant locations and/or can have franchise/franchisee relationships.

In additional or alternative examples, the merchants can be different merchants. For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN) s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

The seller device 906(A) can have an instance of a point of sale ("POS") application 920 stored thereon. The POS application 920 can configure the seller device 906(A) as a POS terminal, which enables the merchant to interact with one or more customers. In at least one example, interactions between the customers and the merchants that involve the exchange of funds (from the customers) for items or services (from the merchants) can be referred to as "transactions." In at least one example, the POS application 920 can determine transaction data associated with the POS transactions. Transaction data can include payment information, which can be obtained from a reader device 922 associated with the seller device 906(A), user authentication data, purchase amount information, point-of-purchase information (e.g., item(s) purchased, date of purchase, time of purchase, subscription type, etc.), etc. The POS application 920 can send transaction data to the server(s) 902 such that the server(s) 902 can track transactions of the customers, merchants, and/or the users 916 over time. Furthermore, the POS application 920 can present a UI to enable the merchant to interact with the POS application 920 and/or the merchant platform 910 via the POS application 920.

In at least one example, the seller device 906(A) can be a special-purpose computing device configured as a POS terminal (via the execution of the POS application 920). In at least one example, the POS terminal may be connected to a reader device 922, which is capable of accepting a variety of payment instruments, such as credit cards, debit cards, gift cards, short-range communication based payment instruments, and the like, as described below. In at least one example, the reader device 922 can plug in to a port in the seller device 906(A), such as a microphone port, a headphone port, an audio-jack, a data port, or other suitable port. In additional or alternative examples, the reader device 922 can be coupled to the seller device 906(A) via another wired or wireless connection, such as via Bluetooth®, BLE, and so on. In some examples, the reader device 922 can be a software solution executing on the POS terminal, e.g., a mobile phone. In some examples, the reader device 922 can read information from alternative payment instruments including, but not limited to, wristbands and the like.

In some examples, the reader device 922 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards, hardware wallets, fobs, or devices configured for tapping). The POS terminal may provide a rich user interface, communicate with the reader device 922, and communicate with the merchant platform 910, which can provide, among other services, a payment processing service. The server(s) 902 associated with the merchant platform 910 can communicate with server(s) 908, as described below. In this manner, the POS terminal and reader device 922 may collectively process transaction(s) between the merchants and customers. In some examples, multiple POS terminal(s) may be connected to a number of other devices, such as "secondary" terminals, e.g., back-of-the-house systems, printers, line-buster devices, reader devices, speakers, and the like, to allow for information from the secondary terminal to be shared between the primary POS terminal(s) and secondary terminal(s), for example via short-range communication technology. This kind of arrangement may continue operation in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 922 of the POS system 924 are shown as separate devices, in additional or alternative examples, the POS terminal and the reader device 922 can be part of a single device. In some examples, the reader device 922 can have a display integrated therein for presenting information to customers of a merchant. In additional or alternative examples, the POS terminal can have a display integrated therein for presenting information to the customers of the merchant. POS systems, such as the POS system 924, may be mobile, such that POS terminals and reader devices may process transactions in disparate locations across the world. POS systems can be used for processing card-present transactions and card-not-present (CNP) transactions.

A card-present transaction is a transaction where both a customer and the customer's payment instrument are physically present at the time of the transaction. Card-present transactions may be contact or contactless transactions processed by swipes (e.g., by sliding a magnetic strip through a reader device), dips (e.g., by inserting an embedded microchip into a reader device), taps (e.g., by wirelessly, through Bluetooth, NFC or other short range technology hover or tap a payment instrument into a reader device), or any other interaction between a physical payment instrument (e.g., a card), or otherwise present payment instrument, and a reader device 922, whereby the reader device 922 is able to obtain payment data from the payment instrument.

A CNP transaction is a transaction where a card, or other payment instrument, is not physically present at the POS such that payment data is manually keyed in (e.g., by a merchant, customer, etc.), or payment data is required to be recalled from a card-on-file data store, to complete the transaction.

The POS system 924, the server(s) 902, and/or the server(s) 908 may exchange payment information and transaction data to determine whether transactions are authorized. For example, the POS system 924 may provide encrypted payment data, user authentication data, purchase amount information, point-of-purchase information, etc. (collectively, transaction data) to server(s) 902 over the network(s) 904. The server(s) 902 may send the transaction data to the server(s) 908.

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. In at least one example, the service provider can serve as an acquirer and connect directly with the card payment network.

The card payment network (e.g., the server(s) 908 associated therewith) can forward the fund transfer request to an issuing bank (e.g., "issuer"). The issuer is a bank or financial institution that offers a financial account (e.g., credit or debit card account) to a user. The issuer (e.g., the server(s) 908 associated therewith) can make a determination as to whether the customer has the capacity to absorb the relevant charge associated with the payment transaction. In at least one example, the merchant platform 910 can serve as an issuer and/or can partner with an issuer. The transaction is either approved or rejected by the issuer and/or the card payment network (e.g., the server(s) 908 associated therewith), and a payment authorization message is communicated from the issuer to the POS device via a path opposite of that described above, or via an alternate path.

The server(s) 908 may send an authorization notification over the network(s) 904 to the server(s) 902, which may send the authorization notification to the POS system 924 over the network(s) 904 to indicate whether the transaction is authorized. The server(s) 902 may also transmit additional information such as transaction identifiers to the POS system 924. In one example, the server(s) 902 may include a merchant application and/or other functional components for communicating with the POS system 924 and/or the server(s) 908 to authorize or decline transactions (e.g., the API 918). In examples, the merchant platform 910 can enable the merchants to receive cash payments, payment card payments, and/or electronic payments from customers for POS transactions and the service provider can process transactions on behalf of the merchants.

Based on the authentication notification that is received by the POS system 924 from server(s) 902, the merchant may indicate to the customer whether the transaction has been approved. In some examples, approval may be indicated at the POS system 924, for example, at a display of the POS system 924. In some cases, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

The merchant platform 910 can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, media content (e.g., music, videos, etc.) management and/or subscription services, and so on. In some examples, the users 916 can access all of the services. In some cases, the users 916 can have gradated access to the services, which can be based on risk tolerance, IDV outputs, subscriptions, and so on. In at least one example, access to such services can be availed to the merchants via the POS application 920. In additional or alternative examples, each service can be associated with its own access point (e.g., application, web browser, etc.).

As the merchant platform 910 processes transactions on behalf of the merchants, the merchant platform 910 can maintain accounts or balances for the merchants in one or more ledgers. For example, the merchant platform 910 can analyze transaction data received for a transaction to determine an amount of funds owed to a merchant for the transaction and deposit funds into an account of the merchant. The account can have a stored balance, which can be managed by the merchant platform 910. The account can be different from a conventional bank account at least because the stored balance is managed by a ledger of the merchant platform 910 and the associated funds are accessible via various withdrawal channels including, but not limited to, scheduled deposit, same-day deposit, instant deposit, and a linked payment instrument.

A scheduled deposit can occur when the merchant platform 910 transfers funds associated with a stored balance of the merchant to a bank account of the merchant that is held at a bank or other financial institution (e.g., associated with the server(s) 908). Scheduled deposits can occur at a pre-arranged time after a POS transaction is funded, which can be a business day after the POS transaction occurred, or sooner or later. In some examples, the merchant can access funds prior to a scheduled deposit (e.g., same-day deposits and/or real-time deposits). Further, in at least one example, the merchant can have a payment instrument that is linked to the stored balance that enables the merchant to access the funds without first transferring the funds from the account managed by the merchant platform 910 to the bank account of the merchant.

In at least one example, the merchant platform 910 may provide inventory management services. That is, the merchant platform 910 may provide inventory tracking and reporting. Inventory management services may enable the merchant to access and manage a database storing data associated with a quantity of each item that the merchant has available (i.e., an inventory). Furthermore, in at least one example, the merchant platform 910 can provide catalog management services to enable the merchant to maintain a catalog, which can be a database storing data associated with items that the merchant has available for acquisition (i.e., catalog management services). The merchant platform 910 can offer recommendations related to pricing of the items, placement of items on the catalog, and multi-party fulfillment of the inventory, to name a few examples.

In at least one example, the merchant platform 910 can provide business banking services, which allow the merchant to track deposits (from payment processing and/or other sources of funds) into an account of the merchant, payroll payments from the account (e.g., payments to employees of the merchant), payments to other merchants (e.g., business-to-business) directly from the account or from a linked debit card, withdrawals made via scheduled deposit and/or real-time deposit, configure allocations among multiple balances or accounts (e.g., spending, saving, taxes, etc.), etc. Furthermore, the business banking services can enable the merchant to obtain a customized payment instrument (e.g., credit card), check how much money the merchant is earning (e.g., via presentation of available earned balance), understand where the money of the merchant is going (e.g., via deposit reports (which can include a breakdown of fees), spend reports, etc.), access/use earned money (e.g., via scheduled deposit, real-time deposit, linked payment instrument, etc.), have improved control of the money of the merchant (e.g., via management of deposit schedule, deposit speed, linked instruments, etc.), etc. Moreover, the business banking services can enable the merchants to visualize their cash flow to track their financial health, set aside money for upcoming obligations (e.g., savings), organize money around goals, etc.

In at least one example, the merchant platform 910 can provide financing services and products, such as via business loans, consumer loans, fixed term loans, flexible term loans, and the like. In at least one example, the service provider can utilize one or more risk signals to determine whether to extend financing offers and/or terms associated with such financing offers. Such risk signals can be particular to an individual platform or service, as described herein, or can be based on aggregated data associated with multiple of the platforms or services. In at least one example, the merchant platform 910 can provide financing services for offering and/or lending a loan to a borrower that is to be used for, in some instances, financing the borrower's short-term operational needs (e.g., a capital loan). Additionally, or alternatively, the merchant platform 910 can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant. The merchant platform 910 can generate the loan based at least in part on determining that the borrower purchased or intends to purchase the item from the merchant. Advances, loans, or other funds provided to a merchant or other user can be repaid via a variety of mechanisms. In some examples, loans can be repaid in installments (e.g., multiple payments over time), at a particular date, from a portion of incoming funds (e.g., payments processed for the merchant, tax refunds, direct deposits, etc.), or the like.

The merchant platform 910 can provide web-development services, which enable users 916 who are unfamiliar with HTML, XML, Javascript, CSS, or other web design tools to create and maintain functional websites. Further, in addition to websites, the web-development services can create and maintain other online omni-channel presences, such as social media posts for example. In some examples, the resulting web page(s) and/or other content items can be used for offering item(s) for sale via an online/e-commerce platform. In at least one example, the merchant platform 910 can recommend and/or generate content items to supplement omni-channel presences of the merchants.

Furthermore, the merchant platform 910 can provide payroll services to enable employers to pay employees for work performed on behalf of employers. In at least one example, the merchant platform 910 can receive data that includes time worked by an employee (e.g., through imported timecards and/or POS interactions), sales made by the employee, gratuities received by the employee, and so forth. Based on such data, the merchant platform 910 can make payroll payments to employee(s) on behalf of an employer via the payroll service. For instance, the merchant platform 910 can facilitate the transfer of a total amount to be paid out for the payroll of an employee from the bank of the employer to the bank of the merchant platform 910 to be used to make payroll payments. In at least one example, when the funds have been received at the bank of the merchant platform 910, the merchant platform 910 can pay the employee, such as by check or direct deposit.

Moreover, in at least one example, the merchant platform 910 can provide employee management services for managing schedules of employees. Further, the merchant platform 910 can provide appointment services for enabling users 916 to set schedules for scheduling appointments and/or users 916 to schedule appointments.

In some examples, the merchant platform 910 can provide restaurant management services to enable users 916 to make and/or manage reservations, to monitor front-of-house and/or back-of-house operations, and so on. In such examples, the seller device(s) 906(A) and/or server(s) 902 can be configured to communicate with one or more other computing devices, which can be located in the front-of-house (e.g., POS device(s)) and/or back-of-house (e.g., kitchen display system(s) (KDS)). In at least one example, the merchant platform 910 can provide order management services and/or fulfillment services to enable restaurants (or other merchant types) to manage open tickets, split tickets, and so on and/or manage fulfillment services.

In some examples, the merchant platform 910 can provide omni-channel fulfillment services. A fulfillment service includes item ordering and delivery services, such as via a courier. In some examples, the courier can be an unmanned aerial vehicle (e.g., a drone), an autonomous vehicle, or any other type of vehicle capable of receiving instructions for traveling between locations. For instance, if a customer places an order with a merchant and the merchant cannot fulfill the order because one or more items are out of stock or otherwise unavailable, the merchant platform 910 can leverage other merchants and/or sales channels that are part of the merchant platform 910 to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the merchant platform 910 can enable conversational commerce via conversational commerce services, which can use one or more machine learning mechanisms to analyze messages exchanged between two or more users 916, voice inputs into a virtual assistant or the like, to determine intents of user(s) 916. In some examples, the merchant platform 910 can utilize determined intents to automate customer service, offer promotions, provide recommendations, or otherwise interact with customers in real-time. In at least one example, the merchant platform 910 can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 916 may be new to the merchant platform 910 such that the user 916 that has not registered (e.g., subscribed to receive access to one or more services offered by the merchant platform 910) with the merchant platform 910. The merchant platform 910 can offer onboarding services for registering a potential user 916 with the merchant platform 910. In some examples, onboarding can involve presenting various questions, prompts, and the like to a potential user 916 to obtain information that can be used to generate a profile for the potential user 916. In at least one example, the merchant platform 910 can provide limited or short-term access to its services prior to, or during, onboarding (e.g., a user of a peer-to-peer payment service can transfer and/or receive funds prior to being fully onboarded, a merchant can process payments prior to being fully onboarded, a user of a music streaming service can listen to music having advertisement breaks prior to being fully onboarded, etc.). In response to full or partial completion of onboarding, any limited or short-term access to services of the merchant platform 910 can be transitioned to more permissive (e.g., less limited) or longer-term access to such services.

The merchant platform 910 can be associated with IDV services, which can be used by the merchant platform 910 for compliance purposes and/or can be offered as a service, for instance to third-party service providers (e.g., associated with the server(s) 908). That is, the merchant platform 910 can offer IDV services to verify the identity of users 916 seeking to use or using their services. Identity verification may involve requesting a customer (or potential customer) to provide information that is used by compliance departments to prove that the information is associated with an identity of a real person or entity (e.g., an artist). In at least one example, the merchant platform 910 can perform services for determining whether identifying information provided by a user 916 accurately identifies the customer (or potential customer).

Techniques described herein can be configured to operate in both real-time/online and offline modes. "Online" modes refer to modes when devices are capable of communicating with the merchant platform 910 while offline mode refers to modes when devices are unable to communicate with the server(s) 908 due to network connectivity issue, for example. In such examples, devices may operate in "offline" mode where at least some payment data is stored (e.g., on the seller device(s) 906(A)) and/or the server(s) 902 until connectivity is restored and the payment data can be transmitted to the server(s) 902 and/or the server(s) 908 for processing.

In at least one example, the merchant platform 910 can be associated with a hub, such as an order hub, an inventory hub, a fulfillment hub and so on, which can enable integration with one or more additional service providers (e.g., associated with the additional server(s) 908). In some examples, such additional service providers can offer additional or alternative services and the service provider can provide an interface or other computer-readable instructions to integrate functionality of the service provider into the one or more additional service providers.

Turning now to the P2P functionality provided by the environment 900, the P2P platform 912 can provide a peer-to-peer payment service that enables peer-to-peer payments between two or more of the users 916. Two or more of the users 916 may be considered "peers" in a peer-to-peer interaction, such as a payment. In at least one example, the P2P platform 912 can communicate with instances of a payment application 926 (or other access point) installed on end user devices 906 configured for operation by the users 916. In an example, an instance of the payment application 926 executing on a first user device 906(B) operated by a payor (e.g., one of the users 916) can send a request to the P2P platform 912 to transfer an asset (e.g., fiat currency, non-fiat currency, digital assets such as non-fungible tokens (NFTs), cryptocurrency, securities, gift cards, and/or related assets) from the payor to a payee (e.g., a different one of the users 916) via a peer-to-peer payment. In some examples, assets associated with an account of the payor are transferred to an account of the payee. In some examples, assets can be held at least temporarily in an account of the P2P platform 912 prior to transferring the assets to the account of the payee.

Figure 10:
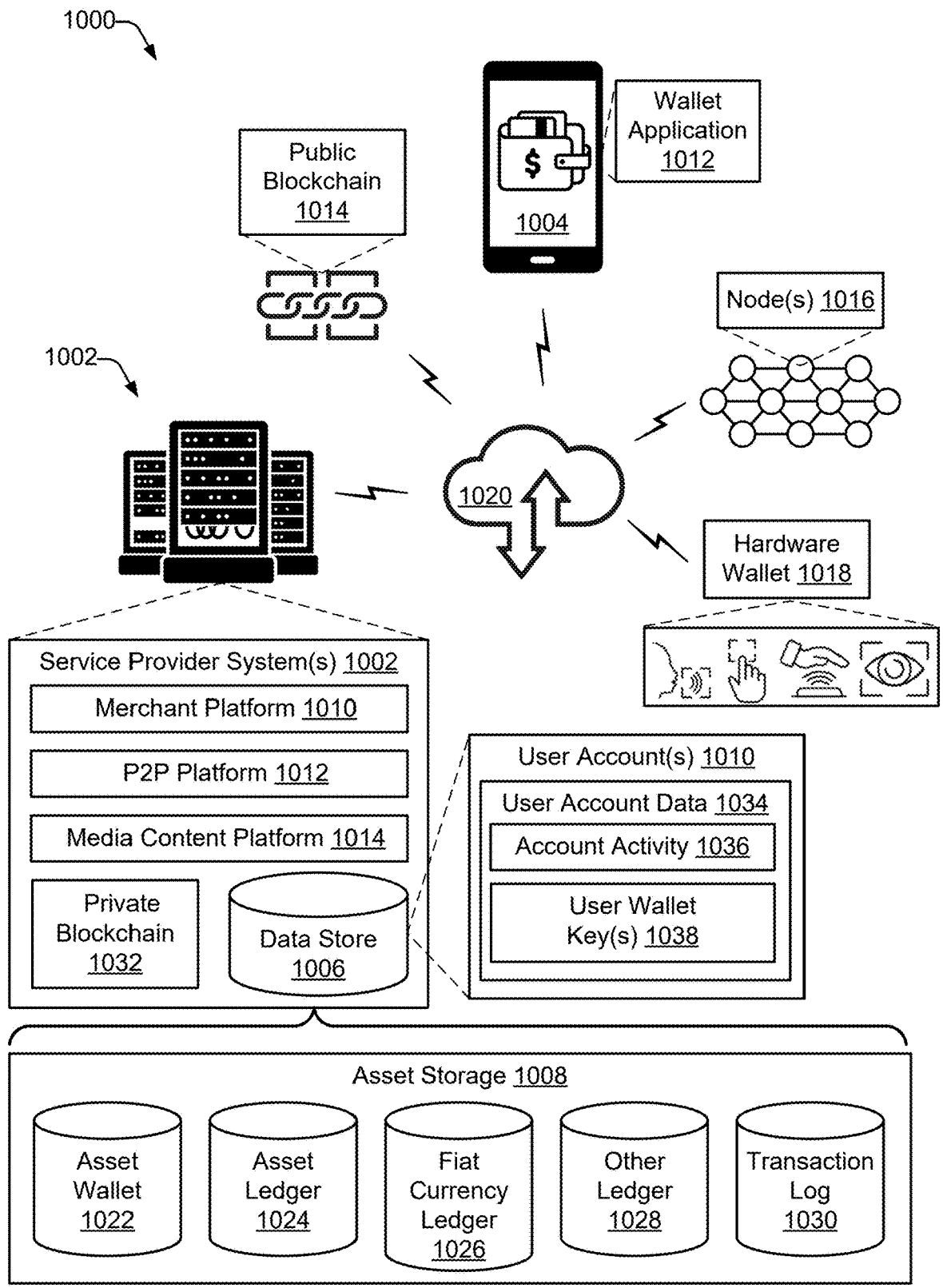
FIG. 10 is an example environment for performing techniques described herein.

In some examples, the P2P platform 912 can utilize a ledger system to track transfers of assets between users 916. FIG. 10, below, provides additional details associated with such a ledger system. The ledger system can enable users 916 to own fractional shares of assets that are not conventionally available. For instance, a user can own a fraction of a Bitcoin, an NFT, or a stock. Additional details are described herein.

In at least one example, the P2P platform 912 can facilitate transfers and can send notifications related thereto to instances of the payment application 926 executing on user device(s) of payee(s). As an example, the P2P platform 912 can transfer assets from an account of a first user to an account of a second user and can send a notification to the user device 906(B) of the second user for presentation via a user interface. The notification can indicate that a transfer is in process, a transfer is complete, or the like. In some examples, the P2P platform 912 can send additional or alternative information to the instances of the payment application 926 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some embodiments, the P2P platform 912 funds the request to payee on behalf of the payor, to speed up the transfer process and compensate for lags that may be attributed to the payor's financial network.

In some examples, the P2P platform 912 can trigger the peer-to-peer payment process through identification of a "payment proxy" having a particular syntax. The payment proxy is useable in lieu of payment data. That is, payment data and a payment proxy can be linked to, or otherwise associated with, a user account of a user and either can be used for making payments. In an example, the syntax can include a monetary currency indicator prefixing one or more alphanumeric characters (e.g., $Cash). The currency indicator operates as the tagging mechanism that indicates to the server(s) 902 to treat the inputs as a request from the payor to transfer assets, where detection of the syntax triggers a transfer of assets. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol or other symbol could equally be used. In some examples, additional or alternative identifiers can be used to trigger the peer-to-peer payment process. For instance, email, telephone number, social media handles, artist or band names, and/or the like can be used to trigger and/or identify users of a peer-to-peer payment process.

In some examples, the peer-to-peer payment process can be initiated through instances of the payment application 926 executing on the end user devices 906. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can be a uniform resource locator (URL), which can include a payment proxy discussed above. The P2P platform 912 can generate the landing page to enable the recipient to conveniently receive one or more payments from one or more senders.

In some examples, the peer-to-peer payment process can be implemented within a forum. The term "forum," as used here, refers to a content provider's media channel (e.g., a social networking platform, a microblog, a blog, video sharing platform, a music sharing platform, etc.) that enables user interaction and engagement through streaming of content, comments, posts, messages on electronic bulletin boards, messages on a social networking platform, and/or any other types of messages. In some examples, the content provider can be the service provider as described with reference to FIG. 9 or a third-party service provider associated with the server(s) 908. In examples where the content provider is a third-party service provider, the server(s) 908 can be accessible via one or more APIs 918 or other integrations. In some examples, "forum" may also refer to an application or webpage of an e-commerce or retail organization that offers products and/or services. Such websites can provide an online "form" to complete before or after the products or services are added to a virtual cart. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be internal to the P2P platform 912 (e.g., the P2P platform 912 offers a chat or messaging service that is within the payment application or accessible via the payment application). In some examples, the messaging application can be external to the P2P platform 912. (e.g., the messaging application is hosted by a third-party service provider associated with the server(s) 908, which can be accessible via one or more of the APIs 918 or other integrations). The messaging application can include, for example, a text messaging application for communication between phones (e.g., conventional mobile telephones or smartphones), or a cross-platform instant messaging application for smartphones and phones that use the Internet for communication.

Funds received from payments can be stored in stored balances that are linked to, or otherwise associated with, user accounts. In some examples, the P2P platform 912 can enable users 916 to perform banking transactions via instances of the payment application 926. For example, users can configure direct deposits, recurring deposits, or other deposits (e.g., tax refunds, loans, etc.) for adding assets to their various ledgers/balances. In some examples, users can deposit physical cash via ATMs or other deposit sources, which can include merchants, such as those merchants that utilize the payment processing system described above. In some examples, the P2P platform 912 can enable users to allocate funds between different accounts, sub-accounts, or balances (e.g., spending, saving, different assets, different currencies), etc. Further, users 916 can configure bill pay, recurring payments, and/or the like using assets associated with their accounts. In some examples, the P2P platform 912, with consent of the user, can track individual transactions made using the payment application and can utilize such transaction data to make personalized or customized recommendations, determine creditworthiness, generate tax documentation, and/or the like.

In addition to sending and/or receiving assets via peer-to-peer transactions, the P2P platform 912 enables users to buy and/or sell assets via asset networks such as cryptocurrency networks, securities networks, and/or the like. In some examples, acquisition of such assets can be in whole or fractional shares. The ledger system described below with reference to FIG. 10 can enable such assets to be acquired in fractional shares and/or in real-time or near real-time (by delaying or omitting the need to buy/sell assets via asset networks or exchanges). In some examples, users can "gift" assets to other users, for example, by transferring cryptocurrency, stocks, or the like to one another.

In some examples, the P2P platform 912 can enable users to link payment instruments to their user accounts. As a result, users can use their linked payment instruments to access funds in their accounts or balances. In some examples, the payment instrument can be a credit card, debit card, card linked to multiple accounts or balances via software or hardware, a fob or other object having payment data stored thereon, or the like. In some examples, the payment instrument can be a virtual payment instrument or a physical payment instrument. In some examples, the virtual payment instrument can be issued in real-time or for temporary usage. In some examples, the virtual payment instrument can have the same or different payment data as a corresponding physical payment instrument. Payment instruments can be customizable using a design user interface of the payment application. Such customization can enable users to select colors, stamps, images, text, or the like for surface(s) of their payment instruments. In some examples, users can draw or otherwise interact with the design user interface to personalize surface(s) of their payment instruments.

In some examples, users can associate incentives with their payment instruments. Incentives can be recommended to users based on user preferences (inferred or explicitly identified), geolocation, propensity to redeem, value, and/or the like. In some examples, incentives can be particular to individual merchants, types of merchants, types of transactions, and/or the like. In at least one example, when a user uses their payment instrument at a merchant or type of merchant associated with an incentive, or for a transaction type associated with an incentive, the P2P platform 912 can automatically apply the incentive to the transaction. In some examples, users can gift other users "gift cards" that can be associated with payment instruments. That is, a user can transfer an amount of funds to another user and such funds can be associated with a condition (e.g., merchant, merchant type, transaction type, location, etc.) that, upon satisfaction, enables the amount of funds, or a portion thereof, to be applied to a transaction. In at least one example, when a user uses their payment instrument for a transaction that satisfies the condition, the P2P platform 912 can automatically apply the amount of funds associated with the gift card to the transaction.

In some examples, users can configure their account such that when they use their payment instruments, the P2P platform 912 can deposit an amount of funds into a savings account, investing account, bitcoin account, or the like.

In some examples, users can search for or browse other users, merchants, items, or the like via the payment application. In some examples, search results can be personalized and/or customized for the user (e.g., based on user data collected with consent of the user). In some examples, users can shop or otherwise purchase items from other users, merchants, or the like from within the payment application or via a deep link to a merchant application or website.

The P2P platform 912 can offer primary and secondary accounts, wherein a primary account is a sponsor or other delegate of one or more secondary accounts. Such accounts can be useful for families, wherein a parent or other guardian is a sponsor or delegate to one or more child accounts, or where a child is a sponsor or delegate of an elderly parent's account. In some examples, primary accounts can establish limits on secondary accounts, such as spending limits, or the like. In some examples, the primary account owner is the user legally responsible for the account and their identity may be verifiable for secondary user accounts to perform certain transactions, such as buying/selling cryptocurrency or stocks. In some examples, one or more primary accounts and one or more secondary accounts can form a "group" with shared goals, such as saving, investing, or the like.

The P2P platform 912 can present activity data via an activity user interface of the payment application. In some examples, activity can be presented by merchant, date, time, amount, or the like. In some examples, interactions between entities can be represented in conversational communications such that each interaction or transaction is represented as a message. In some examples, users can interact with individual messages and/or send/request funds from within such a conversational communication. In some examples, such conversational communications can represent conversations of a group of two or more users. Groups can be used to pool funds, obtain group discounts or incentives, or enable multiple users to participate in financial transactions together (e.g., group investing, group savings, etc.).

The P2P platform 912 can offer a variety of financial training or learning opportunities. In some examples, such training or learning can be personalized for individual users, for example, based on user data and/or transaction data of the user that is obtained with consent of the user. In some examples, such user data and/or transaction data can be analyzed to make actionable recommendations with respect to optimizing financial health of users of the P2P platform 912.

In some examples, components of the environment 900 may be integrated to enable payments at the point-of-sale using assets associated with user accounts of the P2P platform 912. As illustrated in the environment 900, the components can communicate with one another via the network 904, where one or more APIs 918 or other functional components can be used to facilitate such communication.

In at least one example, an integration can enable a customer to participate in a transaction via their own computing device (e.g., user device 906(B)) instead of interacting with a merchant device of a merchant, such as the seller device 906(A). In such an example, the POS application 920, associated with a payment processing platform and executable by the seller device 906(A) of the merchant, can present a Quick Response (QR) code, or other code that can be used to identify a transaction (e.g., a transaction code), in association with a transaction between the customer and the merchant. The QR code, or other transaction code, can be provided to the POS application 920 via an API 918 associated with the peer-to-peer payment platform. In an example, the customer can utilize their own computing device, such as the user device 906(B), to capture the QR code, or the other transaction code, and to provide an indication of the captured QR code, or other transaction code, to server(s) 902.

Based at least in part on the integration of the peer-to-peer payment platform and the payment processing platform (e.g., via the API 918), the server(s) 902 of the merchant platform 910 can exchange communications with a payment application 926 associated with the P2P platform 912 and/or the POS application 920 to process payment for the transaction using a peer-to-peer payment where the customer is a first "peer" and the merchant is a second "peer."

Based at least in part on receiving an indication of which payment method a user (e.g., customer or merchant) intends to use for a transaction, techniques described herein utilize an integration between the P2P platform 912 and merchant platform 910 (which can be a first- or third-party integration) such that a QR code, or other transaction code, specific to the transaction can be used for providing transaction details, location details, customer details, or the like to a computing device of the customer, such as the user device 906(B), to enable a contactless (peer-to-peer) payment for the transaction, and transferring funds from an account of the customer to an account of the merchant.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device, such as the user device 906(B), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, which can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 920 and the payment application 926, as described herein, can process a payment transaction by routing information input via the merchant application to the payment application for completing a "frictionless" payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. A customer computing device, such as the user device 906(B), can be specially configured as a buyer-facing device having functionality similar to the functionality described above in the brick-and-mortar example.

In some examples, based at least in part on capturing the QR code, or other transaction code, the merchant platform 910 can provide transaction data to the P2P platform 912 for presentation via the payment application 926 on the computing device of the customer, such as the user device 906(B), to enable the customer to complete the transaction via their own computing device. In some examples, in response to receiving an indication that the QR code, or other transaction code, has been captured or otherwise interacted with via the customer computing device, the P2P platform 912 can determine that the customer authorizes payment of the transaction using funds associated with a stored balance of the customer that is managed and/or maintained by the P2P platform 912. Such authorization can be implicit such that the interaction with the transaction code can imply authorization of the customer. Alternatively or additionally, the P2P platform 912 can request express authorization to process payment for the transaction using the funds associated with the stored balance and the customer can interact with the payment application to expressly authorize the settlement of the transaction. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection. In some examples, such an authorization can be provided after payment is complete (e.g., via another payment instrument). Based at least in part on receiving an authorization to use funds associated with the stored balance (e.g., implicitly or explicitly) of the customer, the P2P platform 912 can transfer funds from the stored balance of the customer to the merchant platform 910. In at least one example, the merchant platform 910 can deposit the funds, or a portion thereof, into a stored balance of the merchant that is managed and/or maintained by the merchant platform 910. In such an example, the merchant platform 910 can be a "peer" to the customer in a peer-to-peer transaction.

In some examples, techniques described herein can enable the customer to interact with the transaction after payment for the transaction has been settled. For example, in at least one example, the merchant platform 910 can cause a total amount of a transaction to be presented via a user interface associated with the payment application 926 such that the customer can provide gratuity, feedback, loyalty information, or the like, via an interaction with the user interface. In another example, the merchant platform 910 can adjust a total amount of a transaction based on events during a shopping experience, such as adding or removing a charge to the total amount based on whether a media content item requested by the customer to be played during a shopping experience was in fact played. In some examples, because the customer has already authorized payment via the P2P platform 912, if the customer inputs a tip and/or an event affecting the total amount of the transaction is triggered, the P2P platform 912 can transfer additional funds, associated with the tip or event, to the merchant platform 910. This pre-authorization (or maintained authorization) of sorts can enable faster, more efficient payment processing when the tip is received and/or the event initiates the trigger. Further, the customer can provide feedback and/or loyalty information via the user interface presented by the payment application, which can be associated with the transaction. Using the pre-authorization techniques described herein results in fewer data transmissions and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 926 (e.g., instead of a native camera, or other sensor), techniques described herein can utilize an indication of the QR code, or other transaction code, received from the payment application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. In some examples, the payment instrument can be associated with the P2P platform 912 as described herein (e.g., a debit card linked to a stored balance of a customer) such that when the payment instrument is caused to interact with a payment reader, the merchant platform 910 can exchange communications with the P2P platform 912 to authorize payment for a transaction and/or provision associated transaction data to a computing device of the customer associated with the transaction.

Turning now to media content functionality provided by the environment 900, the media content platform 914 can provide digital media to a content consumption device 906(D) where playback may occur using "streaming." In examples, "streaming" media content involves encoding the media content and transmitting the encoded media content over the network 904 to a media player or a media application executing on a device (e.g., via a speaker). The device then decodes and plays the media content while data is being received. In some cases, a buffer queues some of the data of the media content (e.g., audio data, video data, etc.) ahead of the media being played. During moments of network congestion, which leads to lower available bandwidth, less media content data is added to the buffer, which drains down as media content is being dequeued during streaming playback. However, during moments of high network bandwidth, the buffer is replenished, adding media content data to the buffer.

In at least one example, the media content platform 914 can provide a digital media streaming service (e.g., subscription-based, non-subscription-based) that enables a content consumption device 906(D) to stream and/or download digital media content via a listener application 928 installed on the content consumption device 906(D). For instance, the media content platform 914 may comprise a digital audio streaming service (e.g., for music, podcasts, audiobooks, etc.), a digital video streaming service, and/or a streaming service that provides streaming of various different types of digital media content or multimedia. In such cases where digital media content items are downloaded and stored locally on the content consumption devices 906(D), the listener application 928 may verify access rights to the digital media content items at time intervals, for instance intermittently (e.g., when the content consumption device 906(D) has a network connection with the media content platform 914 via the network(s) 904), and/or at regular intervals (e.g., daily, weekly, monthly, etc.). In examples, access rights to the digital media content items may be provided when a subscription to the media content platform 914 is active, while access rights to the digital media content items may be withheld when the subscription to the media content platform 914 is terminated. Enabling storage on the end user devices 906 and subsequent access to digital media content items via the listener application 928 provides the users 916 with the ability to access the digital media content items "offline" such as when a connection to the media content platform 914 via the network(s) 904 is unavailable or unreliable.

In some examples, the media content platform 914 may additionally or alternatively provide an artist management service that enables the users 916 to manage aspects of artist business via an artist application 930 installed on the artist user device 906(E), such as data analytics and management (e.g., listener data, consumer data, etc.), marketing, regulatory obligations, cash flow management, publishing, customer relationship management (CRM), social media, event coordination, industry communications, digital media content ingestion and storage, and so forth. In some cases, the users 916 can have graduated access to the services, which can be based on a user type (e.g., artist, group member, personal manager, business manager, attorney, agent, etc.), risk tolerance, artist verification status, listener and/or viewer analytics (e.g., number of streams in a month), and so on. In some cases, multiple users 916 may have access to a single user account via respective end user devices 906, with the various users having different access privileges to services provided by the artist management service. In various scenarios, an artist can designate functions provided by the artist management service to different members of the team associated with the artist, thus granting the respective team members access to services suited to the skills of the individual team members.

In some cases, the artist application 930 and the listener application 928 may be distinct applications having differing user experiences and verification processes for access, such as illustrated in the environment 900. For instance, the media content platform 914 may request additional verification, such as a link to an artist website, a sample of an artist's work, a verified credential supplied by a third party, etc. to grant access to the artist application 930 in addition to information requested to access the listener application 928. Further, the artist application 930 may provide the artist management services described herein, without the subscription-based digital media streaming services described herein, and vice versa. However, examples are also considered in which functionality provided by the artist application 930 and the listener application 928 partially or fully overlap, and/or where verification processes for access are substantially similar.

In at least some examples, the media content platform 914 enables interaction between the users 916 utilizing the listener application 928 installed on the content consumption devices 906(D), and the users 916 utilizing the artist application 930 installed on the artist user devices 906(E). For example, the media content platform 914 may provide interconnectivity between the subscription-based digital media streaming service and the artist management service. Functionality provided by the media content platform 914 in such instances may include a communication channel between one or more of the users 916 (e.g., a listener, fan, music supervisor, publisher, etc.) utilizing the listener application 928 and another user (e.g., an artist) of the users 916 utilizing the artist application 930. The communication channel may include, for instance, a messaging platform (also referred to as a "messaging application" herein), a live streaming platform, a videoconferencing or teleconferencing platform, and/or a combination of these.

Additionally, in some cases, the media content platform 914 may facilitate a resource transfer between the listener application 928 and the artist application 930. In an example, the media content platform 914 may direct a resource, such as a portion of a subscription fee paid by one of the users 916 designated as a listener, to one or more of the users 916 designated as artists based on a number of instances that the listening user consumed (e.g., streamed, downloaded, etc.) content created by respective ones of the artist users. Alternatively, or additionally, the media content platform 914 may direct a resource, such as funds, from an account associated with a listening user to an account associated with an artist user (or vice versa), in accordance with transfers between accounts as described herein. The media content platform 914 may facilitate resource transfers in examples such as merchandise purchases, event ticket purchases, "tipping" an artist, payments for royalties or other fees, and so forth.

In some examples, the media content platform 914 enables interaction between individual ones of the users 916 with one another via the listener application 928 installed on the content consumption device 906(D) and other of the content consumption devices 906(D) via a communication channel as described above. In an example, the listener application 928 may provide functionality via a communication channel for a user to stream an individual digital media item, a playlist, or the like to an audience comprising other ones of the content consumption devices 906(D). Alternatively or additionally, the communication channel may facilitate sharing of individual digital media items, playlists, user and/or artist profiles, and the like between the users 916 via messages, uniform resource locators (URLs), quick response (QR) codes, and so forth.

In some cases, the media content platform 914 enables interaction between individual ones of the users 916 with one another via the artist application 930 installed on the artist user device 906(E) and other of the artist devices 906(E) via a communication channel as described above. In some instances, the media content platform 914 may provide recommendations for a particular user indicating which of the other users 916 to communicate with. Such a recommendation may be based on a similarity (or dissimilarity) of content created by two or more of the users 916, an overlap (or lack thereof) of audience members of the users 916, a geographic location of the users 916, a coinciding event location of the users 916, and so forth. In some examples, a user may input parameters for a desired connection via the artist application 930, and the media content platform 914 may filter which of the users 916 to surface for recommendations to the user based on the input parameters. Alternatively or additionally, the media content platform 914 may implement one or more machine learning models to filter which of the users 916 to surface for recommendations to the user. The recommendations provided by the media content platform 914 may be data driven and thus increase relevance of communications presented to the users 916 and reduce unsolicited communications that may be received by the users 916.

The media content platform 914 may interact with the server(s) 908 associated with the third-party service providers to, for instance, ingest digital media items, report digital media consumption data, pay royalties, and the like. In some examples, the server(s) 908 may be accessible by the media content platform 914 via one or more APIs 918 or other integrations. In some cases, the third-party service provider may be a digital media content provider (e.g., a record label, a performance rights organization (PRO), an independent artist, etc.). In such cases, the media content platform 914 may receive digital media content items from the server(s) 908, along with metadata associated with the digital media content items. The metadata, in some instances, may indicate individual contributors to a digital media content item such as an artist or artists, a songwriter (e.g., a composer, lyricist, author, etc.), a producer (which may further include a co-producer, a mastering engineer, a mixing engineer, a recording engineer, an arranger, a programmer, etc.), a musician (e.g., instrumentalist, vocalist, etc.), a visual artist, and so forth, with an indication of the role of the individual contributor. Alternatively, or additionally, the metadata may indicate information such as release date, track title, track duration, clean or explicit version, jurisdiction information, and the like. The media content platform 914 may use the metadata to associate the digital media content item as being created by a particular user, to provide search results to the users 916, to generate playlists, and so forth. Further, the media content platform 914 may provide payments (e.g., royalties) to the third-party service provider based on a number of streams and/or downloads of individual digital media content items by the users 916 via the listener application 928.

Techniques described herein are directed to services provided via a distributed system of end user devices 906 that are in communication with server(s) 902 of the service provider. That is, techniques described herein are directed to a specific implementation—or, a practical application—of utilizing a distributed system of end user devices 906 that are in communication with server(s) 902 of the merchant platform 910, the P2P platform 912, and/or the media content platform 914 to perform a variety of services, as described above. The unconventional configuration of the distributed system described herein enables the server(s) 902 that are remotely-located from end-users (e.g., users 916) to intelligently offer services based on aggregated data associated with the end-users, such as the users 916 (e.g., data associated with multiple, different merchants and/or multiple, different buyers; data associated with multiple different listeners and/or multiple different artists, etc.), in some examples, in near-real time. Accordingly, techniques described herein are directed to a particular arrangement of elements that offer technical improvements over conventional techniques for performing payment processing services, P2P payment services, media content services, and the like. For small business owners and artists in particular, the business environment is typically fragmented and relies on unrelated tools and programs, making it difficult for an owner or an artist to manually consolidate and view such data. The techniques described herein constantly or periodically monitor disparate and distinct user accounts, e.g., accounts within the control of the merchant platform 910, the P2P platform 912, and/or the media content platform 914, and those outside of the control of these service providers, to track the standing (payables, receivables, payroll, invoices, appointments, capital, balances, collaborations, etc.) of the users 916. The techniques herein provide a consolidated view of a user's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services, P2P payment services, media content services, and/or additional or alternative services described herein. In some implementations, the distributed system is capable of applying the intelligence derived from an existing user base to a new user, thereby making the onboarding experience for the new user personalized and frictionless when compared to traditional onboarding methods. Further, models or algorithms that are used to implement techniques described herein may be retrained over time to improve outcomes for subsequent scenarios based on outcomes of previous scenarios. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 916 and end user devices 906. Furthermore, such features are changed dynamically based on the profiles of the users involved interacting with the GUIs. As such, techniques described herein are directed to improvements to computing systems.

The merchant platform 910, the P2P platform 912, and/or the media content platform 914 are capable of providing additional or alternative services, and the services described above are offered as a sampling of services. In at least one example, the merchant platform 910, the P2P platform 912, and/or the media content platform 914 can exchange data with the server(s) 908 associated with third-party service providers. Such third-party service providers can provide information that enables the merchant platform 910, the P2P platform 912, and/or the media content platform 914 to provide services, such as those described above. In additional or alternative examples, such third-party service providers can access services of the merchant platform 910, the P2P platform 912, and/or the media content platform 914. That is, in some examples, the third-party service providers can be subscribers, or otherwise access, services of the merchant platform 910, the P2P platform 912, and/or the media content platform 914.

FIG. 10 illustrates an example environment 1000 including a service provider system 1002 which may be associated with the server(s) 902 of FIG. 9. The environment 1000 may also include a user device 1004, which may correspond to any of the end user devices 906 described in relation to FIG. 9. In examples, the service provider system 1002 may include one or a combination of the merchant platform 910, the P2P platform 912, or the media content platform 914, as well as one or more data store(s) 1006 that can store assets in an asset storage 1008, as well as data in user account(s) 1010. In some examples, the environment 1000 may also include a public blockchain 1014, one or more nodes 1016, and/or a hardware wallet 1018. The service provider system 1002, the user device 1004, public blockchain 1014, the node(s) 1016, and the hardware wallet 1018 may be connected and able to communicate via one or more networks 1020, which may have the same or similar functionality described in relation to the network 904 of FIG. 9.

In some examples, user account(s) 1010 can include merchant account(s), customer account(s), media content subscriber account(s), artist account(s), and so forth. In at least one example, the asset storage 1008 can be used to record whether individual assets are registered to a user account 1010. For example, the asset storage 1008 can include asset wallet(s) 1022 for storing records of assets owned by the service provider system 1002, such as cryptocurrency, securities, NFTs, or the like, and communicating with one or more asset networks, such as cryptocurrency networks, NFT networks, securities networks, or the like. In some examples, the asset network can be a first-party network or a third-party network, such as a cryptocurrency exchange or the stock market. In examples where the asset network is a third-party network, the server(s) 908 of FIG. 9 can be associated therewith.

The asset wallet 1022 can be associated with one or more addresses and can vary addresses used to acquire assets (e.g., from the asset network(s)) so that its holdings are represented under a variety of addresses on the asset network. In examples where the service provider system 1002 has holdings of cryptocurrency (e.g., in the asset wallet 1022), a user can acquire cryptocurrency directly from the service provider system 1002. In some examples, the service provider system 1002 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In some scenarios, the buying and selling of cryptocurrency, and therefore the associated updating of the public ledger of an asset network can be separate from a customer-merchant transaction or a peer-to-peer transaction, and therefore not necessarily time-sensitive. This can enable batching transactions to reduce computational resources and/or costs. The service provider system 1002 can provide the same or similar functionality for securities or other assets.

The asset storage 1008 may contain ledgers that store records of assignments of assets to users 916. Specifically, the asset storage 1008 may include asset ledger 1024, fiat currency ledger 1026, and/or other ledger(s) 1028, which can be used to record transfers of assets between users 916 and/or one or more third-parties (e.g., merchant network(s), payment card network(s), ACH network(s), equities network(s), the asset network, securities networks, etc.). In doing so, the asset storage 1008 can maintain a running balance of assets managed by the service provider system 1002. The ledger(s) of the asset storage 1008 can further indicate some of the running balance for individual ledger(s) stored in the asset storage 1008 are assigned or registered to one or more user account(s) 1010.

In at least one example, the asset storage 1008 can include transaction logs 1030, which can include, as transaction data, records of past transactions involving the service provider system 1002 and/or the user account 1010. In some examples, the data store(s) 1006 can store a private blockchain 1032. A private blockchain 1032 can function to record sender addresses, recipient addresses, public keys, values of cryptocurrency transferred, and/or can be used to verify ownership of cryptocurrency tokens to be transferred. In some examples, the service provider system 1002 can record transactions involving cryptocurrency until the number of transactions has exceeded a determined limit (e.g., number of transactions, storage space allocation, etc.). Based at least in part on determining that the limit has been reached, the service provider system 1002 can publish the transactions in the private blockchain 1032 to the public blockchain 1014 (e.g., associated with the asset network), where miners can verify the transactions and record the transactions to blocks on the public blockchain 1014. In at least one example, the service provider system 1002 can participate as miner(s) at least for transactions to which the respective platform is a party to, to be posted to the public blockchain 1014.

In some cases, the data store(s) 1006 can store and/or manage multiple user accounts, an example of which is described in relation to the user account 1010. In at least one example, the user account 1010 can include user account data 1034, which can include, but is not limited to, data associated with user identifying information (e.g., name, phone number, address, artist or band name, verified credentials, etc.), user identifier(s) (e.g., alphanumeric identifiers, etc.), user preferences (e.g., learned or user-specified), purchase history data (e.g., identifying one or more items purchased (and respective item information), subscription tier information, etc.), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 1034 can include account activity 1036 and user wallet key(s) 1038. In some examples, the user wallet key(s) 1038 can include a public-private key-pair and a respective address associated with the asset network or other asset networks. In some examples, the user wallet key(s) 1038 may include one or more key pairs, which can be unique to the asset network or other asset networks.

In addition to the user account data 1034, the user account 1010 can include ledger(s) for account(s) managed by the service provider system 1002, for the user. For example, the user account 1010 may include an asset ledger 1024, a fiat currency ledger 1026, and/or one or more other ledgers 1028. The ledger(s) can indicate that a corresponding user utilizes the service provider system 1002 to manage corresponding accounts (e.g., a cryptocurrency account, a securities account, a fiat currency account, an artist account, etc.). It should be noted that in some examples, the ledger(s) can be logical ledger(s) and the data can be represented in a single database. In some examples, individual ones of the ledger(s), or portions thereof, can be maintained by the service provider system 1002.

In some examples, the asset ledger 1024 can store a balance for each of one or more cryptocurrencies (e.g., Bitcoin, Ethereum, Litecoin, etc.) registered to the user account 1010. In at least one example, the asset ledger 1024 can further record transactions of cryptocurrency assets associated with the user account 1010. For example, the user account 1010 can receive cryptocurrency from the asset network using the user wallet key(s) 1038. In some examples, the user wallet key(s) 1038 may be generated for the user upon request. User wallet key(s) 1038 can be requested by the user in order to send, exchange, or otherwise control the balance of cryptocurrency held by the service provider system 1002 (e.g., in the asset wallet 1022) and registered to the user. In some examples, the user wallet key(s) 1038 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider system 1002 and the value is credited as a balance in asset ledger 1024), by purchasing currency in the form associated with the account using currency in a different form (e.g., buying a value of cryptocurrency from the service provider system 1002 using a value of fiat currency reflected in fiat currency ledger 1026, and crediting the value of cryptocurrency in asset ledger 1024), or by conducting a transaction with another user (customer or merchant) of the service provider system 1002 wherein the account receives incoming currency (which can be in the form associated with the account or a different form, in which the incoming currency may be converted to the form associated with the account).

With specific reference to funding a cryptocurrency account, a user may have a balance of cryptocurrency stored in another cryptocurrency wallet. In some examples, the other cryptocurrency wallet can be associated with a third-party unrelated to the service provider system 1002 (i.e., an external account). Such a transaction can request that the user to transfer an amount of the cryptocurrency in a message signed by user's private key to an address provided by the service provider system 1002. In at least one example, the transaction can be sent to miners to bundle the transaction into a block of transactions and to verify the authenticity of the transactions in the block. Once a miner has verified the block, the block is written to the public blockchain 1014 where the service provider system 1002 can then verify that the transaction has been confirmed and can credit the user's asset ledger 1024 with the transferred amount. When an account is funded by transferring cryptocurrency from a third-party cryptocurrency wallet, an update can be made to the public blockchain 1014. In some cases, this update of the public blockchain 1014 need not take place at a time-critical moment, such as when a transaction is being processed by a merchant in store or online.

In some examples, a user can purchase cryptocurrency to fund their cryptocurrency account. In some examples, the user can purchase cryptocurrency through services offered by the service provider system 1002. As described above, in some examples, the service provider system 1002 can acquire cryptocurrency from a third-party source. In examples where the service provider system 1002 has its own cryptocurrency assets, cryptocurrency transferred in a transaction (e.g., data with address provided for receipt of transaction and a balance of cryptocurrency transferred in the transaction) can be stored in an asset wallet 1022 associated with the service provider system 1002. In at least one example, the service provider system 1002 can credit the asset ledger 1024 of the user. Additionally, while the service provider system 1002 recognizes that the user retains the value of the transferred cryptocurrency through crediting the asset ledger 1024, an inspection of the blockchain will show the cryptocurrency as having been transferred to the service provider system 1002. In some examples, the asset wallet 1022 can be associated with many different addresses. In such examples, an inspection of the blockchain may not necessarily associate all cryptocurrency stored in asset wallet 1022 as belonging to the same entity. The presence of a private ledger used for real-time transactions and maintained by the service provider system 1002, combined with updates to the public ledger at other times, allows for extremely fast transactions using cryptocurrency to be achieved. In some examples, the "private ledger" can refer to the asset ledger 1024, which in some examples, can utilize the private blockchain 1032, as described herein. The "public ledger" can correspond to the public blockchain 1014 associated with the asset network.

In at least one example, an asset ledger 1024, fiat currency ledger 1026, or the like associated with the user account 1010 can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 1024. In some examples, a user can receive fiat currency or another currency in the form of payment for a transaction with another user. In at least one example, at least a portion of such funds can be converted into cryptocurrency by the service provider system 1002 and used to fund the asset ledger 1024 of the user.

In examples, a user can also have an account in U.S. dollars, which can be tracked, for example, via the fiat currency ledger 1026. Such an account can be funded by transferring money from a bank account at a third-party bank to an account maintained by the service provider system 1002 as is conventionally known. In some examples, a user can receive fiat currency in the form of payment for a transaction with another user. In such examples, at least a portion of such funds can be used to fund the fiat currency ledger 1026.

In some examples, a user can have one or more internal payment cards registered with the service provider system 1002. Internal payment cards can be linked to one or more of the accounts associated with the user account 1010. In some embodiments, options with respect to internal payment cards can be adjusted and managed using an application (e.g., the payment application 926, a wallet application 1012, etc.).

In at least one example, the user account 1010 can be associated with the asset wallet accessible via a wallet application 1012 of the user device 1004, or a stored balance for use in payment transactions, peer-to-peer transactions, payroll payments, etc. In at least one example, the asset wallet 1022 can store data indicating an address provided for receipt of a cryptocurrency transaction. In at least one example, the balance of the asset wallet 1022 can be based at least in part on a balance of the asset ledger 1024. In at least one example, funds availed via the asset wallet 1022 can be stored in the asset wallet 1022. Funds availed via the asset wallet 1022 can be tracked via the asset ledger 1024. The asset wallet 1022, however, can be associated with additional cryptocurrency funds.

In at least one example, when the service provider system 1002 includes a private blockchain 1032 for recording and validating cryptocurrency transactions, the asset wallet 1022 can be used instead of, or in addition to, the asset ledger 1024. For example, a merchant can provide the address of the asset wallet 1022 for receiving payments. In an example where a customer is paying in cryptocurrency and the customer has their own cryptocurrency wallet account associated with the service provider system 1002, the customer can send a message signed by its private key including its wallet address (i.e., of the customer) and identifying the cryptocurrency and value to be transferred to the merchant's asset wallet 1022. The service provider system 1002 can complete the transaction by reducing the cryptocurrency balance in the customer's cryptocurrency wallet and increasing the cryptocurrency balance in the merchant's asset wallet 1022. In addition to recording the transaction in the respective cryptocurrency wallets, the transaction can be recorded in the private blockchain 1032 and the transaction can be confirmed. A user can perform a similar transaction with cryptocurrency in a peer-to-peer transaction as described above.

While the asset ledger 1024 and/or asset wallet 1022 are each described above with reference to cryptocurrency, the asset ledger 1024 and/or asset wallet 1022 can alternatively be used in association with securities. In some examples, different ledgers and/or wallets can be used for different types of assets. That is, in some examples, a user can have multiple asset ledgers and/or asset wallets for tracking cryptocurrency, securities, or the like.

It should be noted that user(s) having accounts managed by the service provider system 1002 is an aspect of the technology disclosed that enables technical advantages of increased processing speed and improved security.

The description of the environment 1000 above generally relates to a centralized service provider system 1002 that at least partially facilitates storing and managing assets in the data store 1006. However, the environment 1000 may also facilitate decentralized storage and management of assets alternatively or in addition to centralized storage and management as described above. For instance, the environment 1000 may include a decentralized platform implemented using a plurality of nodes (e.g., web nodes), an example of which is illustrated as node 1016. The node 1016 is representative of a computer or other device tasked with validating transactions and/or maintaining a copy of a blockchain ledger, such as a ledger associated with the public blockchain 1014. The decentralized platform may be implemented via the environment 1000 through use of decentralized identifiers and verifiable credentials that are stored and managed by user devices 1004. A decentralized identifier is configured as a self-owned identifier that supports decentralized authentication and routing. A self-owned identifier in a blockchain network is a unique identifier that is owned and controlled by an individual entity on the blockchain, as contrasted with an entity controlled by a centralized authority (e.g., the service provider system 1002). The decentralized identity referenced by a decentralized identifier gives an entity control over what data can be accessed, stored, modified, and so forth by other entities, such as the service provider system 1002.

The node 1016, as representative of one of a plurality of decentralized nodes (e.g., decentralized web nodes), supports data storage and relays that allows entities, service provider systems, individuals, organizations and so forth to send, store, and receive encrypted or public messages and data. The node 1016 is universally addressable and is "crawlable" using data addressing in relation to the decentralized identifiers. The node 1016 is also configured to support decentralized replication of data across the nodes that is consistent across multiple nodes over time through continued data communication between the nodes in the decentralized platform. The node 1016 is configurable to support secure encryption through use of a cryptographic key associated with an individual's decentralized identifier and support semantic discovery to discover different forms of published data.

Verifiable credentials are an open standard for digital credentials, and employ a data format for cryptographic presentation and verification of claims. A verifiable credential represents an indication of trust of a piece of information related to an entity. For example, a verifiable credential indicates that the issuer of the verifiable credential trusts the holder of the verifiable credential; the holder trusts a verifier of the verifiable credential; and that the verifier trusts the issuer. Verifiable credentials may be issued by anyone, about anything, and can be presented to and verified by everyone granted access to the verifiable credential. Accordingly, a user of the user device 1004 may be an issuer, a holder, and/or a verifier, as can the service provider system 1002.

In some examples, the user device 1004 may implement a wallet application 1012 configured to manage decentralized identifiers and/or verifiable credentials. For instance, the wallet application 1012 may provide a user interface for implementation of access controls to various data associated with the decentralized identifier by the service provider system 1002, to other user devices, and so forth. Additionally, the wallet application 1012 may be configured to provide functionality for resource transfers (e.g., cryptocurrency, fiat currency, etc.) with the service provider system 1002, other user devices, and the like, based on techniques described herein.

In some examples, the hardware wallet 1018 may store cryptocurrency assets in combination with the wallet application 1012 and the service provider system 1002. For instance, the hardware wallet 1018, the wallet application 1012, and the service provider system 1002 may each store a respective, different private key, where a transaction with the cryptocurrency assets is signed by at least two of the three private keys. The user interface provided by the wallet application 1012 may allow a user to request a transaction. The wallet application 1012 may then sign the transaction with the private key of the wallet application 1012, have either the hardware wallet 1018 or the service provider system 1002 use a second of the three private keys to sign the transaction, and then provide the transaction with two signatures to the public blockchain 1014 for processing.

Figure 11:
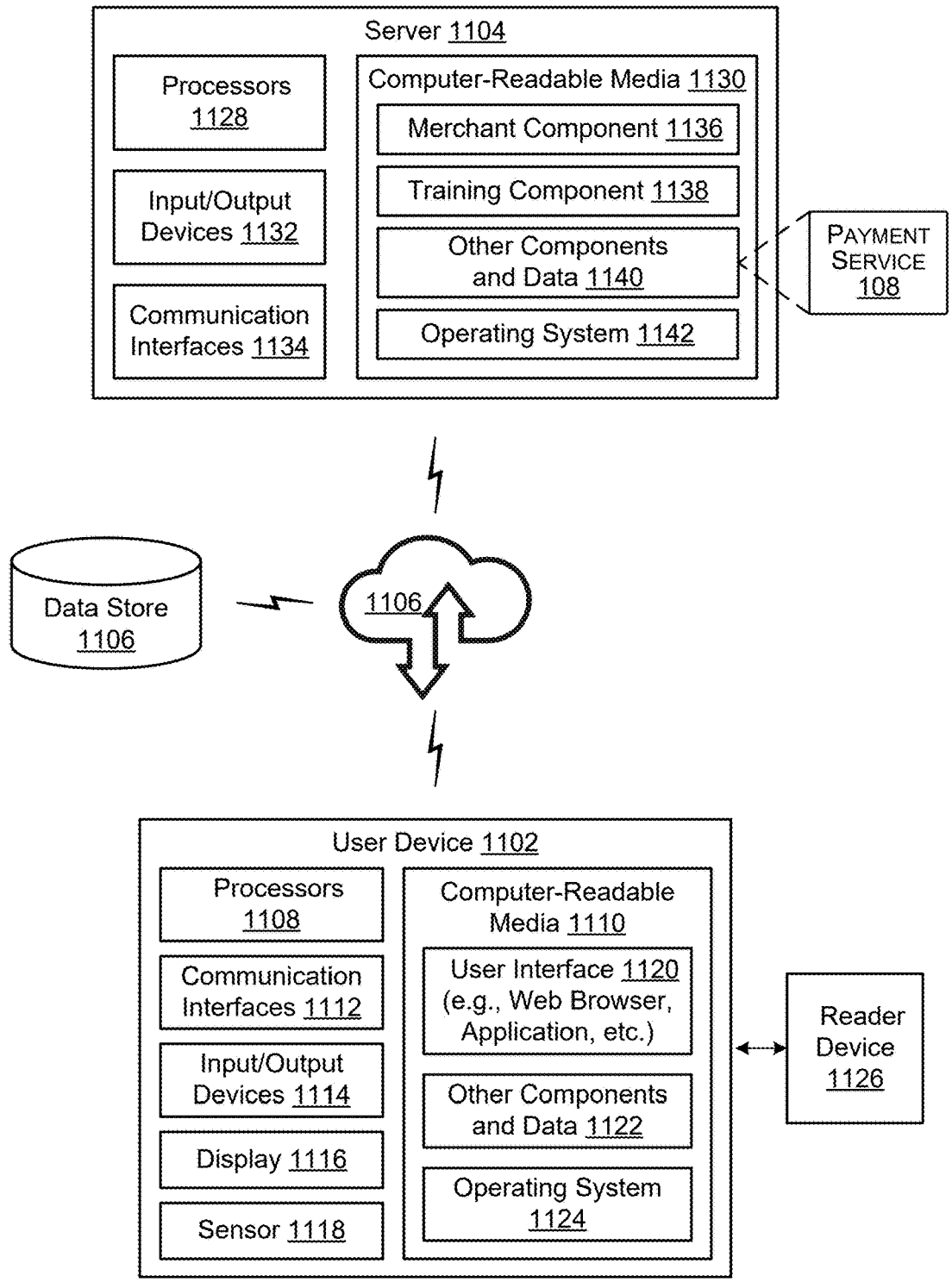
FIG. 11 is an example data store used for performing techniques described herein.

FIG. 11 depicts an illustrative block diagram illustrating a system 1100 for performing techniques described herein. The system 1100 includes a user device 1102, that communicates with server computing device(s) (e.g., server(s) 1104) via network(s) 1106 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1102 is illustrated, in additional or alternate examples, the system 1100 can have multiple user devices, as described above with reference to FIG. 9.

In some examples, the server(s) 1104 may be the same as or similar to the server(s) of the PSS 110 introduced in FIG. 1, and the server(s) 1104 may implement the payment service 108. Accordingly, the server(s) 1104 may include the account manager component 132, the payment processing component 138, the training component 142, the AI model(s) 144, the classification component 146, and/or the user interface component 148, as described herein. Furthermore, the user device(s) 1102 may be the same as or similar to the user device 104 introduced in FIG. 1, the network(s) 1106 may be the same as or similar to the network(s) 112 introduced in FIG. 1, and/or the data store(s) 1006 may be the same as or similar to the data store(s) 114 introduced in FIG. 1. In addition, the user interface 1120 may be a user interface of the payment application 106 introduced in FIG. 1.

In accordance with the examples described herein, the server(s) 1104 may facilitate determining user types from behavior. The server(s) 1104 may process payments between user accounts of a payment service 108, and train an AI model to classify the user accounts into different user types using contextual data associated with the payments. The server(s) 1104 may analyze, using the AI model, additional contextual data associated with additional payments between additional user accounts of the payment service 108 to classify the additional user accounts, and determine, based at least in part on the analyzing, that a particular user account of the additional user accounts is associated with a user type of the different user types that requires an action to be performed. The server(s) 1104 may send an instruction to a user device 1102 associated with the particular user account and executing a payment application associated with the payment service 108, the instruction causing the payment application to present a user interface element prompting a user of the user device 1102 to perform the action. The server(s) 1104 may store, in a datastore 1106, account data indicating whether the particular user account is an authorized account based at least in part on whether the action was performed.

In accordance with the examples described herein, the server(s) 1104 may facilitate performing automated actions for fraud reduction. The server(s) 1104 may detect that a first user account associated with a first user type is attempting to make a payment to a second user account associated with a second user type, and, in response to the detecting, may determine whether a set of conditions is satisfied, the set of conditions comprising: (i) a first condition that a first location associated with the first user account is within a threshold distance from a second location associated with the second user account, and (ii) a second condition that a number of mutual connections of the first user account and the second user account satisfies a threshold number. In response to determining that the set of conditions is not satisfied, the server(s) 1104 may cause the payment to automatically fail. The server(s) 1104 may send an instruction to a user device 1102 associated with the first user account and executing a payment application associated with a payment service 108, the instruction causing the payment application to present a user interface element notifying a user of the user device 1102 that the payment failed.

In at least one example, the user device 1102 can be any suitable type of computing device, e.g., portable, semi-portable, semi-stationary, or stationary. Some examples of the user device 1102 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, a speaker device, an automobile or other vehicle type, an Internet of Things (IoT) device, etc. That is, the user device 1102 can be any computing device capable of sending communications and performing the functions according to the techniques described herein. The user device 1102 can include devices, e.g., payment card readers, or components capable of accepting payments, as described below. The user device 1102 may be representative of, and provide functionality for, the user devices 906 described in relation to FIG. 9.

In the illustrated example, the user device 1102 includes one or more processors 1108, one or more computer-readable media 1110, one or more communication interface(s) 1112, one or more input/output (I/O) devices 1114, a display 1116, sensor(s) 1118, one or more encoders 1146, and one or more decoders 1148.

In at least one example, each processor 1108 can itself comprise one or more processors or processing cores. For example, the processor(s) 1108 can be implemented as one or more microprocessors, microcomputers, microcontrollers, digital signal processors, central processing units, state machines, logic circuitries, and/or any devices that manipulate signals based on operational instructions. In some examples, the processor(s) 1108 can be one or more hardware processors and/or logic circuits of any suitable type specifically programmed or configured to execute the algorithms and processes described herein. The processor(s) 1108 can be configured to fetch and execute computer-readable processor-executable instructions stored in the computer-readable media 1110.

Depending on the configuration of the user device 1102, the computer-readable media 1110 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 1110 can include, but is not limited to, RAM, ROM, EEPROM, flash memory, solid-state storage, magnetic disk storage, optical storage, and/or other computer-readable media technology. Further, in some examples, the user device 1102 can access external storage, such as RAID storage systems, storage arrays, network attached storage, storage area networks, cloud storage, or any other medium that can be used to store information and that can be accessed by the processor(s) 1108 directly or through another computing device or network. Accordingly, the computer-readable media 1110 can be computer storage media able to store instructions, components or components that can be executed by the processor(s) 1108. Further, when mentioned, non-transitory computer-readable media exclude media such as energy, carrier signals, electromagnetic waves, and signals per sc.

The computer-readable media 1110 can be used to store and maintain any number of functional components that are executable by the processor(s) 1108. In some implementations, these functional components comprise instructions or programs that are executable by the processor(s) 1108 and that, when executed, implement operational logic for performing the actions and services attributed above to the user device 1102. Functional components stored in the computer-readable media 1110 can include a user interface 1120 to enable users to interact with the user device 1102, and thus the server(s) 1104 and/or other networked devices. In some examples, the user interface 1120 can be the user interface(s) 152, 400A, and/or 400B. In at least one example, a user can interact with the user interface via touch input, spoken input, gesture, or any other type of input. The word "input" is also used to describe "contextual" input that may not be directly provided by the user via the user interface 1120. For example, user's interactions with the user interface 1120 are analyzed using, e.g., natural language processing techniques, user movement tracking techniques, eye tracking techniques, etc. to determine context or intent of the user, which may be treated in a manner similar to "direct" user input.

Depending on the type of the user device 1102, the computer-readable media 1110 can also optionally include other functional components and data, such as other components and data 1122, which can include programs, drivers, etc., and the data used or generated by the functional components. In addition, the computer-readable media 1110 can also store data, data structures and the like, that are used by the functional components. Further, the user device 1102 can include many other logical, programmatic and physical components, of which those described are merely examples that are related to the discussion herein.

In at least one example, the computer-readable media 1110 can include additional functional components, such as an operating system 1124 for controlling and managing various functions of the user device 1102 and for enabling user interactions.

The communication interface(s) 1112 can include one or more interfaces and hardware components for enabling communication with various other devices, such as over the network(s) 1106 or directly. For example, communication interface(s) 1112 can enable communication through one or more network(s) 1106, which can include, but are not limited to any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1106 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1102 can further include one or more input/output (I/O) devices 1114. The I/O devices 1114 can include speakers, a microphone, a camera, and various user controls (e.g., buttons, a joystick, a keyboard, a keypad, etc.), a haptic output device, and so forth. The I/O devices 1114 can also include attachments that leverage the accessories (audio-jack, USB-C, Bluetooth, etc.) to connect with the user device 1102.

In at least one example, user device 1102 can include a display 1116. Depending on the type of computing device(s) used as the user device 1102, the display 1116 can employ any suitable display technology. For example, the display 1116 can be a liquid crystal display, a plasma display, a light emitting diode display, an OLED (organic light-emitting diode) display, an electronic paper display, or any other suitable type of display able to present digital content thereon. In at least one example, the display 1116 can be an augmented reality display, a virtual reality display, or any other display able to present and/or project digital content. In some examples, the display 1116 can have a touch sensor associated with the display 1116 to provide a touchscreen display configured to receive touch inputs for enabling interaction with a graphic interface presented on the display 1116. Accordingly, implementations herein are not limited to any particular display technology. In some examples, the user device 1102 may not include the display 1116, and information can be presented by other means, such as aurally, haptically, etc.

In addition, the user device 1102 can include sensor(s) 1118. The sensor(s) 1118 can include a global positioning system ("GPS") device able to indicate location information. Further, the sensor(s) 1118 can include, but are not limited to, an accelerometer, gyroscope, compass, proximity sensor, camera, microphone, and/or a switch.

In some examples, the GPS device can be used to identify a location of a user. In at least one example, the location of the user can be used by the merchant platform 910, the P2P platform 912, and/or the media content platform 914, described above, to provide one or more services. That is, in some examples, the service provider can implement geofencing to provide particular services to users by the merchant platform 910, the P2P platform 912, and/or the media content platform 914.

In examples, the user device 1102 includes a codec system, which may comprise an encoder 1146 and/or a decoder 1148. The encoder 1146 is configured to encode a data stream or signal from an analog signal (e.g., an analog audio signal, an analog video signal, etc.) to a digital signal for transmission or storage. The decoder 1148 is configured to convert the digital signal back to an analog signal, such as for playback or editing. In some cases, the encoder 1146 may be configured to encode the data stream or analog signal in an encrypted format, and the decoder 1148 may accordingly be configured to decrypt the digital signal as part of the decoding process (e.g., using a cryptographic key). Additionally, in some examples, the encoder 1146 may compress data to reduce transmission bandwidth and/or storage space for the digital signal. One example of a compression codec system is a lossless codec, in which the digital data stream is a compressed format of the original data stream, but retains the information present in the original data stream. Another example of a compression codec system is a lossy codec which reduces the quality of the digital data stream but can increase the compression of the data stream relative to lossless codec systems. The codec system comprising the encoder 1146 and/or the decoder 1148 may be specialized to accomplish various different objectives, such as to preserve motion, preserve color, minimize latency, maintain fidelity, minimize bit-rate, optimize for different output device types, maintain synchronization of audio and video (e.g., using a metadata synchronization data stream), and so on. Although not explicitly illustrated in the example system 1100, the server 1104 may include an encoder 1146 and/or a decoder 1148 as well.

Additionally, the user device 1102 can include various other components that are not shown, examples of which include removable storage, a power source, such as a battery and power control unit, a barcode scanner, a printer, a cash drawer, and so forth.

In addition, as described in relation to FIG. 9, the user device 1102 can include, be connectable to, or otherwise be coupled to a reader device 1126, for reading payment instruments and/or identifiers associated with payment objects. The reader device 1126 can include a read head for reading a magnetic strip of a payment card, and further can include encryption technology for encrypting the information read from the magnetic strip. Additionally or alternatively, the reader device 1126 can be an EMV payment reader, which in some examples, can be embedded in the user device 1102. Moreover, numerous other types of readers can be employed with the user device 1102 herein, depending on the type and configuration of the user device 1102.

The reader device 1126 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data from various types of payment instruments. Accordingly, the reader device 1126 may include hardware implementation, such as slots, magnetic tracks, and rails with one or more sensors or electrical contacts to facilitate detection and acceptance of a payment instrument. That is, the reader device 1126 may include hardware implementations to enable the reader device 1126 to interact with a payment instrument via a swipe, a dip, or a tap to obtain payment data associated with a customer. Additionally or optionally, the reader device 1126 may also include a biometric sensor to receive and process biometric characteristics and process them as payment instruments, given that such biometric characteristics are registered with the payment service and connected to a financial account with a bank server. The reader device 1126 may include processing unit(s), computer-readable media, a reader chip, a transaction chip, a timer, a clock, a network interface, a power supply, and so on. That is, the reader device 1126 may include any of the computing components described herein with reference to the user device 1102 to implement the functionality provided by the reader device 1126.

In examples, the reader device 1126 includes a reader chip, which may perform functionality to control the power supply, among other functionality of the reader device 1126. The power supply may include one or more power supplies such as a physical connection to AC power or a battery. Power supply may include power conversion circuitry for converting AC power and generating a plurality of DC voltages for use by components of reader device 1126. When power supply includes a battery, the battery may be charged via a physical power connection, via inductive charging, or via any other suitable method.

The reader device 1126 may also include a transaction chip that may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. The transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While the user device 1102, which can be a POS terminal, and the reader device 1126 are shown as separate devices, in additional or alternative examples, the user device 1102 and the reader device 1126 can be part of a single device, which may be a battery-operated device. In some examples, the reader device 1126 can have a display integrated therewith, which can be in addition to (or as an alternative of) the display 1116 associated with the user device 1102.

The server(s) 1104 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1104 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1104 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1104 can include one or more processors 1128, one or more computer-readable media 1130, one or more I/O devices 1132, and one or more communication interfaces 1134. Each processor 1128 can be a single processing unit or a number of processing units, and can include single or multiple computing units or multiple processing cores. The processor(s) 1128 can be implemented as one or more microprocessors, microcomputers, microcontrollers, digital signal processors, central processing units, state machines, logic circuitries, and/or any devices that manipulate signals based on operational instructions. For example, the processor(s) 1128 can be one or more hardware processors and/or logic circuits of any suitable type specifically programmed or configured to execute the algorithms and processes described herein. The processor(s) 1128 can be configured to fetch and execute computer-readable instructions stored in the computer-readable media 1130, which can program the processor(s) 1128 to perform the functions described herein.

The computer-readable media 1130 can include volatile and nonvolatile memory and/or removable and non-removable media implemented in any type of technology for storage of information, such as computer-readable instructions, data structures, program components, or other data. Such computer-readable media 1130 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1104, the computer-readable media 1130 can be a type of computer-readable storage media and/or can be a tangible non-transitory media to the extent that when mentioned, non-transitory computer-readable media exclude media such as energy, carrier signals, electromagnetic waves, and signals per sc.

The computer-readable media 1130 can be used to store any number of functional components that are executable by the processor(s) 1128. In many implementations, these functional components comprise instructions or programs that are executable by the processors 1128 and that, when executed, specifically configure the one or more processors 1128 to perform the actions attributed above to the merchant platform 910, the P2P platform 912, and/or the media content platform 914. Functional components stored in the computer-readable media 1130 can optionally include a merchant component 1136, a training component 1138 (e.g., the training component 142 introduced in FIG. 1), and one or more other components and data 1140, such as the account manager component 132, the payment processing component 138, the training component 142, the classification component 146, and/or the user interface component 148, which were introduced in FIG. 1. The computer-readable media 1130 can additionally include an operating system 1142 for controlling and managing various functions of the server(s) 1104.

The merchant component 1136 can be configured to receive transaction data from POS systems. The merchant component 1136 can transmit requests (e.g., authorization, capture, settlement, etc.) to payment service server computing device(s) to facilitate POS transactions between merchants and customers. The merchant component 1136 can communicate the successes or failures of the POS transactions to the POS systems.

The training component 1138 can be configured to train models using machine-learning mechanisms, as well as retrain the models to improve outputs provided by the models based on feedback received over time. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1102 and/or the server(s) 1104 for use at a time after the data models have been trained (e.g., at runtime).

The one or more other components and data 1140 can include the account manager component 132, the payment processing component 138, the training component 142, the classification component 146, and/or the user interface component 148, the functionality of which is described, at least partially, above. Further, the one or more other components and data 1140 can include programs, drivers, etc., and the data used or generated by the functional components. Further, the server(s) 1104 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that they may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally, or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The communication interface(s) 1134 can include one or more interfaces and hardware components for enabling communication with various other devices, such as over the network(s) 1106 or directly. For example, communication interface(s) 1134 can enable communication through one or more network(s) 1106, which can include, but are not limited to any type of network known in the art, as described herein.

The server(s) 1104 can further be equipped with various I/O devices 1132. Such I/O devices 1132 can include a display, various user interface controls (e.g., buttons, joystick, keyboard, mouse, touch screen, biometric or sensory input devices, etc.), audio speakers, connection ports and so forth.

In at least one example, the system 1100 can include a datastore 1144 that can be configured to store data that is accessible, manageable, and updatable. In some examples, the datastore 1144 can be integrated with the user device 1102 and/or the server(s) 1104. In other examples, as shown in FIG. 11, the datastore 1144 can be located remotely from the server(s) 1104 and can be accessible to the server(s) 1104. The datastore 1144 can comprise multiple databases and/or servers connected locally and/or remotely via the network(s) 1106. In at least one example, the datastore 1144 can store user profiles, which can include merchant profiles, customer profiles, artist profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, media content consumption data (e.g., number of streams of media content and by which artists, direct artist payouts, playlists generated or "favorited," durations of listening and/or watching individual media content items, actions performed while consuming media content (e.g., skips, repeats, volume changes, etc.), locations at which media content is consumed, devices used to consume media content, activities during which media content is consumed, etc.), etc.

Artist profiles can store data including, but not limited to, artist information (e.g., artist's performance or stage name, band name, artist's legal name, record label, phone number, address, social media handles, website address, banking information, etc.), artist preferences (e.g., learned or artist-specified), media content (and/or associated data) at least partially attributed to the artist (e.g., songs, videos, artists in a same genre or having shared listeners, etc.), event data (e.g., tour dates, appearance dates, appointments, etc.), financial data (e.g., advance data, recoupment data, royalty data, payouts data, etc.), payroll data (e.g., employees, contractors, venues, payroll frequency, etc.), listening data (e.g., number of streams on media content platform(s), listening trends, etc.), fan data (number of followers on media content platform(s), number of followers on social media platform(s), etc.), reservations data (e.g., venue reservations, studio recording reservations, previous reservations, upcoming (scheduled) reservations, reservation duration, interactions associated with such reservations, etc.), inventory data (e.g., merchandise inventory), customer service data, and so forth.

Furthermore, in at least one example, the datastore 1144 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1144 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and case of understanding. However, the methods illustrated are not limited to being performed using components described in the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

What is claimed is:

1. A computer-implemented method comprising:
   processing, by a computing system associated with a payment service, payments between user accounts of the payment service, wherein the payments are associated with contextual data, and wherein the user accounts are associated with different user types;
   filtering, by the computing system, the user accounts to obtain a filtered set of user accounts by excluding a subset of the user accounts that are associated with:
      user profile data indicating that date of birth information has been changed one or more times; or
      identity verification (IDV) data indicating inconsistent IDV attempts;
   training, by the computing system and using the contextual data associated with the payments between the filtered set of user accounts, a first machine learning model to classify the filtered set of user accounts into the different user types, wherein the first machine learning model uses at least one of notes associated with the payments, network interactions associated with the payments, or utilization patterns associated with the payments to determine which user type of the different user types is associated with a user account;
   analyzing, by the computing system and using the first machine learning model, additional contextual data associated with additional payments between additional user accounts of the payment service to classify the additional user accounts;
   determining, by the computing system and based on the analyzing, that a particular user account of the additional user accounts is associated with a user type of the different user types that requires an action to be performed;
   analyzing, by the computing system and using a second machine learning model, data associated with the particular user account to identify one or more user accounts of the payment service;
   sending, by the computing system, an instruction to a user device associated with the particular user account and executing a payment application associated with the payment service, the instruction causing the payment application to present a user interface element prompting a user of the user device to request sponsorship from at least one of the one or more user accounts as a sponsor of the user;
   storing, by the computing system, in a datastore, account data indicating that the particular user account is an authorized account based on an indication of an interaction with the user interface element and the particular user account having been linked to the sponsor subsequent to the interaction with the user interface element; and
   disabling, by the computing system, a functionality associated with the payment service for the particular user account based at least in part on the particular user account having been linked to the sponsor.

2. The computer-implemented method of claim 1, wherein the different user types represent at least one of:
   different levels of risk;
   different levels of authentication; or
   different levels of access to the payment service.

3. The computer-implemented method of claim 1, wherein the first machine learning model further uses at least one of emojis associated with the payments or payment failure metrics associated with the payments to determine which user type of the different user types is associated with the user account.

4. The computer-implemented method of claim 1, further comprising analyzing, by the computing system and using the first machine learning model, contact book data associated with the additional user accounts to classify the additional user accounts, the contact book data comprising at least one of:
   percentages of contacts that have been classified as a particular user type;
   names of the contacts;
   electronic mail (email) address types associated with the contacts; or
   profile pictures associated with the contacts.

5. The computer-implemented method of claim 1, further comprising, in response to the determining that the particular user account is associated with the user type, placing, by the computing system, the particular user account in a restricted state until the action is performed.

6. The computer-implemented method of claim 1, wherein the additional contextual data analyzed using the first machine learning model comprises location data indicating locations of user devices associated with the additional user accounts at times at which the additional payments were made.

7. A system comprising:
one or more processors; and
memory storing computer-executable instructions that, when executed by the one or more processors, cause the one or more processors to perform operations comprising:
processing payments between user accounts of a payment service;
filtering the user accounts to obtain a filtered set of user accounts by excluding a subset of the user accounts that are associated with:
user profile data indicating that date of birth information has been changed one or more times; or
identity verification (IDV) data indicating inconsistent IDV attempts;
training a first artificial intelligence (AI) model to classify the filtered set of user accounts into different user types using contextual data associated with the payments between the filtered set of user accounts;
analyzing, using the first AI model, additional contextual data associated with additional payments between additional user accounts of the payment service to classify the additional user accounts;
determining, based at least in part on the analyzing, that a particular user account of the additional user accounts is associated with a user type of the different user types that requires an action to be performed;
analyzing, using a second AI model, data associated with the particular user account to identify one or more user accounts of the payment service;
sending an instruction to a user device associated with the particular user account and executing a payment application associated with the payment service, the instruction causing the payment application to present a user interface element prompting a user of the user device to request sponsorship from at least one of the one or more user accounts as a sponsor of the user;
storing, in a datastore, account data indicating that the particular user account is an authorized account based at least in part on an indication of an interaction with the user interface element and the particular user account having been linked to the sponsor subsequent to the interaction with the user interface element; and
disabling a functionality associated with the payment service for the particular user account based at least in part on the particular user account having been linked to the sponsor.

8. The system of claim 7, wherein the different user types represent at least one of:
different levels of risk;
different levels of authentication; or
different levels of access to the payment service.

9. The system of claim 7, wherein, prior to the analyzing of the additional contextual data, at least some of the additional user accounts are selected for classification into the different user types based at least in part on determining that a predefined period of time has lapsed since the first AI model was last used to classify the at least some of the additional user accounts into the different user types.

10. The system of claim 7, wherein the additional contextual data analyzed using the first AI model comprises location data indicating locations of user devices associated with the additional user accounts at times at which the additional payments were made.

11. The system of claim 7, wherein the determining that the particular user account is associated with the user type is based at least in part on a score or a classification output by the first AI model.

12. The system of claim 7, wherein the determining that the particular user account is associated with the user type is based at least in part on a score output by the first AI model satisfying a threshold score.

13. The system of claim 7, the operations further comprising analyzing, using the first AI model, contact book data associated with the additional user accounts to classify the additional user accounts, the contact book data comprising at least one of:
percentages of contacts that have been classified as a particular user type;
names of the contacts;
electronic mail (email) address types associated with the contacts; or
profile pictures associated with the contacts.

14. The system of claim 7, the operations further comprising, in response to the determining that the particular user account is associated with the user type, placing the particular user account in a restricted state until the action is performed.

15. A computer-implemented method comprising:
processing, by a computing system associated with a payment service, payments between user accounts of the payment service;
filtering, by the computing system, the user accounts to obtain a filtered set of user accounts by excluding a subset of the user accounts that are associated with:
user profile data indicating that date of birth information has been changed one or more times; or
identity verification (IDV) data indicating inconsistent IDV attempts;
training, by the computing system, a first artificial intelligence (AI) model to classify the filtered set of user accounts into different user types using contextual data associated with the payments between the filtered set of user accounts;
analyzing, by the computing system and using the first AI model, additional contextual data associated with additional payments between additional user accounts of the payment service to classify the additional user accounts;
determining, by the computing system and based on the analyzing, that a particular user account of the additional user accounts is associated with a user type of the different user types that requires an action to be performed;
analyzing, by the computing system and using a second AI model, data associated with the particular user account to identify one or more user accounts of the payment service;
sending, by the computing system, an instruction to a user device associated with the particular user account and executing a payment application associated with the payment service, the instruction causing the payment application to present a user interface element prompting a user of the user device to request sponsorship from at least one of the one or more user accounts as a sponsor of the user;
storing, by the computing system, in a datastore, account data indicating that the particular user account is an authorized account based on an indication of an interaction with the user interface element and the particular user account having been linked to the sponsor subsequent to the interaction with the user interface element; and disabling, by the computing system, a functionality associated with the payment service for the particular user account based at least in part on the particular user account having been linked to the sponsor.

16. The computer-implemented method of claim 15, further comprising, in response to the determining that the particular user account is associated with the user type, placing, by the computing system, the particular user account in a restricted state until the action is performed.

17. The computer-implemented method of claim 15, further comprising analyzing, by the computing system and using the first AI model, contact book data associated with the additional user accounts to classify the additional user accounts, the contact book data comprising at least one of:

percentages of contacts that have been classified as a particular user type;

names of the contacts;

electronic mail (email) address types associated with the contacts; or profile pictures associated with the contacts.

18. The computer-implemented method of claim 15, further comprising analyzing, by the computing system and using the first AI model, contact book data associated with the additional user accounts to classify the additional user accounts, the contact book data comprising electronic mail (email) address types associated with contacts.

19. The computer-implemented method of claim 15, wherein the additional contextual data analyzed using the first AI model comprises location data indicating locations of user devices associated with the additional user accounts at times at which the additional payments were made.

20. The computer-implemented method of claim 15, wherein the first AI model further uses at least one of emojis associated with the payments or payment failure metrics associated with the payments to determine which user type of the different user types is associated with a user account.

* * * * *